(12) United States Patent
Arashima et al.

(10) Patent No.: US 8,411,104 B2
(45) Date of Patent: Apr. 2, 2013

(54) IMAGE PROCESSING DEVICE AND IMAGE DISPLAY SYSTEM

(75) Inventors: Kenji Arashima, Kanagawa (JP); Tomoya Yano, Kanagawa (JP); Toru Nishi, Kanagawa (JP)

(73) Assignee: Sony Corporation (JP)

( * ) Notice: Subject to any disclaimer, the term of this patent is extended or adjusted under 35 U.S.C. 154(b) by 590 days.

(21) Appl. No.: 12/653,187

(22) Filed: Dec. 9, 2009

(65) Prior Publication Data

US 2010/0156772 A1 Jun. 24, 2010

(30) Foreign Application Priority Data

Dec. 18, 2008 (JP) ................ P2008-322299

(51) Int. Cl.
*G09G 5/02* (2006.01)
*G06K 9/40* (2006.01)
(52) U.S. Cl. ........ 345/589; 382/263; 382/264; 382/265; 382/266
(58) Field of Classification Search .................. None
See application file for complete search history.

(56) References Cited

U.S. PATENT DOCUMENTS

| | | | | |
|---|---|---|---|---|
| 5,369,446 | A * | 11/1994 | Parker et al. | 348/625 |
| 7,693,343 | B2 * | 4/2010 | Klompenhouwer et al. | 382/260 |
| 7,859,497 | B2 * | 12/2010 | Kong et al. | 345/87 |
| 2005/0030302 | A1 | 2/2005 | Nishi et al. | |
| 2005/0232356 | A1 * | 10/2005 | Gomi et al. | 375/240.16 |
| 2009/0180030 | A1 * | 7/2009 | Shin et al. | 348/663 |

FOREIGN PATENT DOCUMENTS

| | | |
|---|---|---|
| JP | 2002082657 A | 3/2002 |
| JP | 2005-043864 A | 2/2005 |
| JP | 2007079549 A | 3/2007 |
| JP | 2007114736 A | 5/2007 |
| JP | 2007213017 A | 8/2007 |
| JP | 2007256917 A | 10/2007 |
| JP | 2007264661 A | 10/2007 |

OTHER PUBLICATIONS

Office Action from Japanese Application No. 2008-322299, dated Mar. 6, 2012.
Office Action from Japanese Application No. 2008-322300, dated Oct. 2, 2012.

* cited by examiner

*Primary Examiner* — Kee M Tung
*Assistant Examiner* — Haixia Du
(74) *Attorney, Agent, or Firm* — Lerner, David, Littenberg, Krumholz & Mentlik, LLP

(57) ABSTRACT

The present invention provides an image processing device and an image display system achieving image quality improvement in moving picture by suppressing a motion blur in a hold-type display device, while maintaining low cost. The image processing device processes image data provided from outside and outputting the image data to a hold type display device. The image processing device includes a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of the changing edge portion in the image data.

18 Claims, 43 Drawing Sheets

FIG. 8A
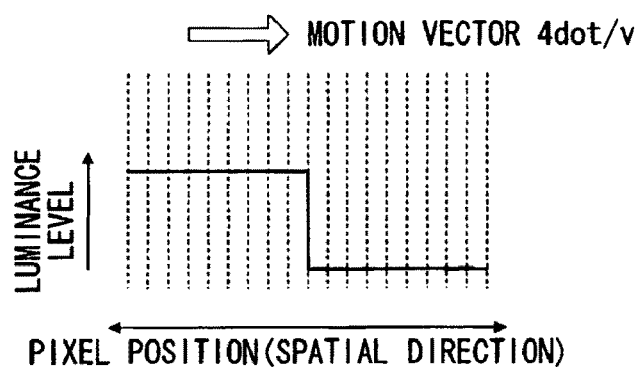
FIG. 8B
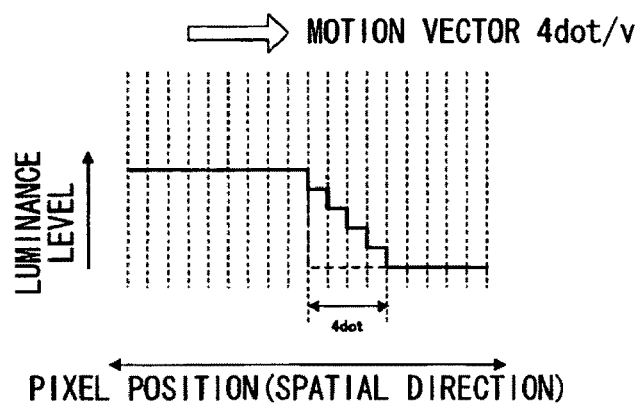
FIG. 8C
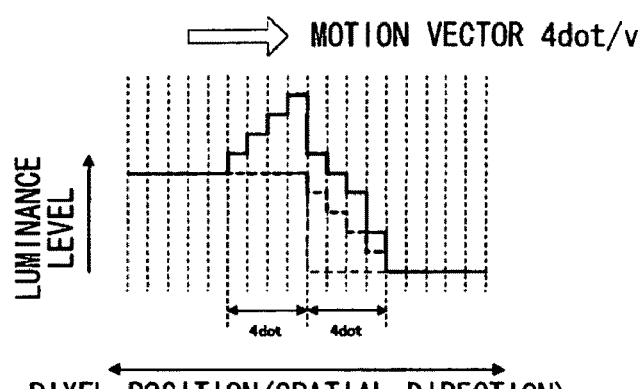
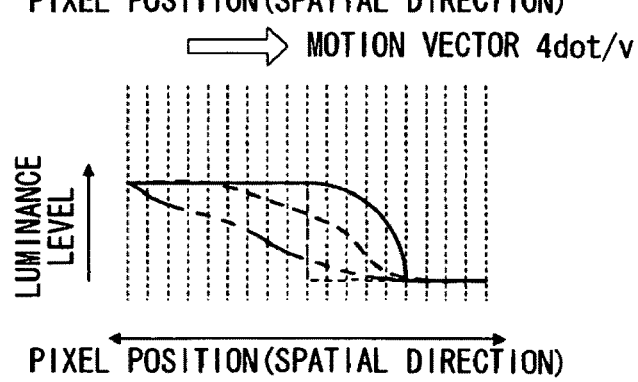
FIG. 9

| TRAVEL AMOUNT (60Hz) | TRAVEL AMOUNT (120Hz) | LPF TAP NUMBER | HPF TAP NUMBER |
|---|---|---|---|
| 1~4 | 0.5~2.0 | | 3 |
| 5~8 | 2.5~4.0 | 3 | 5 |
| 9~ | 4.5~ | 5 | 7 |

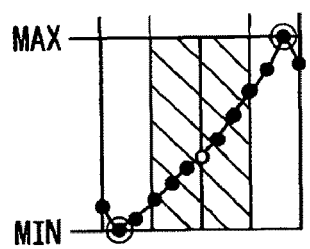 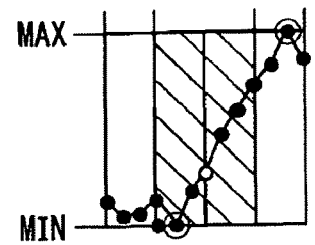 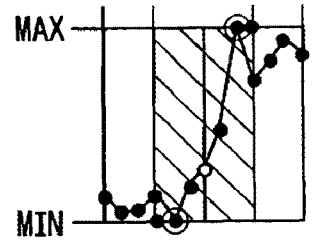
FIG. 29A　　　　FIG. 29B　　　　FIG. 29C
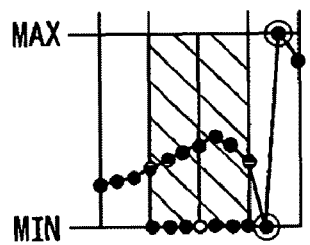 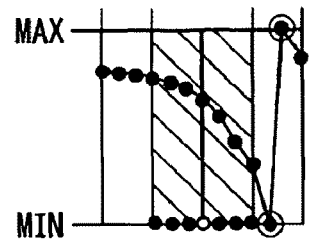
FIG. 30A　　　　FIG. 30B

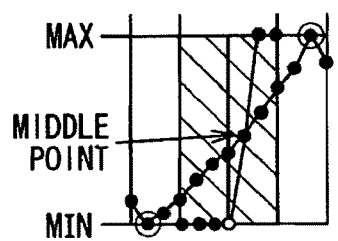 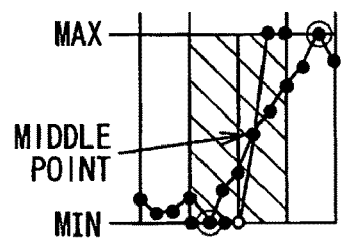 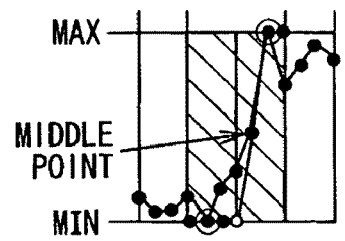
FIG. 31A  FIG. 31B  FIG. 31C
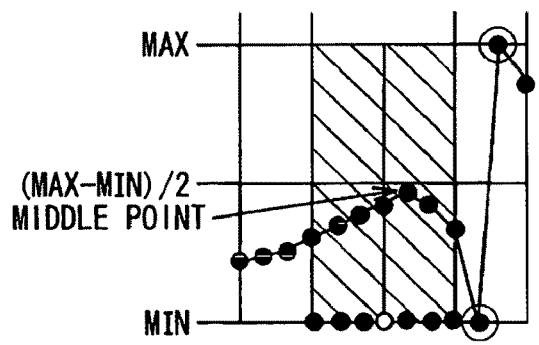 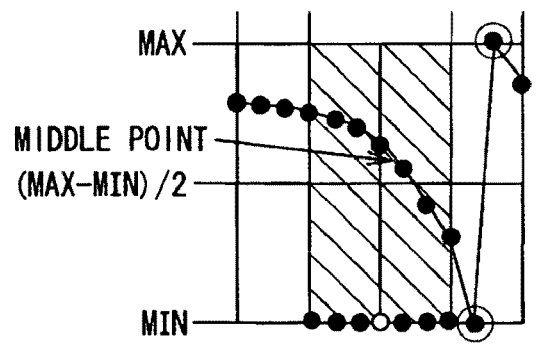
FIG. 32A  FIG. 32B

IDEAL HOLD TYPE

ONLY OD

0→255

PBET=9.8ms

OD+LPF

PBET=7.8ms

ONLY OD

0→96

PBET=9.3ms

OD+LPF+HPF

PBET=6ms

SINGLE PIXEL STRUCTURE PATTERN

SUB-PIXEL STRUCTURE PATTERN

IMAGE PROCESSING DEVICE AND IMAGE DISPLAY SYSTEM

CROSS-REFERENCE TO RELATED APPLICATION

The present application claims priority from Japanese Patent Application No. JP 2008-322299 filed in the Japanese Patent Office on Dec. 18, 2008, the entire content of which is incorporated herein by reference.

BACKGROUND OF THE INVENTION

1. Field of the Invention

The present invention relates to an image processing device which processes an image data input from outside and outputs the image data to a hold type display device, and an image display system including the same.

2. Description of the Related Art

In recent years, a low-profile display such as a liquid crystal display (LCD) has been widely spread in substitution for a CRT (cathode ray tube), and a technique for a moving-image display on the LCD has attracted attention.

Unlike an impulse type display device such as the CRT, when displaying the moving image in the hold type display device such as the LCD, a display of all pixels constituting a screen is held during a period from when a certain one in a plurality of frames or fields (hereafter, simply referred to as "frames") constituting the moving image is specified to be displayed, until when a next frame is specified to be displayed. Thus, in the hold type display device, due to a so-called eye trace integration (afterglow characteristics exhibited in a human retina when tracing the moving image) effect, there are issues that motion blur such as blur of a front edge, trailing of a rear edge, and delay of perception position occurs in a moving object. In particular, in the LCD, it is considered that this motion blur is likely to be generated due to slowness in response speed of the liquid crystal.

To solve such issues, there is an overdrive technique as one of the techniques for suppressing the motion blur by improving response characteristics of the LCD. In the overdrive technique, to improve the response characteristics to a step input in the LCD, for example, to the step input, a voltage higher than a target voltage corresponding to an instructed luminance value is applied in a first frame when the input signal is changed. Thereby, the speed of a luminance transition is accelerated. By utilizing this overdrive technique, the response speed of the liquid crystal increases in a middle gradation region, and it is possible to obtain an effect suppressing the motion blur. Moreover, in the overdrive technique, by changing a wavelength of the voltage applied in accordance with a motion vector in each frame, a technique more efficiently suppressing the motion blur is also proposed (for example, refer to Japanese Unexamined Patent Publication No. 2005-43864).

SUMMARY OF THE INVENTION

However, in the overdrive technique, there is a limit in a voltage range where the voltage may be applied to the liquid crystal. Thus, for example, in the case where the target voltage of a white display, a black display, or the like is close to the limit in the voltage range (the case of a gradation change in a high gradation region and a low gradation region), there is an issue that the voltage sufficiently high to increase the response speed of the liquid crystal may not be applied, and the effect of suppressing the motion blur may not be sufficiently exhibited.

Moreover, in a liquid crystal display driving in a VA type mode, characteristics are different in a rise and a fall of the liquid crystal, and an alignment change of liquid crystal molecules takes time in the rise from 0 level (for example, black). When utilizing only the overdrive technique, there is such an issue that the luminance transition to the instructed luminance value may not be realized in one frame, in consideration of the response characteristics of the liquid crystal.

On the other hand, recently, there has been developed a double speed drive technique. In the double speed drive technique, to reduce the effect of the eye trace integration, a display frame is time-divisionally divided to a plurality of sub-frames, and the plurality of sub-frames are used to increase a display frequency of the moving image. An interpolation image between the frames is calculated based on the motion vector of the input image, and displayed on the LCD.

However, since a drive frequency of a display driver driving a display device increases by increasing the display frequency, there are issues that shortage of electric charges, an increase in the number of ICs and terminals of connectors, an increase in a substrate area, heat generation, an increase in EMI (electro magnetic interference), or the like occurs, and this may be a reason of a cost increase.

In view of the foregoing, it is desirable to provide an image processing device and an image display system capable of improving image quality of a moving image by suppressing a motion blur in a hold-type display device, while suppressing a cost increase.

According to an embodiment of the present invention, there is provided an image processing device processing image data provided from outside and outputting the image data to a hold type display device, the image processing device including a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of the changing edge portion in the image data.

An image display system according to an embodiment of the present invention includes: an image processing device processing image data provided from outside; and a hold type display device performing an image display based on processed image data outputted from the image processing device.

In the image processing device and the image display system according to the embodiments of the present invention, the pixel value in the image data is corrected for each pixel through performing the spatial HPF (high pass filter) process on the image data in the frame to be displayed according to the magnitude of the motion vector in the image data. Thereby, with a combination of the overshoot region and the undershoot region provided by the HPF process, the liquid crystal response is improved. Thus, in the hold type display device, the motion blur such as a blur of the edge, and trailing of the edge caused by the luminance change from the middle gradation to the middle gradation, and the delay in the fall response is suppressed. Moreover, unlike the double speed drive technique of the existing art (interpolation in the temporal direction), since it is unnecessary to change the device itself, an issue of cost increase does not occur. Moreover, unlike the overdrive technique of the existing art, the motion blur is sufficiently suppressed in the gradation change in the region other than the region of the middle gradation.

In the image processing device and the image display system according to the embodiments of the present invention, the correction processing section preferably performs the correction process through executing a spatial LPF (low pass filter) process as well as the HPF process on the image data in the frame to be displayed, according to the magnitude of the motion vector, the LPF process allowing a slope of the changing edge portion in the image data to be more gentle. In the case of such a configuration, the motion blur (hold blur such as blur of a front edge, trailing of a rear edge, and delay of perception position) in the moving object, caused by the eye trace integration effect, is suppressed by an effect of substantial frame rate improvement with the interpolation in the spatial direction. Therefore, the motion blur in the hold type display device is more efficiently suppressed, and the image quality of the moving image more improves.

According to the image processing device and the image display system of the embodiments of the present invention, the pixel value in the image data is corrected for each pixel through performing the spatial HPF process on the image data in the frame to be displayed according to the magnitude of the motion vector in the image data. Thereby, with a combination of the overshoot region and the undershoot region provided by the HPF process, the liquid crystal response is improved, and the motion blur may be suppressed. Moreover, unlike the existing art, the issue of cost increase may be prevented, and the motion blur is sufficiently suppressed in the gradation change in the region other than the region of the middle gradation. Therefore, it is possible to improve the image quality of the moving image by suppressing the motion blur in the hold type display device, while suppressing the cost increase.

Other and further objects, features and advantages of the invention will appear more fully from the following description.

BRIEF DESCRIPTION OF THE DRAWINGS

FIGS. 8A to 8C are explanation views each illustrating an example of the input signal which is input to the image processing device of the first embodiment.

FIG. 9 is an explanation view illustrating a change of light amount in a spatial direction accumulated in a retina of a user who watches the hold type display device displaying an image based on an output signal output from the image processing device of the first embodiment.

FIG. 29 is waveform diagrams each for explaining a detail of the process with a first edge replacement process section illustrated in FIG. 27.

FIG. 30 is waveform diagrams each for explaining the detail of the process with the first edge replacement process section illustrated in FIG. 27.

FIG. 31 is waveform diagrams each for explaining a detail of the process with a second edge replacement process section illustrated in FIG. 27.

FIG. 32 is waveform diagrams each for explaining the detail of the process with the second edge replacement process section illustrated in FIG. 27.

DETAILED DESCRIPTION OF THE PREFERRED EMBODIMENTS

Figure 1:
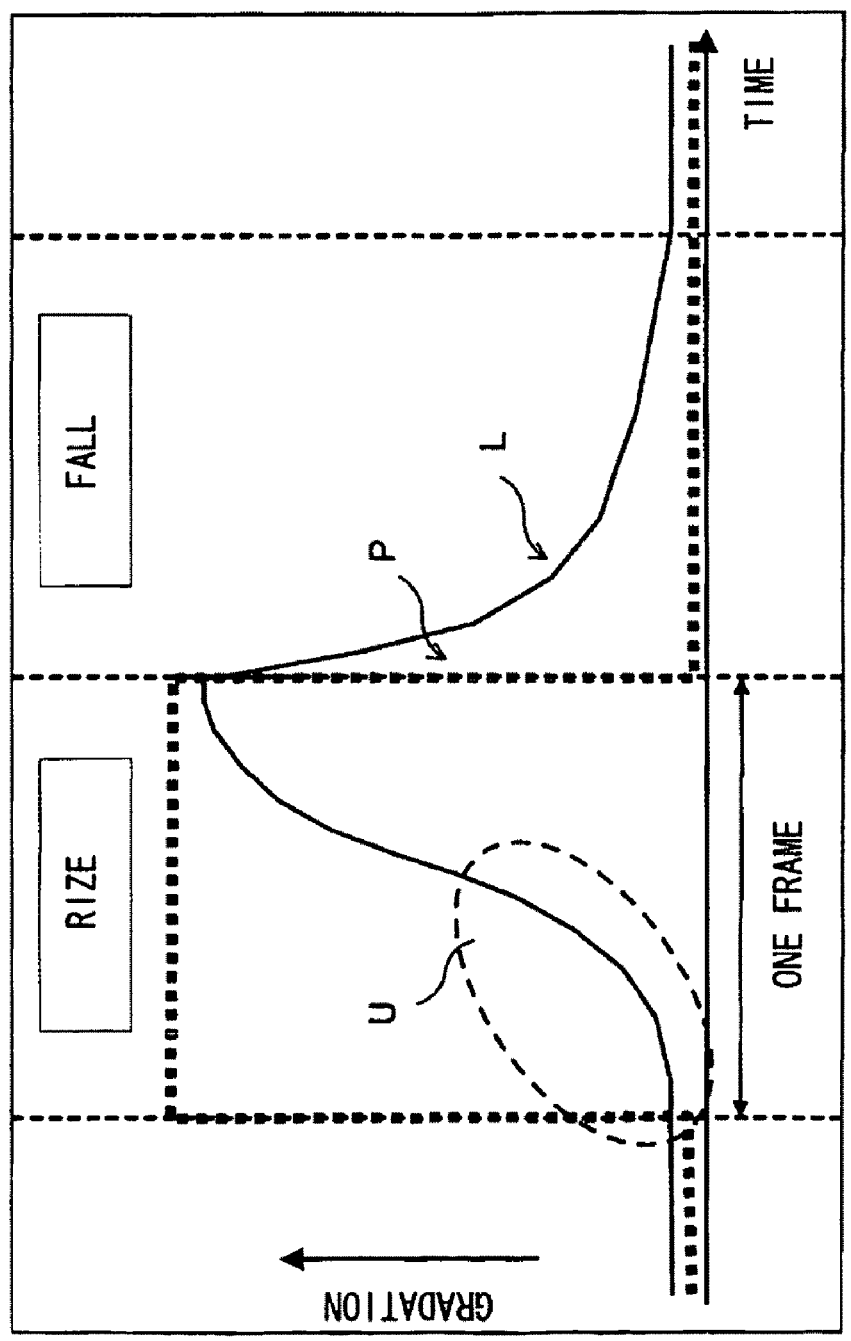
FIG. 1 is an explanation view illustrating an example of a response waveform of a liquid crystal in a case where a pulse signal is input to the liquid crystal of a typical VA type.

Embodiments of the present invention will be described in detail with reference to the accompanying figures. The description will be made in the following order. In the embodiments and the figures, same reference numerals will be used to indicate components having substantially identical function configurations, thereby cumulative descriptions are omitted.

1. First embodiment (an example of an image process using an LPF (low pass filter)
2. Second embodiment (an example of another image process using the LPF and an HPF (high pass filter))
3. Modification 1. First Embodiment Improvement Measures for a Motion Blur Before describing a preferred embodiment (first embodiment) of the present invention, the description will be made on a course in which the present inventors has conceived an image processing device according to the embodiment of the present invention, as the improvement measures for the motion blur in a hold type display device such as a liquid crystal display device.

As described above, in the hold type display device, a motion blur such as blur of a front edge, trailing of a rear edge, and delay of perception position occurs in a moving object. In the existing art, it is considered that the motion blur is caused by slowness of a response speed of a display element of liquid crystal or the like. Thus, an overdrive technique is utilized as the measures for improving the motion blur in the hold type display device. When this overdrive technique is utilized, it is possible to increase the response speed of the display element of the liquid crystal or the like.

On the other hand, occurrence of the motion blur in the hold type display device is caused by not only slowness of the response speed of the display element of the liquid crystal or the like. An eye trace integration effect, as being afterglow characteristics exhibited in a human retina when tracing the moving image, is also one of major causes of the motion blur. Thus, the motion blur is not sufficiently suppressed in the hold type display device, when utilizing only the typical overdrive technique in which only slowness of the response speed of the display element of the liquid crystal or the like is considered.

In this regard, according to an image processing device described in Japanese Unexamined Patent Publication No. 2005-43864 which has been previously filed with the Japan Patent Office by the assignee of the present application of the present invention, the motion blur in the hold type display device may be sufficiently suppressed by considering not only the response speed of the liquid crystal, but also the eye trace integration effect, when utilizing the overdrive technique.

In a gradation change in a middle gradation region, the overdrive technique may exhibit the effect to increase the response speed of the display element. However, in the case where a target voltage of a white display, a black display, or the like is close to a limit in an applicable-voltage range, the overdrive technique may not sufficiently exhibit the effect to increase the response speed of the display element, since sufficiently-high voltage may not be applied to the display element.

Moreover, in the liquid crystal display device which utilizes a drive method of a VA type mode, at the time of a rise from 0 level (for example, black), an alignment change of liquid crystal molecules takes time. Thus, there is a case where one frame is insufficient for the response speed, when utilizing only the overdrive technique.

Here, with reference to FIG. 1, the response characteristics of the liquid crystal will be described with an example of the case where a pulse signal is input to the liquid crystal of the typical VA type. FIG. 1 is an explanation view illustrating an example of the response waveform of the liquid crystal in the case where the pulse signal is input to the liquid crystal of the typical VA type. In FIG. 1, the vertical axis indicates the gradation of the liquid crystal, and the horizontal axis indicates time. Moreover, FIG. 1 illustrates a response waveform L of the liquid crystal, with a solid line. The response waveform L of the liquid crystal is generated in the case where a pulse signal P having a waveform in one frame period illustrated with a broken line is input to the liquid crystal of the typical VA type.

As illustrated in FIG. 1, in the case of the VA type liquid crystal, the response characteristics are different from each other in the rise and the fall. In the rise, since the response occurs along a VT curve, there is a delay from the signal input to the response. On the other hand, in the case of the fall, since the response does not occur along the VT curve, there is the delay, but not so large. In particular, as indicated with a region U surrounded by the broken line in FIG. 1, in the rise from the low gradation (for example, 0 level), it can be seen that the delay of the response time is large. Moreover, in the rise, it can be seen that there is a big difference of the response time, depending on the gradation when the signal is input.

Thus, the present inventors have further studied the relationship between the eye trace integration effect and the motion blur in the hold the display device. As a result, the present inventors have found out that the motion blur in the hold type display device may be efficiently suppressed by utilizing the difference of the response time depending on the gradation, so as to control the application of the drive voltage in accordance with the response time of the display element of the liquid crystal or the like, and have come to complete the invention of the present application.

Eye Trace Integration Effect

Hereafter, with reference to FIGS. 2 to 5, the description will be made on the relationship between the eye trace integration effect and the motion blur in the hold type display device, studied by the present inventors. FIGS. 2 to 5 are explanation views each for explaining an example of the relationship between the eye trace integration effect and the motion blur in the hold type display device.

In the following description, the liquid crystal display device is given as an example of the hold type display device. The description will be made with an assumption that a certain pixel in a plurality of pixels which constitute a frame or a field (hereafter, simply referred to as a "frame" for convenience sake of the description) corresponds to each display element (liquid crystal in this example) which constitutes a screen of the liquid crystal display device.

As conditions of the image to be handled, it is assumed that the image of a step change moves at a fixed speed, with a background colored with one solid color. Because of these conditions, in the case where the eye trace integration is traced, the luminance on this trace is calculated with a periodical function. Thus, in the eye trace integration, only one frame may be considered. To easily perform the calculation, the luminance change on the boundary of the image (edge portion) is assumed to be perpendicular in this example.

Whether or not the improvement of the motion blur in the hold type display device reaches a target quality may be determined, based on whether or not the result similar to or better than the result of the eye trace integration in the LCD with 120 Hz drive in which the typical 60 Hz drive is driven with a double speed mode is obtained. As the determination item for this target quality, there is steepness of the boundary (a front edge and a rear edge) in the eye trace integration, delay in a half-value point (value half the maximum luminance) of the reached luminance, or the like.

Here, in FIGS. 2 to 5, the case is illustrated where the image of the step change travels from left to right on the display screen of the liquid crystal display device, at the speed of 4 pixels/one frame. Upper parts of FIGS. 2 to 5 each illustrate the waveform of the input image signal input to the liquid crystal display device. Middle parts of FIGS. 2 to 5 each illustrate a temporal transition in an output level (luminance) of the liquid crystal, in the case where the image based on the input image signal in the upper parts of FIGS. 2 to 5 is displayed in the liquid crystal display device. Lower parts of FIGS. 2 to 5 each illustrate light amount (that is, the result of the eye trace integration) taken in the retina in the user's eye, in the case where the user (human) watches the image displayed in the liquid crystal display device.

In the middle parts of FIGS. 2 to 5, the position in the horizontal direction illustrates the position (spatial direction) of the pixel constituting each frame. In the figures, the change in a vertically downward direction illustrates a passage of the time. Moreover, in the middle parts of FIGS. 2 to 5, one pixel corresponds to one liquid crystal, and the output level of each liquid crystal is illustrated with a gray scale. The reference numerals 0F, 1F, and the like each indicates a number of each frame.

In lower parts of FIGS. 2 to 5, the position in the horizontal direction illustrates the position (spatial direction) of the retina in the user's eye, at a time "tb" in the middle parts of FIGS. 2 to 5. In the figures, the position in the vertically upward direction illustrates the light amount taken in the retina in the user's eye. That is, regions S1, S2, S3 and S4, as the results of the integration of the light amount in the position of the retina in the user's eye, indicate the results of the eye trace integration. For the more-detailed description, in the middle parts of FIGS. 2 to 5, an oblique arrow toward lower right illustrates the motion of the user's eye. The light at a predetermined level, output from the liquid crystal in the position where this oblique arrow transmits enters the user's retina, at the time of each moment between a time "ta" and the time "tb". As a result, the incident light at the time of each moment is sequentially accumulated in the user's retina. The light with the accumulated light amount (integration value of the level of the incident light) is taken in the user's retina, at the time "tb".

Based on each of FIGS. 2 to 5, the description will be made hereinafter on the relationship between the eye trace integration effect and the motion blur in the hold type display device, studied by the present inventors.

Figure 2:
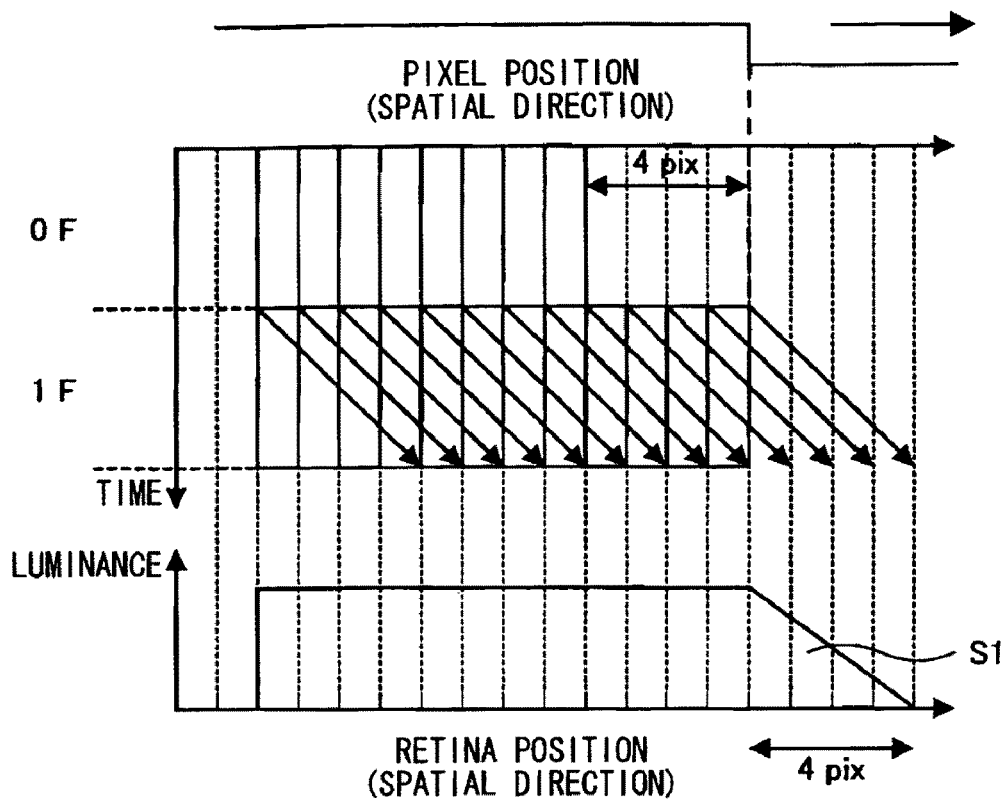
FIG. 2 is an explanation view for explaining an example of a relationship between an eye trace integration effect and a motion blur in a hold type display device.

FIG. 2 illustrates the relationship between the eye trace integration effect and the motion blur, in the case where the input image signal (the input image signal corresponding to the frame 1F in the figure) with the waveform illustrated in the upper part of the figure is input to the display device using an ideal hold element, that is, the hold type display element (for example, liquid crystal) with the response time of 0, at the time "tb".

As illustrated in FIG. 2, in the display device using the ideal hold element, the response time to the step input is 0. Thus, the output level of the liquid crystal instantaneously reaches the luminance (target luminance) corresponding to the input image signal, and the response of the liquid crystal is quick. However, since the eye trace integration effect occurs also in the ideal hold element, the motion blur of four pixels, equivalent to the travel speed of the input image of the step change, is generated.

Figure 3:
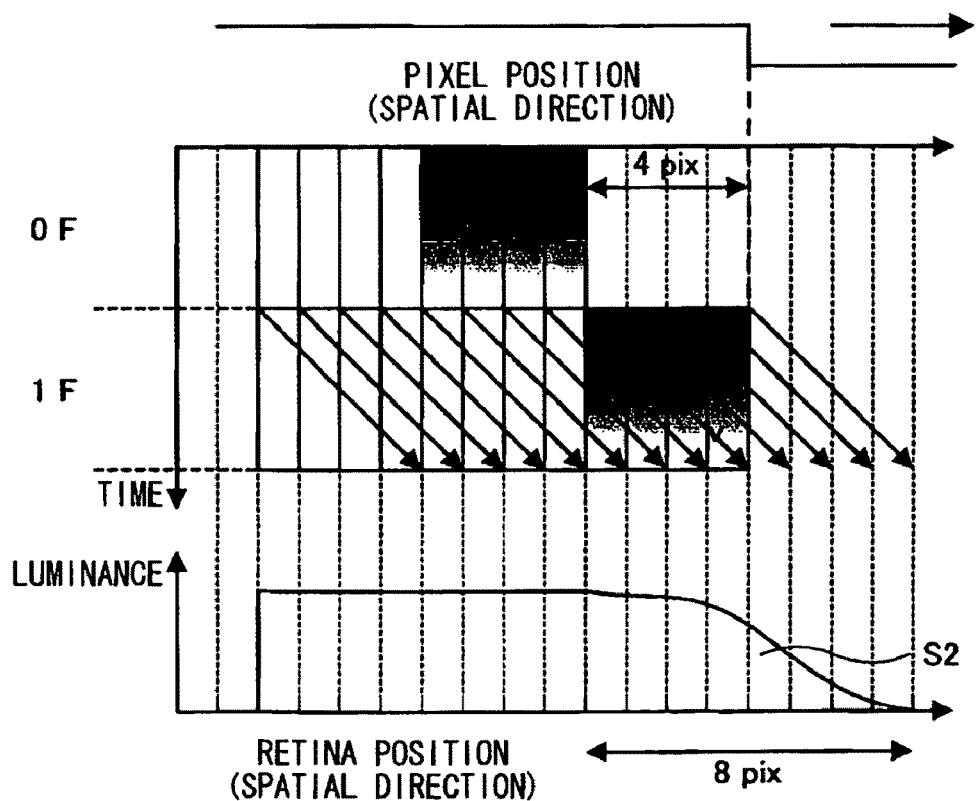
FIG. 3 is an explanation view for explaining an example of the relationship between the eye trace integration effect and the motion blur in the hold type display device.

FIG. 3 illustrates the relationship between the eye trace integration effect and the motion blur, in the case where the input image signal (the input image signal corresponding to the frame F1 in the figure) with the waveform illustrated in the upper part of the figure is input to the typical liquid crystal display device (LCD), at the time "tb".

As illustrated in FIG. 3, in the typical LCD, the response speed to the step input is low, and the response time of approximately one frame is necessary until reaching the target luminance. Moreover, since the LCD performs the hold type drive, the eye trace integration effect is generated. Thus, in the case where the step input is performed in the typical LCD, the eye trace integration effect is added to the response time based on the response speed of the liquid crystal. Therefore, for example, the motion blur of 8 pixels is generated, and this corresponds to twice the travel speed of the input image of the step change.

Figure 4:
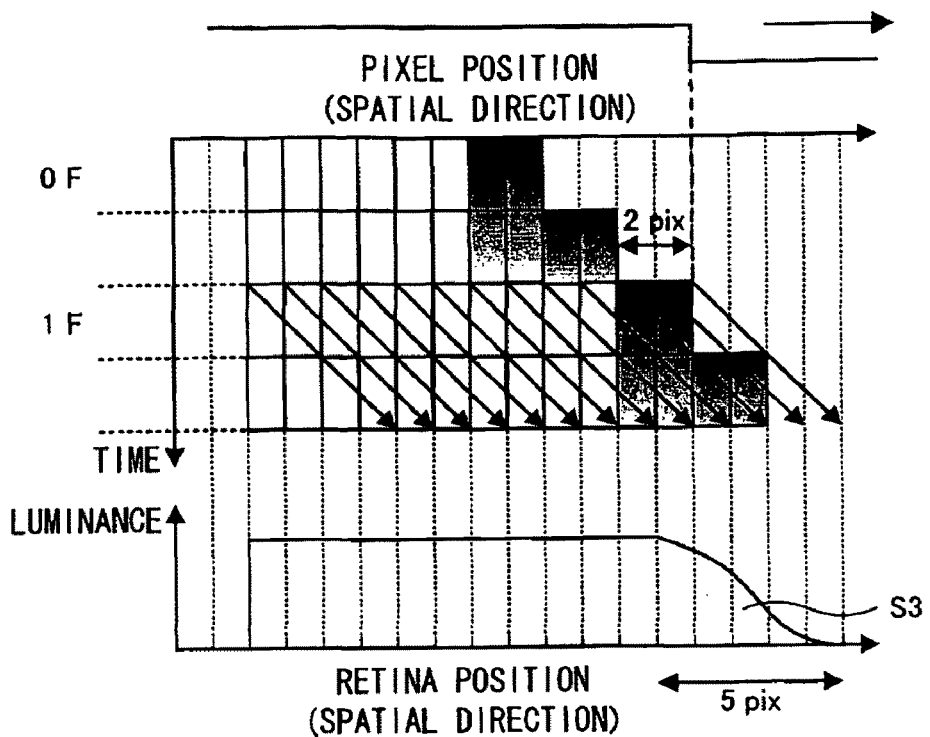
FIG. 4 is an explanation view for explaining an example of the relationship between the eye trace integration effect and the motion blur in the hold type display device.

FIG. 4 illustrates the relationship between the eye trace integration effect and the motion blur, in the case where the input image signal (the input image signal corresponding to the frame 1F in the figure) with the waveform illustrated in the upper part of the figure is input to the LCD performing a double speed drive (frequency of the moving image display is doubled), that is, the LCD displaying the interpolated image based on the motion vector, in the sub-field formed by evenly dividing one frame, at the time "tb".

As illustrated in FIG. 4, even in the LCD performing the double speed drive, the response speed itself of the liquid crystal is not changed in comparison with the typical LCD. On the other hand, in the LCD performing the double speed drive, one frame is divided to two sub-fields, and the interpolation image is displayed in each sub-field. Thus, the hold time for one input image signal is one-half, and the eye trace integration effect is reduced. As a result, for example, it is reduced to the motion blur of five pixels as whole. As described above, whether or not the motion blur improvement in the hold type display device reaches the target quality may be determined, based on whether or not the motion blur is equal to or less than the motion blur of five pixels in the LCD performing the double speed drive.

Figure 5:
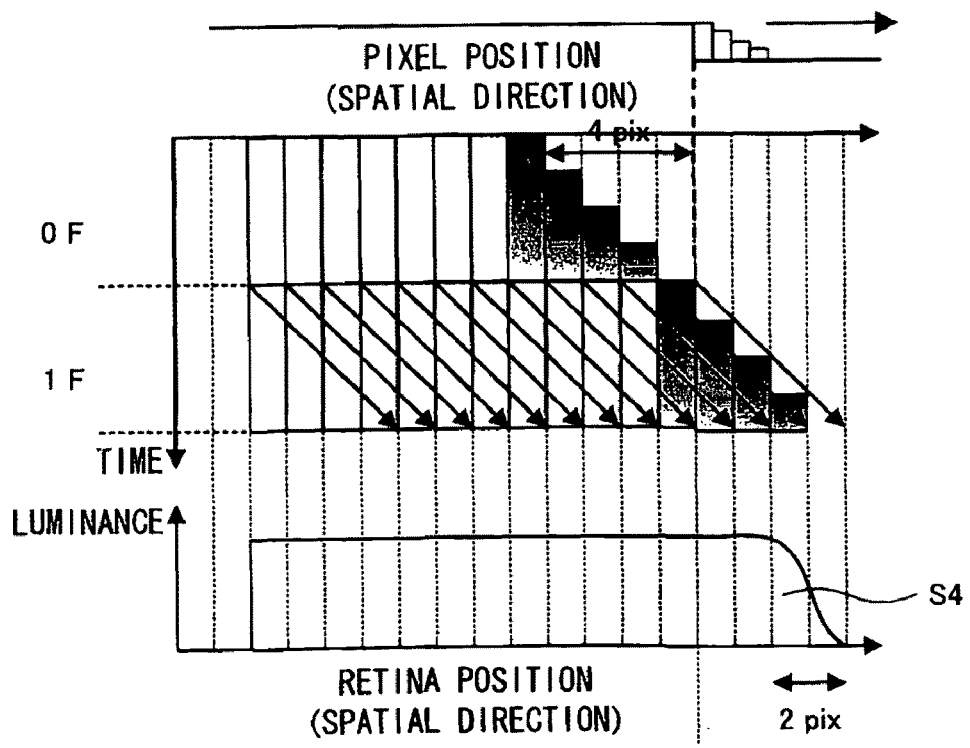
FIG. 5 is an explanation view for explaining an example of the relationship between the eye trace integration effect and the motion blur in the hold type display device.

FIG. 5 illustrates the relationship between the eye trace integration effect and the motion blur, in the case where the input image signal (the input image signal corresponding to the frame 1F in the figure) with the waveform illustrated in the upper part of the figure is input to the image processing device applied with an embodiment of the present invention, at the time "tb".

In the image processing device applied with the embodiment of the present invention, response time information indicates the time from when the drive voltage for displaying the image with the target luminance in the hold type display device is applied, until when the image with the luminance corresponding to the drive voltage is displayed in the display device. The response time information is stored correspondingly to a luminance varying amount. Based on the response time information and the motion vector of the input image, the luminance of each pixel constituting the frame to be displayed is corrected for each pixel, in the frame (0F in this example) previous to the frame to be displayed (1F in this example), that is, at the time "ta" in the case of this example. For example, this correction is performed so that each pixel in the frame to be displayed (1F) has the target luminance. In the example illustrated in FIG. 5, for the pixels (four pixels from the right edge) initially displayed in the frame 1F as the frame to be displayed, the voltage applied to the liquid crystal corresponding to each pixel is adjusted at the time of the frame 0F, and the output level of the liquid crystal is adjusted (refer to the part where the output level of the liquid crystal is in a step-like shape at the time of the frame 0F) for each pixel. Thereby, each pixel has the target luminance in the frame to be displayed (1F).

In this manner, in the frame (0F) previous to the frame to be displayed (1F), the voltage appropriate to each pixel is previously applied (pixel value is corrected) to the liquid crystal corresponding to each pixel, in consideration of the response time of the liquid crystal until each pixel constituting the frame to be displayed reaches the target luminance. Thereby, the eye trace integration effect is remarkably reduced. As a result, as illustrated in FIG. 5, for example, the motion blur is reduced to the motion blur of two pixels as a whole, and it can be seen that there is the motion blur suppressing effect, which is more effective than that of the LCD performing the double speed drive. In the embodiment of the present invention, the pixel value is corrected for each pixel. Thus, the motion blur suppressing effect with the correction process is more effective, as higher-quality pixels like those in high-definition displays or the like are realized, the difference in the response time depending on the gradation change is larger like the case of the liquid crystal of VA type, and the travel speed (motion vector amount) of the moving object is higher.

Accordingly, the image processed with the image processing device which is applied with the present embodiment of the present invention is displayed in the hold type display device, thereby the motion blur suppressing effect more effective than that of the LCD performing the double speed drive may be obtained. Moreover, in the LCD performing the double speed drive, the frame is divided to the plurality of sub-fields to increase the frame rate, by synthesizing the interpolation image to the input image. Thus, the hold time is reduced so that the motion blur is suppressed. On the other hand, in the image processing device applied with the embodiment of the present invention, the interpolation in the spatial direction, not in the temporal direction, is performed based on the motion vector, and the interpolation result is converted from the spatial change to the temporal change based on the response time information. Thereby, the effect increasing the frame rate is substantially applied. As a result, the moving image response characteristics improve in the hold type display device, and it is possible to suppress the motion blur.

Figure 6:
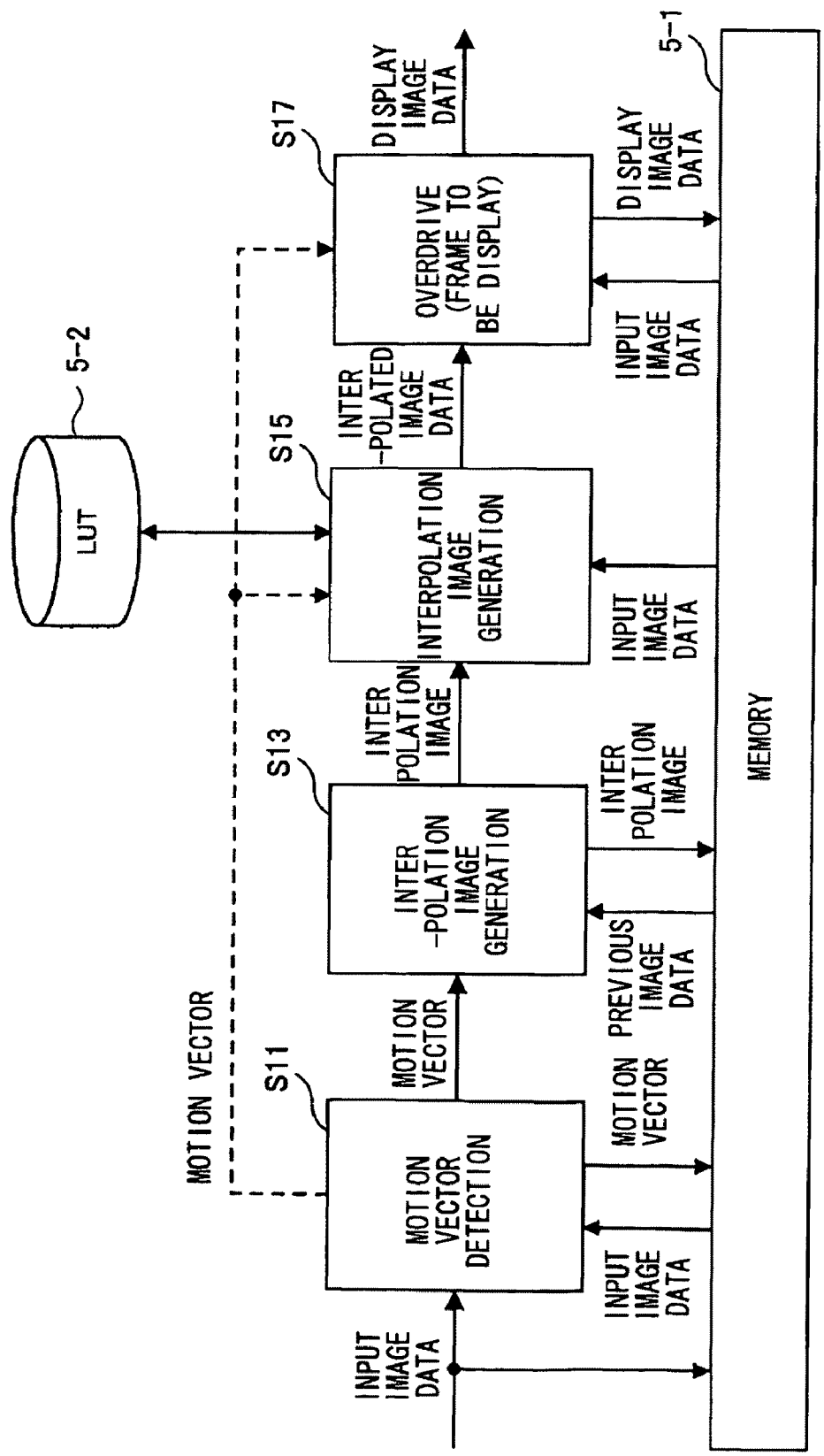
FIG. 6 is an explanation view schematically illustrating an example of an image processing method in an image processing device according to a first embodiment of the present invention.

Outline of a method of processing an image according to the first embodiment of the present invention Hereafter, with reference to FIG. 6, the description will be made on an outline of an example of a method of processing an image in the image processing device according to the first embodiment. FIG. 6 is an explanation view schematically illustrating the example of the method of processing the image in the image processing device according to the first embodiment.

As illustrated in FIG. 6, when the input image data is input to an image processing device 100, the image processing device 100 compares the input image data corresponding to the input frame to be displayed, with the image data corresponding to the frame one-frame previous to the frame to be displayed, which is stored in a memory 5-1 in the image processing device 100, and detects the motion vector of the input image (S11). The detected motion vector is used in a step (S13) where the next interpolation image is generated. Moreover, the detected motion vector is used also in the subsequent correction process and the overdrive process, and may be stored in the memory 5-1, if necessary.

Next, based on the motion vector detected in step S11, the image processing device generates the interpolation image to be inserted between the frame to be displayed and the frame previous to the frame to be displayed (S13). By generating the interpolation image, the moving image display frequency is doubled (in the typical LCD, the moving image display frequency increases from 60 Hz to 120 Hz). The generated interpolation image is used in the subsequent (S15) correction process step. The generated interpolation image may be stored in the memory 5-1. In the embodiment of the present invention, the interpolation image generating step (S13) is not always necessary. By performing the correction process (S15) which will be described next, it is possible to sufficiently obtain the motion blur suppressing effect in the hold type display device, without increasing the moving image display frequency (frame rate).

Next, based on the motion vector detected in step S11, and the response time information stored in a look-up table (LUT) 5-2, the image processing device generates the correction information to display the interpolation image generated in step S13, after the passage of a predetermined time, so that the image with the target luminance is displayed in the frame to be displayed. Further, the image processing device synthesizes the interpolation information and the input image data, and generates the corrected image data in which the pixel value is corrected (S15). The generated corrected image data is used in the subsequent (S17) overdrive process. The correction process step (S15) is performed in the frame previous to the frame to be displayed. In the case where step S13 is not performed (the interpolation image is not generated), in step S15, without using the interpolation image, the corrected pixel value to display the image with the target luminance in the frame to be displayed is directly calculated based on the motion vector detected in step S11, and the response time information stored in the look-up table (LUT) 5-2. Further, based on the calculated corrected pixel value, the corrected image data is generated.

Next, the image processing device performs the overdrive process on the corrected image data corresponding to the frame to be displayed, through use of the input image data stored in the memory 5-1, and the corrected image data generated in step S15 (S17). As a result, the display image data to be displayed in the hold type display device is generated.

Next, with reference to FIGS. 7A to 7D, the operation waveform in the case where the step waveform is input to the hold type display device will be described. FIGS. 7A to 7D are explanation views each illustrating an example of the operation waveform in the case where the step waveform is input to the hold type display device. In FIGS. 7A to 7D, the vertical direction indicates the luminance of each pixel constituting the frame, and the horizontal direction indicates the position (spatial direction) of each pixel constituting the frame. A region divided with a broken line in FIGS. 7A to 7D is referred to as a unit configured with a plurality of pixels (in this example, 4 pixels).

Figure 7A:
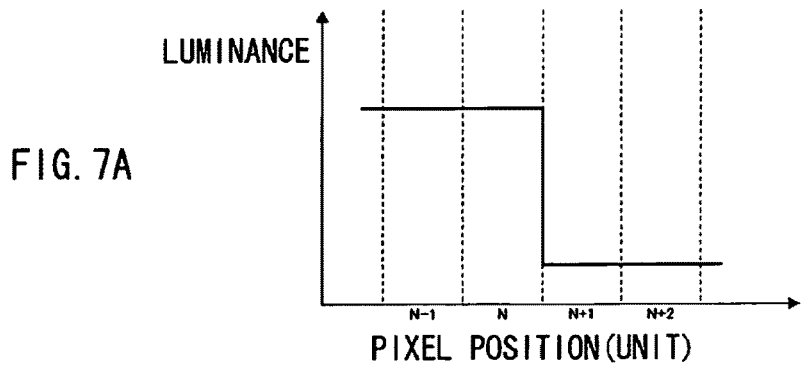
FIGS. 7A to 7D are explanation views each illustrating an example of an operation waveform in the case where a step waveform is input to the hold type display device.

FIG. 7A illustrates the waveform of the step signal input to the typical LCD. As illustrated in FIG. 7A, in the input step signal, there is an edge portion on the right edge of an N-th unit. The height of the edge indicates the target luminance in the frame to be displayed.

Figure 7B:
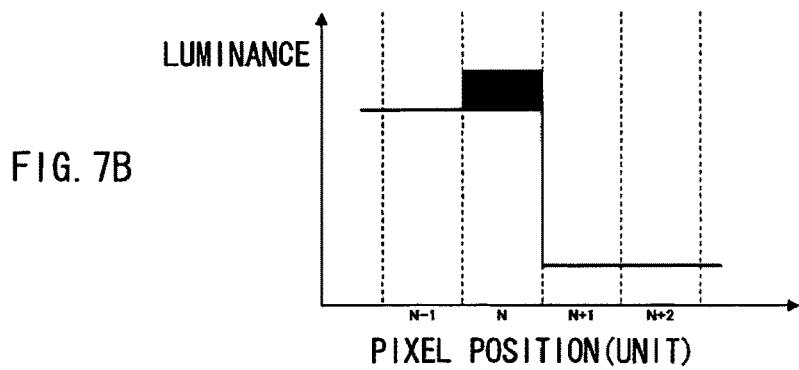

FIG. 7B illustrates the operation waveform in the case where the step signal is input to the LCD employing the overdrive method. As illustrated in FIG. 7B, in the overdrive method, for example, in the first frame of the input change, the voltage higher than the target voltage for displaying the image with the target luminance in the display device is applied, and the luminance transition is accelerated. Thus, in the N-th unit position, the luminance is higher than the target luminance. However, in the typical overdrive method, the motion of the object moving in the frame, that is, the motion vector is not detected, and the voltage is uniformly applied irrespective of the motion vector. Thereby, in the portion having the luminance higher than the target luminance, the luminance is uniform as the whole N-th unit (the luminance is uniform in each pixel included in the N-th unit).

Figure 7C:
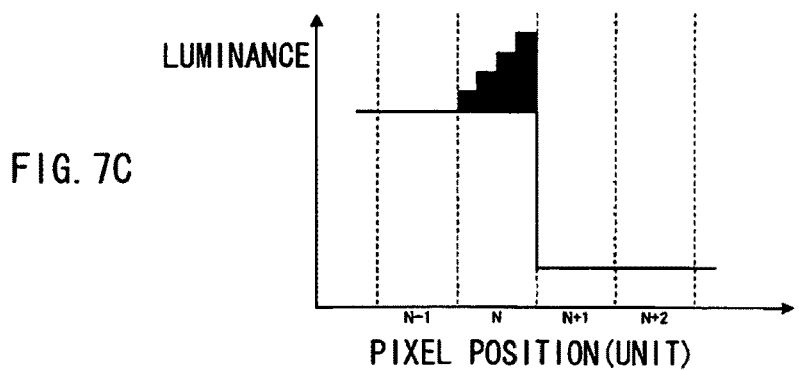

FIG. 7C illustrates the operation waveform in the case where the step signal is input to the LCD employing the method in which the voltage is applied based on the motion vector when performing the overdrive drive, as described in Japanese Unexamined Patent Publication No. 2005-43864. As illustrated in FIG. 7C, in this method, the motion vector of the input image is detected when the voltage higher than the target voltage is applied, and the voltage to be applied is adjusted for each pixel, based on the detected motion vector. Thereby, the motion blur suppressing effect in the hold type display device improves, in comparison with the typical overdrive method.

However, as described above, since there is a limit in the range where the voltage may be applied to the liquid crystal, for example, in the case where the target voltage of the black display, the white display, or the like is close to the limit in the voltage range (the case of the gradation change in the high gradation region and the low gradation region), there is an issue that the voltage sufficiently high to increase the response speed of the liquid crystal may not be applied, and the motion blur suppressing effect may not be sufficiently exhibited. Therefore, in the embodiment of the present invention, the correction process is performed as described in step S15 of FIG. 6.

Figure 7D:
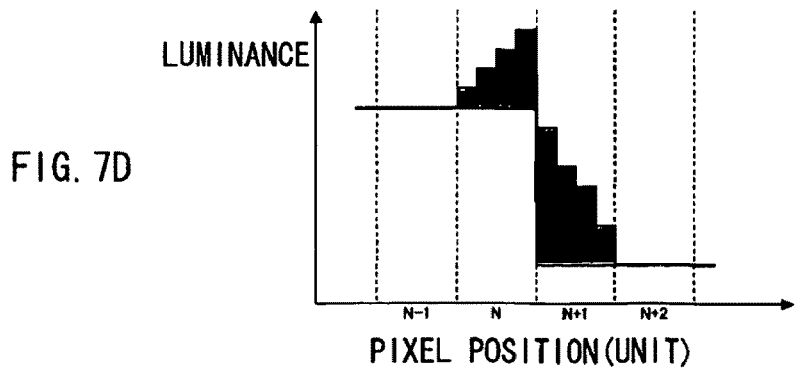

FIG. 7D illustrates an example of the operation waveform in the case where the step signal is input to the image processing device applied with the method of processing the image according to the first embodiment of the present invention. As illustrated in FIG. 7D, in the method according to the first embodiment of the present invention, the luminance value of each pixel constituting the frame to be displayed is corrected for each pixel, in the frame previous to the frame to be displayed, based on the response time information and the motion vector of the input image. This correction is, for example, performed so that each pixel in the frame to be displayed has the target luminance. As a result, in the edge portion in the step signal, it is not that the luminance is vertically sharply reduced from the high luminance to the low luminance, but that the luminance is gradually reduced from the high luminance to the low luminance, for example, in the step-like shape, corresponding to the response speed of the liquid crystal. In FIG. 7D, the operation waveform in the case where, in addition to the image process method according to the first embodiment of the present invention, the overdrive method in consideration of the motion vector is applied is illustrated. However, in the embodiment of the present invention, the overdrive method may be employed, if necessary. The overdrive method is not always necessary.

Next, with reference to FIGS. 8A to 8C, and 9, the operation of the correction process in the image processing device applied with the embodiment of the present invention will be described, with the waveforms of the input signal input to the image processing device, and the output signal output from the image processing device. FIG. 8A is an explanation view illustrating an example of the input signal input to the image processing device applied with the embodiment of the present invention. FIGS. 8B and 8C are explanation views each illustrating an example of the output signal output from the image processing device applied with the embodiment of the present invention. FIG. 9 is an explanation view illustrating the change in the spatial direction of the light amount accumulated in the retina of the user who watches the hold type display device displaying the image based on the output signal output from the image processing device applied with the embodiment of the present invention.

In FIGS. 8A to 8C, the position in the horizontal direction indicates the position (spatial direction) of each pixel constituting the frame, and the vertical direction indicates the luminance level output from the display device. A region divided with a broken line in FIGS. 8A to 8C indicates each pixel constituting the frame. The following description will be made on the assumption that the input signal input to the image processing device is the signal with the step waveform, and the input image based on the signal with the step waveform has the motion vector of 4 dot/v.

The signal with the step waveform having the edge portion as illustrated in FIG. 8A is input to the image processing device. As described above, the step signal travels from left to right in the figure at the speed of 4 dot/v. Before the step signal is input, the black display is performed in the display device, and the black display changes to the white display with the input of the step signal.

In the image processing device applied with the embodiment of the present invention, as illustrated in FIG. 8B, for example, in particular, to smooth the rise in the hold element (liquid crystal or the like), the voltage is previously applied to the rise portion in the input step signal, in accordance with the response characteristics of the liquid crystal, so that the luminance level gradually reduces (correction process). In particular, this process is important in the case of the rise from the black display. At this time, the range where the voltage is previously applied is determined based on the motion vector amount, and, for example, in the case of this example, the voltage is previously applied to the pixel range of 4 dots, which accords with the motion vector amount (4 dot/v). Moreover, in the case where the voltage is previously applied, the voltage applied to each pixel may be determined for each pixel. For example, as illustrated in FIG. 8B, the voltage may be applied so that the luminance level gradually reduces in the step-like manner. Alternatively, the voltage may be applied so that the luminance level gradually reduces in a linear manner, not in the step-like manner. It is preferable to reduce the luminance level in the linear manner, since it is possible to smooth the rise more.

FIG. 8C illustrates the operation waveform in the case where the overdrive technique described in Japanese Unexamined Patent Publication No. 2005-43864 is applied to the image data in which the correction process of the image processing device applied with the embodiment of the present invention is performed. In this case, as illustrated in FIG. 8C, the overdrive is added so that the signal with the mountain-shaped waveform is output. Since the voltage higher than the target voltage is applied with the overdrive, the voltage previously applied for the correction process is also high. Thus, the luminance level is higher than that in the case of FIG. 8B as a whole (the case of performing only the correction process according to the first embodiment of the present invention).

The display operation of the image is performed as described based on FIGS. 8A to 8C, so that the light amount accumulated in the user's retina changes in the spatial direction as illustrated in FIG. 9. That is, in the case where both the overdrive and the correction process according to the first embodiment of the present invention are not performed, the luminance level accumulated in the user's retina does not reach the luminance level of the input step signal, as illustrated with the curve of a two-dot chain line, and the display is highly delayed. Thus, the motion blur is generated in the hold type display device. Moreover, in the case where the only the overdrive is performed, the difference between the luminance level accumulated in the user's retina and the luminance level of the input step signal is small, and the delay of the display is slightly reduced. However, since there is still the delay, the motion blur suppressing effect is insufficient. On the other hand, in the case where both the overdrive and the correction process according to the first embodiment of the present invention are performed, the luminance level accumulated in the user's retina reaches the luminance level of the input step signal as illustrated with the curve of a solid line, and it can be seen that the luminance level does not change sharply, but gradually reduces. As a result, the eye trace integration effect is sufficiently suppressed, and the motion blur suppressing effect becomes effective in the hold type display device.

Configuration of an image display system according to the first embodiment of the present invention.

Figure 10:
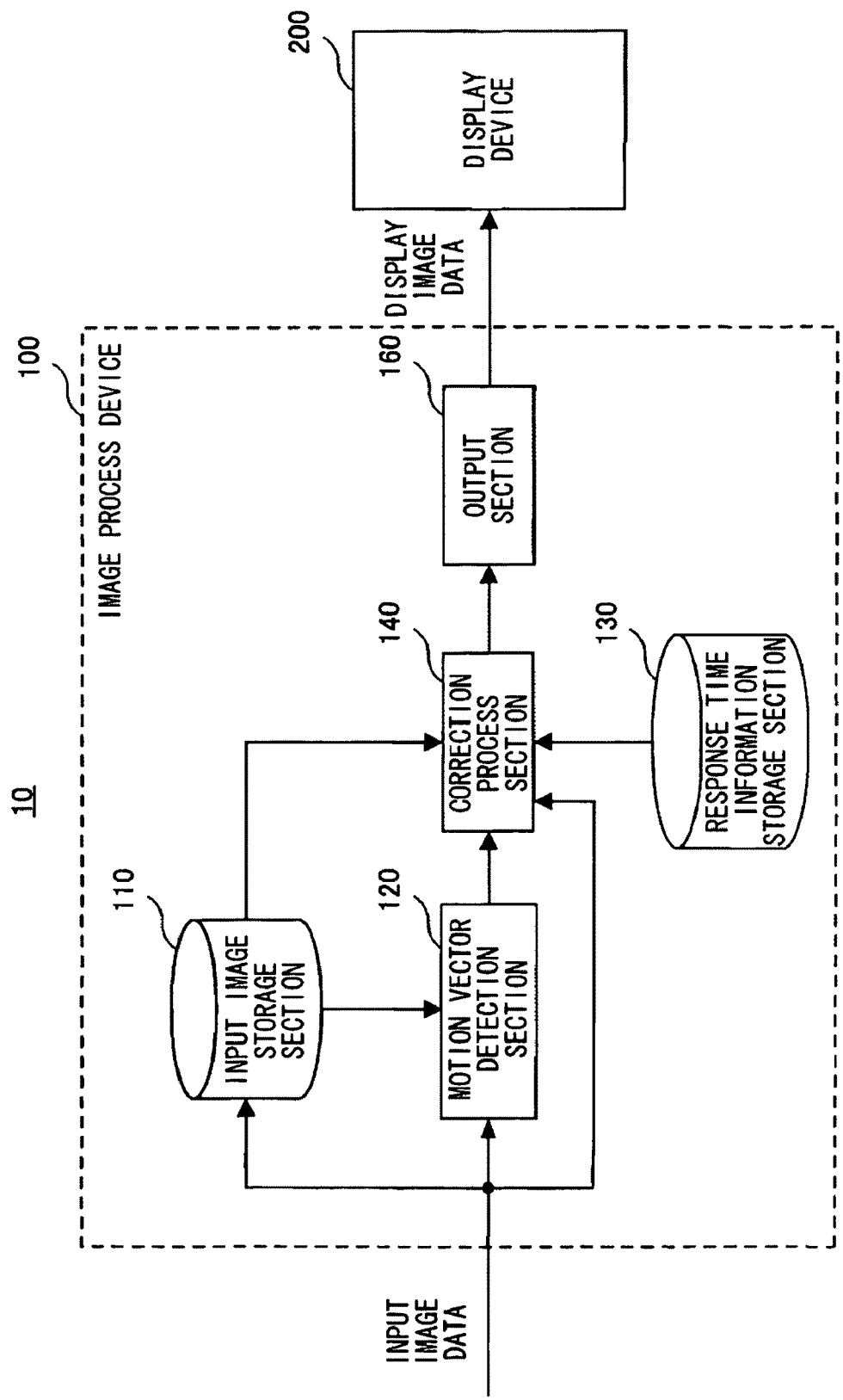
FIG. 10 is a block diagram illustrating a functional configuration of the image processing device of the first embodiment.
Figure 11:
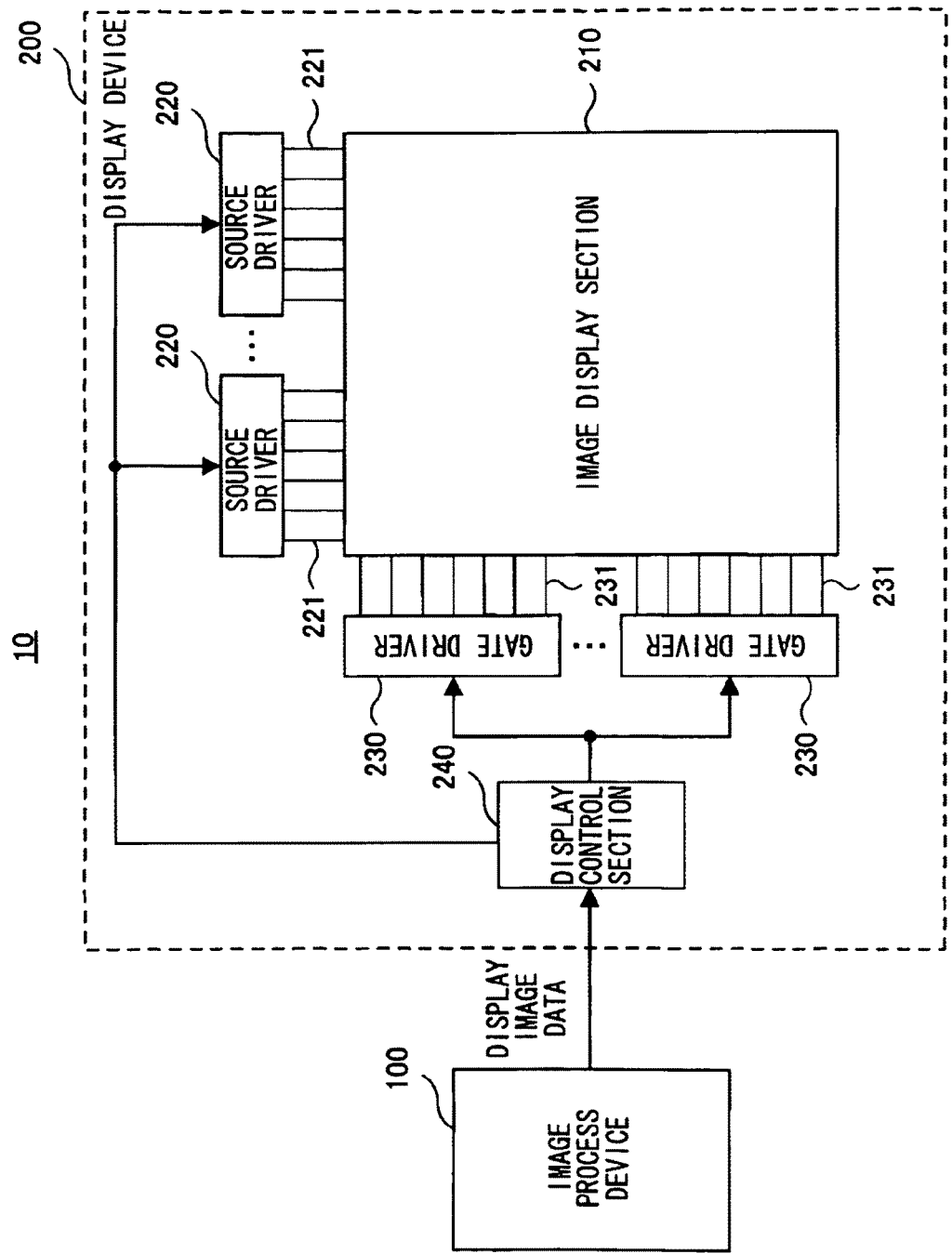
FIG. 11 is a block diagram illustrating the functional configuration of the display device according to the first embodiment.

Next, with reference to FIGS. 10 and 11, the functional configuration of the image display system 10 according to the first embodiment of the present invention will be described in detail as the system capable of realizing the functions as described above. FIG. 10 is a block diagram illustrating the functional configuration of the image processing device 100 constituting the image display system 10 according to the first embodiment of the present invention. FIG. 11 is a block diagram illustrating the functional configuration of a display device 200 constituting the image display system 10 according to the first embodiment of the present invention.

As illustrated in FIGS. 10 and 11, the image display system 10 according to the first embodiment of the present invention includes the image processing device 100 processing the input image data input from the outside to the image processing device 100, and outputting the display image data, and the hold type display device 200 actually displaying the image based on the display image data input from the image processing device 100. Here, the term "system" means an object in which a plurality of devices (functions) are logically collected, and whether or not the devices (functions) of each configuration are in the same housing does not matter. Therefore, for example, like the TV receiver, there is the case where the image processing device 100 and the display device 200 constituting the image display system 10 are disposed in one device as an object to be handled, and there is the case where only the display device 200 of a single object is handled as a separate housing. Hereafter, the functional configuration of the image processing device 100 and the display device 200 constituting the image display system 10 will be described in detail.

Configuration of the Image Processing Device 100

As illustrated in FIG. 10, the image processing device 100 according to the first embodiment of the present invention includes an input image data storage section 110, a motion vector detection section 120, a response time information storage section 130, a correction process section 140, and an output section 160.

In the input image data storage section 110, the input image data input from the outside to the image processing device 100 is stored corresponding to each of a plurality of successive frames. More specifically, for example, when the input image data to display the image in the frame to be displayed is input to the image process section 100, the input image data is stored in the input image data storage section 110. Moreover, in the case where the input image data to display the image in the frame to be subsequently displayed is input to the image processing device 100, the input image data in the frames previous to the frame to be subsequently displayed is stored and left as it is, and is used for the motion vector detection in the motion vector detection section 120. The input image data stored in the input image data storage section 110 may, for example, be deleted in order from temporally-old one, if necessary.

When the input image data in the frame to be displayed is input to the motion vector detection section 120, for example, the motion vector detection section 120 extracts the input image data in the frame previous to the frame to be displayed, from the input image data storage section 110. The motion vector detection section 120 compares the input image data in the frame to be displayed with the input image data in the frame previous to the frame to be displayed. The motion vector detection section 120 focuses on the object moving in the display image, and detects the motion vector of the input image data in the frame to be displayed, based on the direction and distance which the object moves. Moreover, like the first embodiment, the motion vector detection section 120 may be one component in the image processing device 100, or, for example, may be one component in the device outside the image processing device 100, such as an MPEG decoder, and an IP converter. In the latter case, the motion vector of the input image data is separately detected in the device outside the image processing device 100, and input to the image processing device 100.

The response time information storage section 130 stores the time information from when the drive voltage is applied to the display device 200, until when the display device 200 displays the image of the gray-scale corresponding to the drive voltage, that is, the response time information indicating the response time of the hold type display element, correspondingly to a magnitude of gray-scale variation in the display device 200. As a format where the response time information is stored in the response time information storage section 130, for example, there is the case where the magnitude of gray-scale variation, and the response time of the display element corresponding to the magnitude of gray-scale variation are stored in the format of the look-up table (LUT). Alternatively, as a format where the response time information is stored in the response time information storage section 130, for example, there is the case where the function indicating the relationship between the magnitude of gray-scale variation and the response time of the display element is previously obtained, and stored in the response time information storage section 130. In this case, the input image data in the frame to be displayed is compared with the input image data in the frame previous to the frame to be displayed, and the magnitude of gray-scale variation is calculated for each pixel. The calculated magnitude of gray-scale variation is converted to the response time information, with the function stored in the response time information storage section 130. Such a function may be realized with hardware such as an RAM or an ROM.

The correction process section 140 corrects, for each pixel constituting the frame, the pixel value in the input image data in the frame previous to the frame to be displayed, based on the input image data, the motion vector, and the response time information, the input image data being extracted from the input image data storage section 110, the motion vector being detected with the motion vector detection section 120, and the response time information being extracted from the response time information storage section 130. As a result of the correction, the display image data is generated, and the generated display image data is output to the output section 160.

Here, the correction process section 140 may include, for example, an interpolation image generating section (not illustrated in the figure), a display timing information generating section (not illustrated in the figure), and an image synthesizing section (not illustrated in the figure). The interpolation image generating section generates the interpolation image inserted between the frames, which is input based on the input image data and the motion vector. The display timing information generating section generates the display timing information indicating the timing when the interpolation image is displayed after the passage of the predetermined time, based on the response time information. The image synthesizing section synthesizes the generated display information with the input image data. In the case of such a configuration, the interpolation image generating section generates the interpolation image in the spatial direction, not in the temporal direction, based on the motion vector. By utilizing the difference in the response time of the display element depending on the display magnitude of gray-scale variation, the display timing information generating section changes the interpolation image to the display timing information, thereby the change in the spatial direction may be converted to the change in the temporal direction. Therefore, by synthesizing the display timing information with the input image data, it is possible to obtain the effect similar to that in the case where the interpolation image in the temporal direction is generated, that is, the effect to substantially increase the frame rate, through use of the interpolation image in the spatial direction easily generated based on the motion vector.

Like the configuration described above, without generating the interpolation image, the configuration in which the pixel value is directly corrected through use of the spatial filter such as a travel-average filter may be employed. The description will be more specifically made later on the functional configuration in the latter case.

The display image data is input from the correction process section 140 to the output section 160. The output section 160 outputs the input display image data to the display device 200.

Configuration of the Correction Process Section 140

Figure 12:
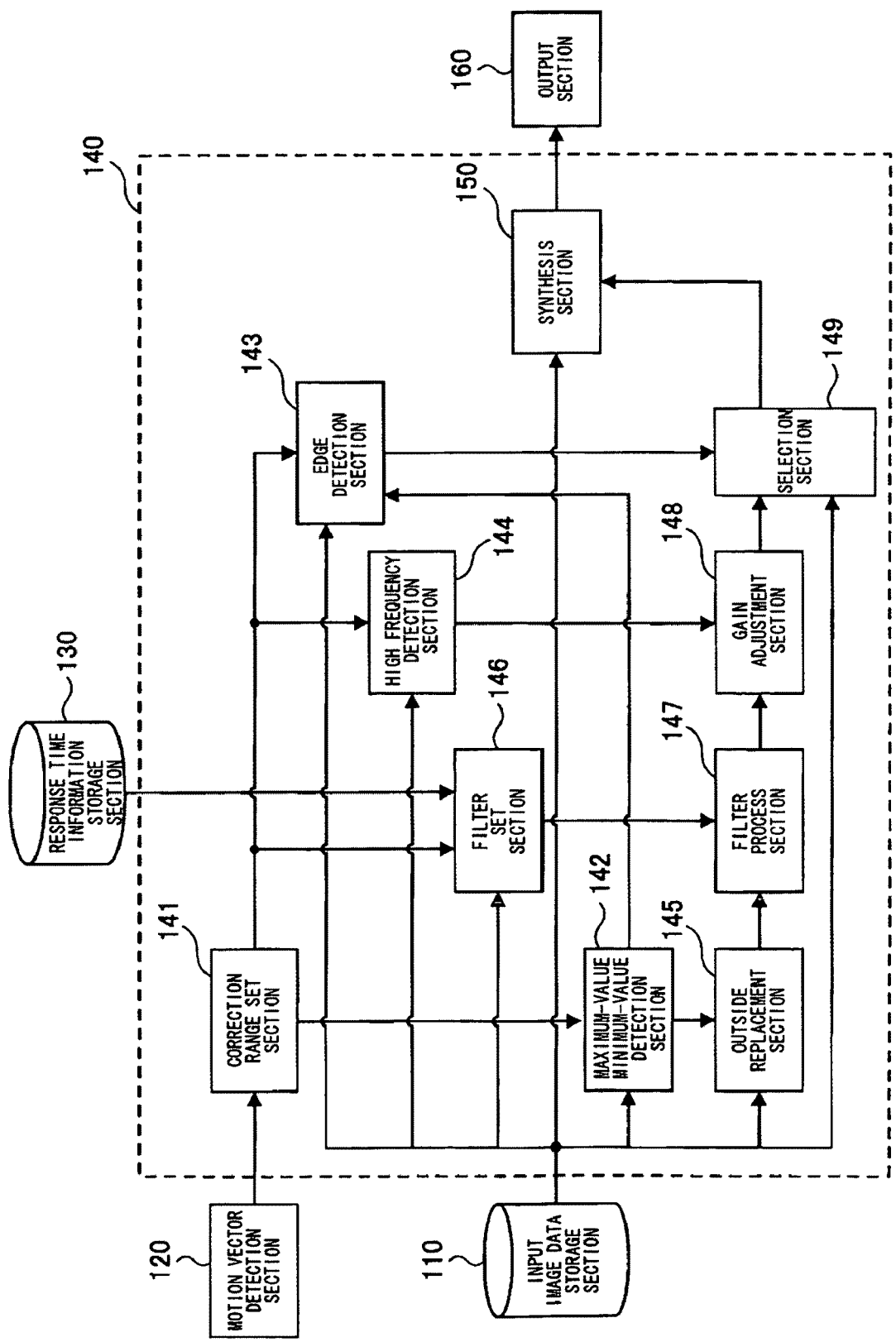
FIG. 12 is a block diagram illustrating the functional configuration of a correction process section according to the first embodiment.

Here, with reference to FIG. 12, the functional configuration of the above-described correction process section 140 will be described in more detail. FIG. 12 is a block diagram illustrating the functional configuration of the correction process section 140 according to the first embodiment.

As illustrated in FIG. 12, the correction process section 140 includes a correction range set section 141, a maximum-value minimum-value detection section 142, an edge detection section 143, a high frequency detection section 144, an outside replacement section 145, a filter set section 146, a filter process section 147, a gain adjustment section 148, a selection section 149, and a synthesis section 150.

The correction range set section 141 sets the correction range where the pixel value is corrected in the input image data, based on the motion vector input from the motion vector detection section 120. Specifically, the correction range set section 141 detects the region where the motion exists in the input image data (portion corresponding to the moving object), and sets the pixel positioned in the region where the motion exists as the correction range. The information on the set correction range, and the information on the input motion vector are transmitted to the maximum-value minimum-value detection section 142, the edge detection section 143, the high frequency detection section 144, and the filter set section 146.

The maximum-value minimum-value detections section 142 detects the maximum-value and the minimum-value of the input image data (input signal) in the correction range, based on the information on the correction range, which is transmitted from the correction range set section 141. The information on the maximum-value and the minimum-value of the detected input signal is transmitted to the edge detection section 143 and the outside replacement section 145.

The edge detection section 143 detects the edge portion in the input image data (input signal), based on the information on the correction range and the information on the input motion vector transmitted from the correction range set section 141, and the information on the maximum-value and the minimum-value of the input signal transmitted from the maximum-value minimum-value detection section 142. The edge detection section 143 detects not only the position of the edge (changing edge portion), but also the edge direction (whether it is the direction of the change from the low gradation to the high gradation, or the direction of the change from the high gradation to the low gradation) in the changing edge portion. With the detection of the edge direction, it is possible to determine that the response of the display element is the rise or the fall. The detected information on the changing edge portion and the edge direction is transmitted to the selection section 149.

Figure 13:
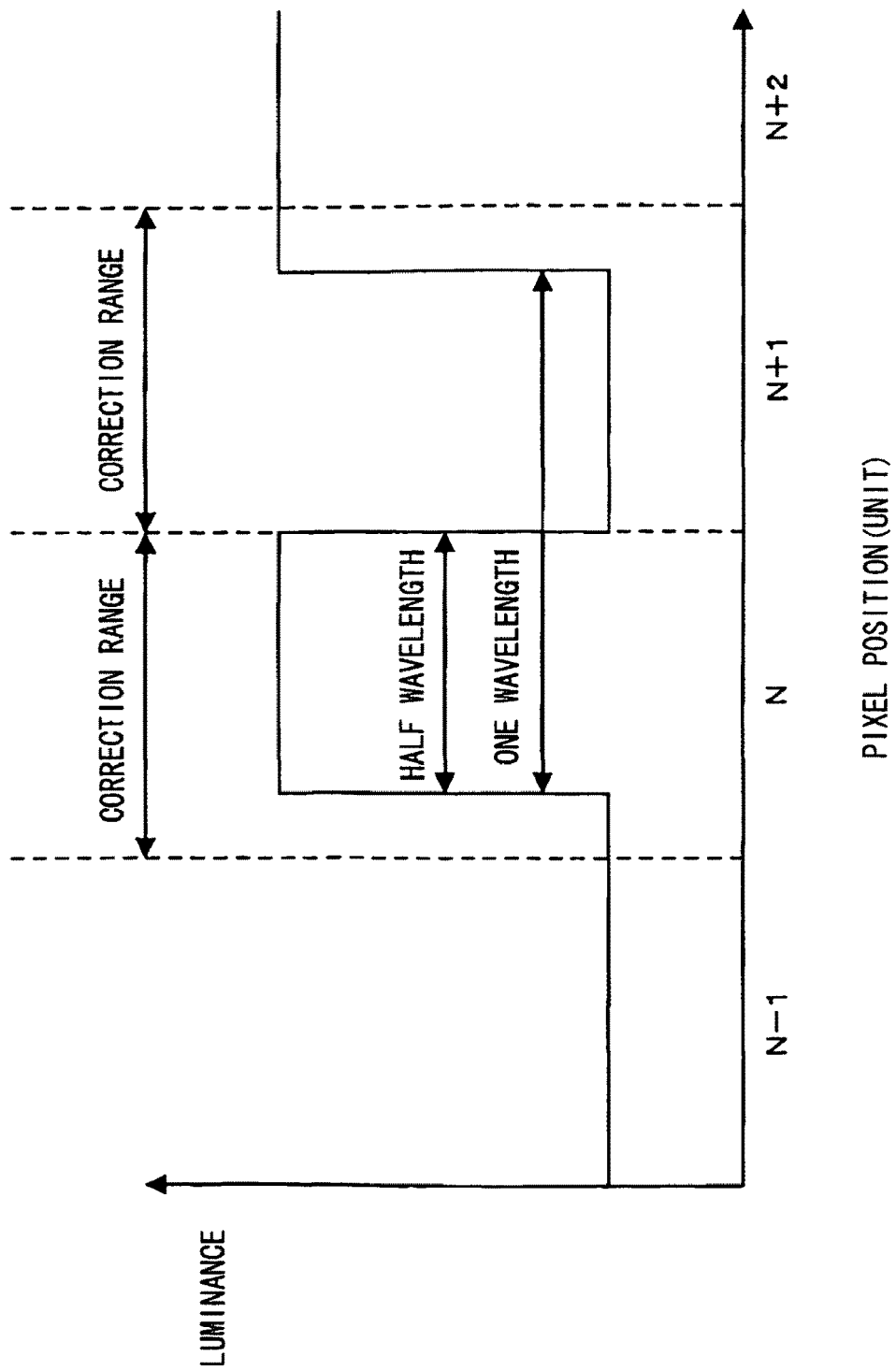
FIG. 13 is an explanation view for explaining a function of a high frequency detection section according to the first embodiment.

The high frequency detection section 144 detects the high frequency signal having the spatial frequency in the input image data within the correction range, based on the information on the correction range transmitted from the correction range set section 141. Here, the term "high frequency signal" means the signal having a half-wavelength (½ wavelength), whose range is smaller than that of the correction range, as illustrated in FIG. 13. That is, the high frequency detection section 144 detects the signal with the wavelength shorter than twice the correction range, as the high frequency signal. This is because, in the case of the high frequency signal, since both the rise area and the fall area are within the correction range, the proper process may not be performed. The detected high frequency signal is output to the gain adjustment section 148, and is used for the gain adjustment after the process with the filter process section 147.

Based on the information on the maximum value and the minimum value of the input signal transmitted from the maximum-value minimum-value detection section 142, the outside replacement section 145 performs the outside replacement on the input image data (input signal), through use of the maximum value and the minimum value. The replaced input image data (input signal) is transmitted to the filter process section 147.

Based on the input image data, the information on the correction range and the motion vector transmitted from the correction range set section 141, and the response time information extracted from the response time information storage section 130, the filter set section 146 sets the characteristics of the spatial filter for correcting the pixel value in the input image data, so that the image with the gradation which is set based on the input image data is displayed, when the display device 200 displays the frame to be displayed. Naturally, the filter characteristics are applied to only the pixels positioned within the correction range. As the spatial filter according to the first embodiment, for example, the travel-average filter such as a low pass filter (LPF) may be used. As the filter characteristics according to the first embodiment, for example, there is the region to be filtered, the tap number of the filter, or the like. Such filter characteristics may be realized by appropriately setting a filter coefficient of a filter matrix. The information on the filter characteristics set in this manner is transmitted to the filter process section 147.

Figure 14:
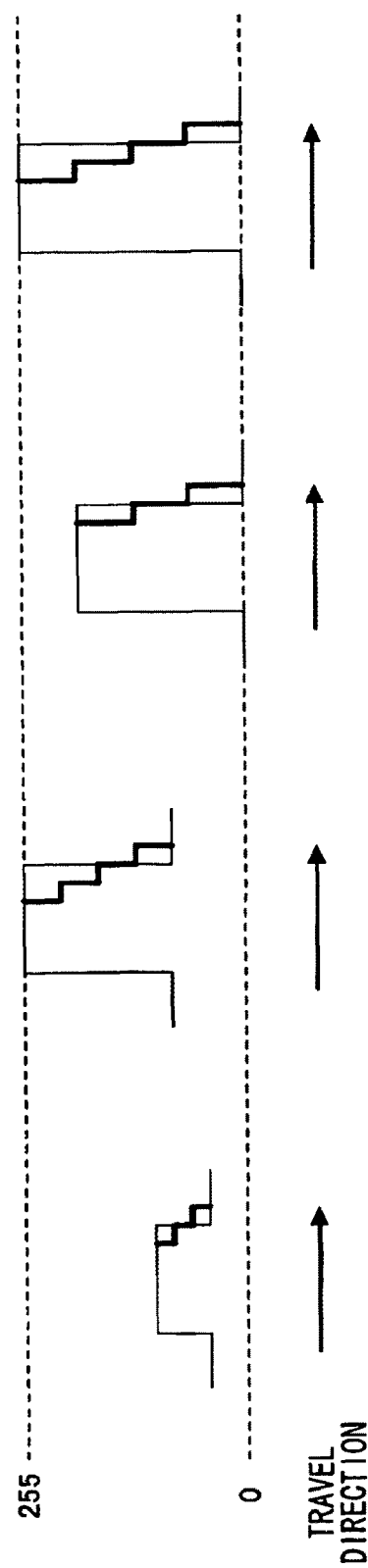
FIG. 14 is an explanation view illustrating a setting example of filter characteristics with a filter setting section according to the first embodiment.
Figure 15:
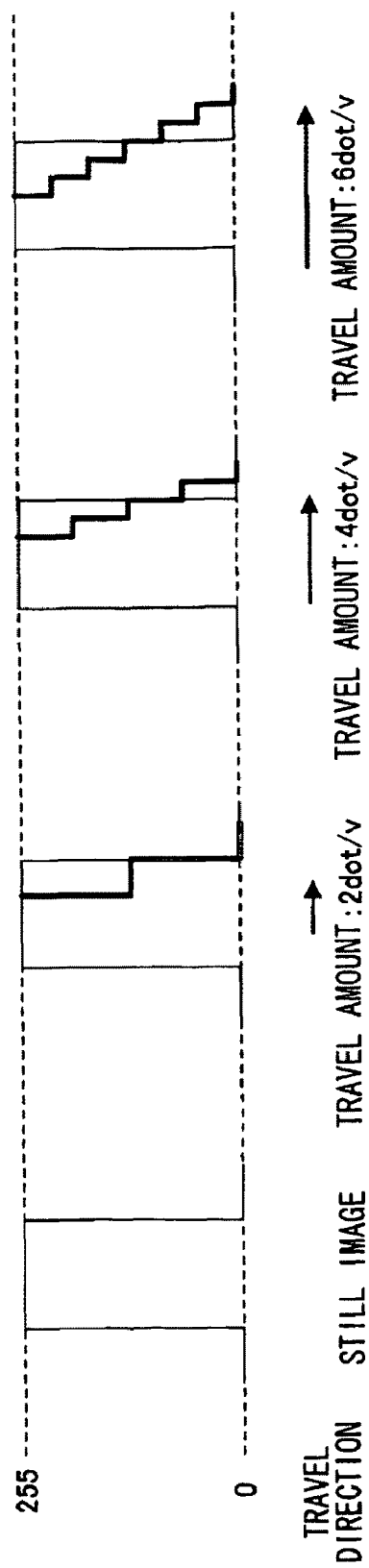
FIG. 15 is an explanation view illustrating the setting example of the filter characteristics with the filter setting section according to the first embodiment.

Here, with reference to FIGS. 14 and 15, setting examples of the filter characteristics will be described. FIGS. 14 and 15 are explanation views illustrating the setting examples of the filter characteristics with the filter set section 146 according to the first embodiment.

FIG. 14 illustrates the setting example where the filter characteristics different from each other are set for the rise and the fall of the display element (liquid crystal or the like). In this example, the filter is applied to only the rise region of the edge. In FIG. 14, as the input signal, exemplified are four types of the step signals traveling from left to right in the figure, and the maximum value (maximum luminance), the minimum value (minimum luminance), and the edge height (difference between the maximum value and the minimum value) are different from each other in the four types of the step signals. In FIG. 14, the numerical values "255" and "0" indicate the luminance of each pixel.

As illustrated in FIG. 14, although the correction amount of the pixel value in each pixel is different depending on the magnitude of gray-scale variation (difference between the maximum value and the minimum value in the luminance), the filter characteristics in which the filter is applied only to the rise region of the edge may be set. Specifically, although not illustrated in FIG. 13, for example, it is possible to set the filter characteristics described below. The filter set section 146 obtains the information on the edge direction detected with the edge detection section 143, and determines from the direction of the gradation change in the changing edge portion whether it is the rise region or the fall region. Only in the case where it is determined as the rise region, the filter characteristics are applied.

Next, FIG. 15 illustrates an example of setting the tap number in the spatial filter, in accordance with the motion vector amount of the input image data. In this example, the tap number in the filter changes in proportion to the motion vector amount. In FIG. 15, as the input signal, exemplified are the four types of step signals traveling from left to right in the figure with the travel amount (motion vector amount) different from each other. From the left in the figure, there are the step signal of an still image (travel amount 0 dot/v), the step signal with the travel amount of 2 dot/v, the step signal with the travel amount of 4 dot/v, and the step signal with the travel amount of 6 dot/v. In FIG. 15, the numerical values "255" and "0" indicate the luminance of each pixel.

In the example illustrated in FIG. 15, the filter set section 146 sets the filter characteristics in which the tap number is set to the number equal to the motion vector amount (pixel number) of the input image data (for example, when the travel amount is 2 dot/v, the tap number is 2). In this manner, as the motion vector amount of the input image signal is large (as the travel speed is fast), the tap number of the filter increases. Thus, as the motion vector amount of the input image signal is large (as the travel speed is fast), the correction process may be performed with the smaller and more precise pixel value.

Therefore, according to the image processing device 100 of the first embodiment, as the motion vector amount of the input image data is large, the motion blur in the hold type display device 200 may be more efficiently suppressed.

In the frame previous to the frame to be displayed in the display device 200, the filter process section 147 applies the filter, which has the filter characteristics set with the filter set section 146, on the input image data after being subjected to the outside replacement, which is transmitted from the outside replacement section 145. Thereby, the pixel value of the pixel positioned within the correction range is corrected. The input image data in which the pixel value is corrected is transmitted to the gain adjustment section 148. The filter process section 147 according to the first embodiment applies the filter on the input image data after being subjected to the outside replacement. However, it is not always necessary to apply the filter on the input image data after subjected to the outside replacement, and the filter may be applied on the input image data itself.

To prevent the error in the high frequency, the gain adjustment section 148 performs the gain adjustment on the corrected input image data transmitted from the filter process section 147, based on the high frequency signal transmitted from the high frequency detection section 144. The input image data after being subjected to the gain adjustment is transmitted to the selection section 149.

To the selection section 149, the detection result of the edge detection section 143, for example, the information on the changing edge portion and the edge direction transmitted from the edge detection section 143, the input image data, in which the pixel value is corrected, transmitted from the filter process section 147, the input image data itself, in which the pixel value is not corrected, extracted from the input image data storage section 110, or the like is input. The selection section 149 selects one of the input image data in which the pixel value is corrected with the filter process section 147, and the input image data in which the pixel value is not corrected with the filter process section 147, according to the input information on the changing edge portion and the edge direction. Moreover, only in the case where the selection section 149 selects the input image data in which the pixel vale is corrected (filter process is performed), the selection section 149 outputs the input image data in which the pixel vale is corrected to the synthesis section 150. More specifically, for example, the selection section 149 selects the input image data in which the pixel value is corrected, in the case where it is determined that the changing edge portion is in the rise region from the low gradation to the high gradation, based on the edge direction. On the other hand, the selection section 149 selects the input image data in which the pixel value is not corrected, in the case where it is determined that the changing edge portion is in the fall region from the low gradation to the high gradation, based on the edge direction. By performing such a process, it is possible to apply the filter to only the rise region, as described with FIG. 14.

In the first embodiment, the selection section 149 is arranged in the rear stage of the filter process section 147. Both the input image data filter-processed with the filter process section 147 and the input image data itself input from the outside are input to the selection section 149. The selection section 149 employs the method of selecting the input image data from the filter-processed input image data input from the filter process section 147, and the input image data input from the outside. However, it is not limited to such a method. For example, before the filter process with the filter process section 147, the selection section 149 previously determines whether or not the filter process is performed. In the case where the selection section 149 determines to perform the filter process (for example, in the case where it is determined that the changing edge portion is in the rise region), the filter process section 147 may perform the filter process.

In the case where the filter-processed input image data is input from the selection section 149 to the synthesis section 150, the synthesis section 150 synthesizes the input image data itself (in which the filter process is not performed) input from the outside and the filter-processed input image data, and outputs the synthesized input image data to the output section 160. On the other hand, in the case where the filter-processed input image data it not input from the selection section 149 to the synthesis section 150, the synthesis section 150 outputs the input image data itself input from the exterior, which is not filter-processed, to the output section 160.

Configuration Example of the Display Device 200

Hereinbefore, the functional configuration of the image processing device 100 is described in detail. Next, with reference to FIG. 11, the configuration of the display device 200 will be described. As illustrated in FIG. 11, the display device 200 is the hold type display device, and includes an image display section 210, a source driver 220, a gate driver 230, and a display control section 240.

The image display section 210 displays the image corresponding to the display image data input from the image processing device 100. For example, the image display section 210 is a dot-matrix type display with an arrangement of m×n. As the specific example of the image display section 210, for example, there are an active-matrix type OLED (organic light emitting diode) display using an a-Si (amorphous silicon) TFT, and the LCD.

The source driver 220 and the gate driver 230 are drive means for driving the image display section 210 having the m×n arrangement. Among them, the source driver 220 supplies the data signal to a data line 221, and the gate driver 230 supplies the select signal (address signal) to a scanning line 231.

The display control section 240 controls the drive (drive of the source driver 220 and the gate driver 230) of the image display section 210, based on the display image data input from the image processing device 100 to the display control section 240. More specifically, at the necessary timing, the display control section 240 outputs the control signal to be supplied to each driver (the source driver 220 and the gate driver 230) circuit, based on the display image data (video signal) obtained from the image process section 100.

Hereinbefore, the example of the functions of the image process device 100 and the display device 200 according to the first embodiment is described. Each component described above may be configured through use of a versatile member and a versatile circuit, or may be configured with a hardware specialized in the functions of each component. Alternatively, a CPU or the like may have all the functions of each component. Therefore, the utilized configuration may be appropriately changed according to the technical level when the first embodiment is implemented.

Hardware Configuration of the Image Processing Device 100

Figure 16:
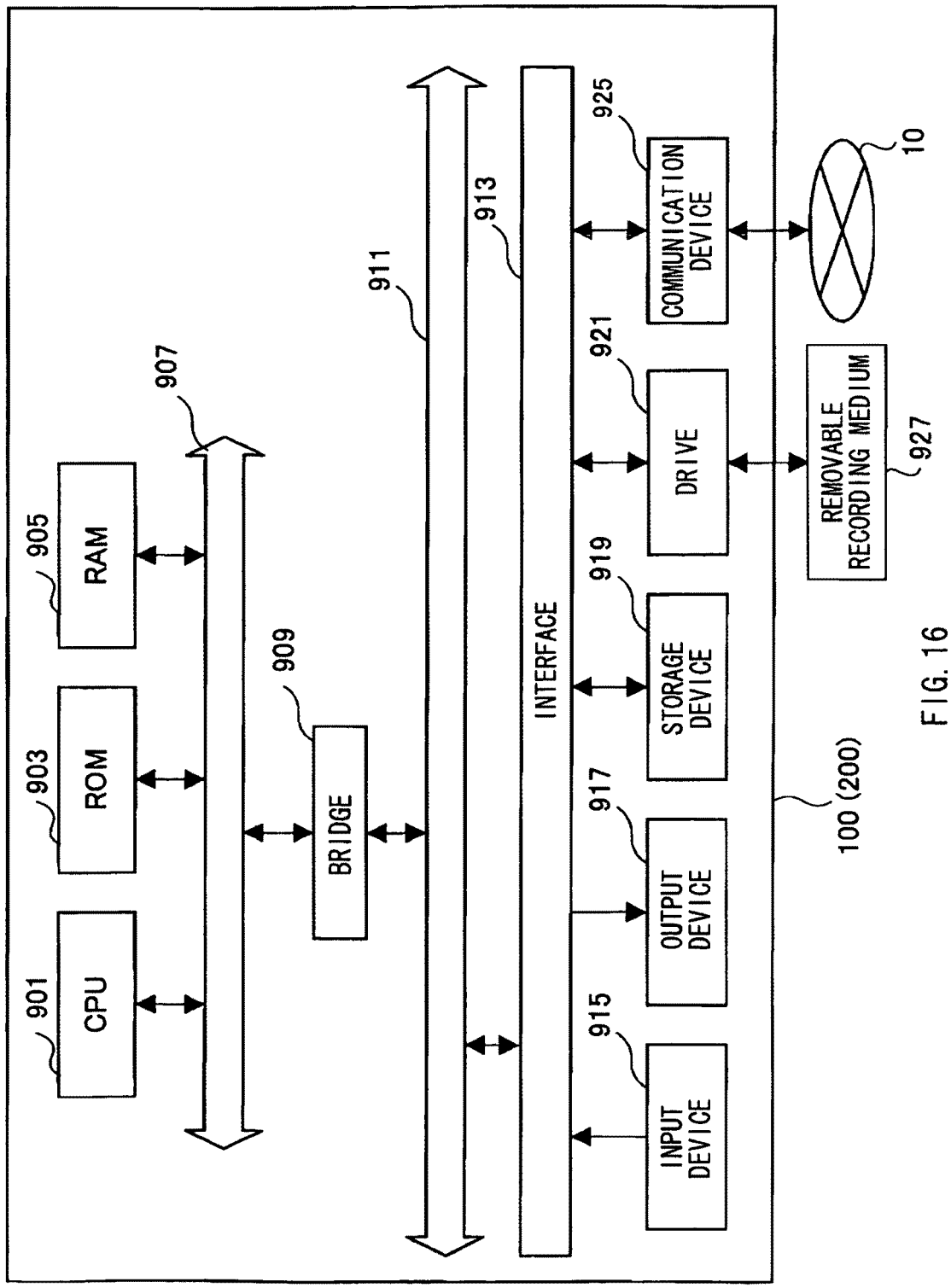
FIG. 16 is a block diagram illustrating a hardware configuration of the image processing device according of the first embodiment.

Next, with reference to FIG. 16, the hardware configuration of the image processing device 100 according to the first embodiment will be described. FIG. 16 is a block diagram illustrating the hardware configuration of the image processing device according to the first embodiment.

The image processing device 100 mainly includes a CPU (central processing unit) 901, an ROM (read only memory) 903, an RAM (random access memory) 905, a host bus 907, a bridge 909, an external bus 911, an interface 913, an input device 915, an output device 917, a storage device 919, a drive 921, a connecting port 923, and a communication device 925.

The CPU 901 functions as a calculation process device and a control device, and controls whole or a part of operation in the image processing device 100, in accordance with various programs stored in the ROM 903, the RAM 905, the storage device 919, or a removable recording medium 927. The ROM 903 stores the program, calculation parameters, or the like used by the CPU 901. The RAM 905 temporarily stores the program used for executing the CPU 901, the parameter appropriately changing in the execution of the CPU 901, or the like. The CPU 901, the ROM 903, the RAM 905 or the like is mutually connected with an internal bus of the CPU bus, or the like.

The host bus 907 is connected to the external bus 911 such as a PCI (peripheral component interconnect/interface) bus, through the bridge 909.

The input device 915 is, for example, an operation means such as a mouse, a key board, a touch panel, a button, a switch, and a lever operated by users. The input device 915 may be, for example, a remote control means (so-called remote controller) utilizing an infrared ray and another radio wave, or may be an external connection device 929 such as a cell-phone and a PDA, corresponding to the operation of the image processing device 100. Moreover, for example, the input device 915 is configured with an input control circuit or the like generating the input signal based on the information input by the user through use of the above-described operation means, and outputting the input signal to the CPU 901. By operating the input device 915, the user using the image processing device 100 may input various data, and instruct operations, to the image processing device 100.

The output device 917 is, for example, configured with a device capable of visually or auditorily notifying the obtained information to the user, such as a display device including a CRT display device, a liquid crystal display device, a plasma display device, an EL display device, and a lamp, or such as an audio output device including a speaker and a headphone, or such as a printer, a cell-phone, and a facsimile. Specifically, the display device displays various information such as an image data, in a text or an image. On the other hand, the audio output device converts an audio data or the like to a sound.

The storage device 919 is a device for data storage, which is configured as an example of a storage section in the image processing device 100 according to the first embodiment, and includes, for example, a magnetic storage section device such as an HDD (hard disk drive), a semiconductor storage device, an optical memory device, a magneto optical storage device, or the like. The storage device 919 stores the program executed with the CPU 901, various data, the image signal data obtained from the outside, or the like.

The drive 921 is a reader/writer for recording medium, and is disposed outside or installed in the image signal process device. The drive 921 reads the information stored in a removable recording medium 927 provided therein, such as a magnetic disk, an optical disk, and a magneto optical disk, or a semiconductor memory, and outputs the information to the RAM 905. The drive 921 may write the information onto the removable recording medium 927 provided therein, such as the magnetic disk, the optical disk, the magneto optical disk, and the semiconductor memory, and outputs the information to the RAM 905. The removable recording medium 927 is, for example, a DVD medium, an HD-DVD medium, a blu-ray medium, a compactflash (registered trademark) (CF), a memory stick, a SD memory card (secure digital memory card), or the like. The removable recording medium 927 may be, for example, an IC card (integrated circuit card) equipped with a contactless IC chip, an electronic device, or the like.

The connecting port 923 is, for example, a port for directly connecting a device such as an USB (universal serial bus) port, an IEEE 1394 port such as an i. Link, a SCSI (small computer system interface) port, an RS-232C port, and an optical audio terminal, to the image processing device 100. An outside connecting device 929 is connected to the connecting port 923, thereby the image processing device 100 directly obtains the image signal data from the external connecting device 929, and supplies the image signal data to the external connecting device 929.

The communication device 925 is, for example, a communication interface configured with a communication device for connecting the communication device 925 to a communication network 10. The communication device 925 is, for example, a wired or wireless LAN (local area network), a bluetooth, a communication card for WUSB (wireless USB), a router for optical communication, a router for ADSL (asymmetric digital subscriber line), or a modem for various communication. With the communication device 925, for example, the image signal or the like may be transmitted and received between the Internet and another communication device, and the display device 200. The communication network 10 connected to the communication device 925 is configured with the network or the like connected to the communication device 925 by wire or wirelessly, and, for example, may be the Internet, the LAN for one's house, an infrared ray communication, or a satellite communication.

With the configuration described above, the image processing device 100 obtains the information on the input image signal, from various information sources such as the external connecting device 929 connected to the connecting port 923 or the communication network 10, and may transmit the image signal to the display device 200.

The hardware configuration of the display device 200 according to the first embodiment is substantially similar to that of the image processing device 100, thereby the description is omitted.

Figure 17:
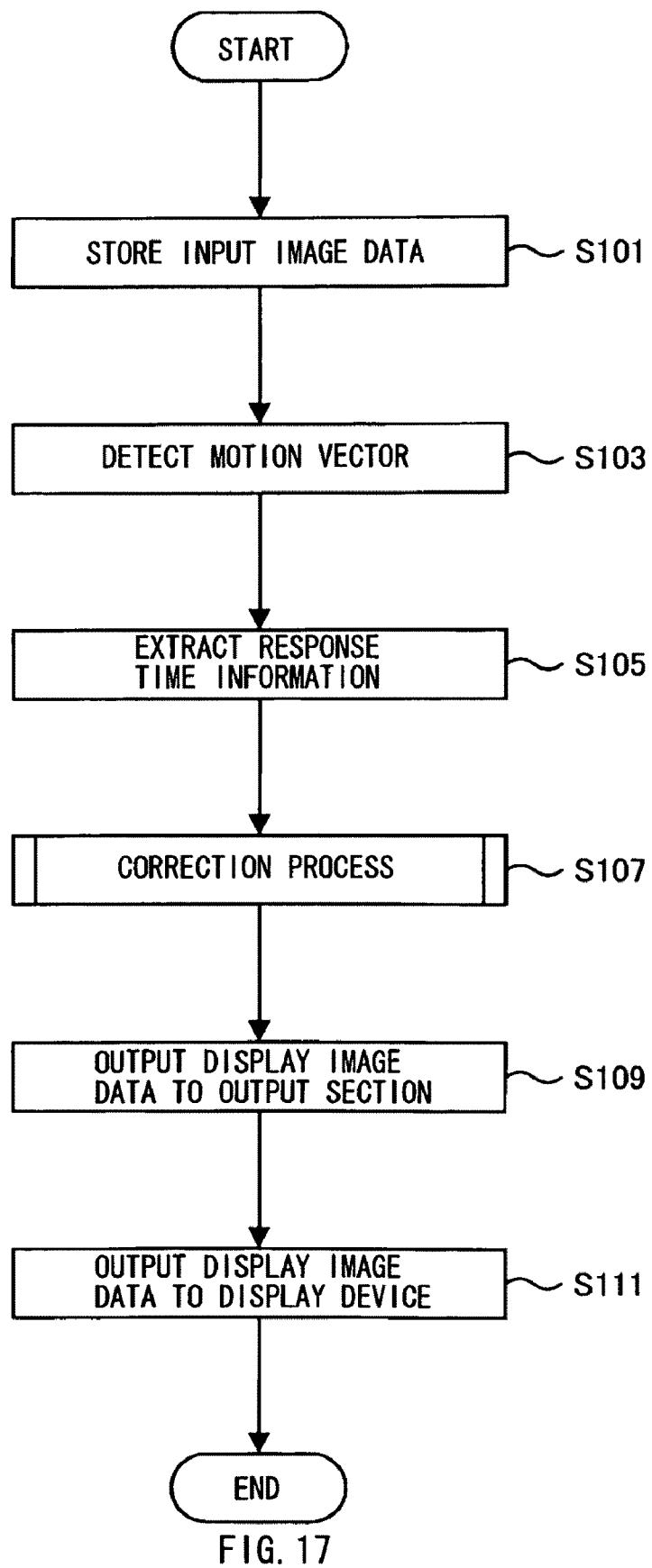
FIG. 17 is a flow chart illustrating a process flow in the image processing method according to the first embodiment.

Hereinbefore, the example of the hardware configuration capable of realizing the functions of the image processing device 100 and the display device 200 according first embodiment is described. Each component described above may be configured through use of the versatile member, or may be configured with the hardware specializing in the functions of each component. Therefore, the utilized hardware configuration may be appropriately changed according to the technical level at the time when the first embodiment is implemented.
Process Flow in the Method of Processing the Image According to the First Embodiment of the Present Invention Hereinbefore the configuration of the image processing device 100 and the display device 200 according to the first embodiment is described in detail. Next, with reference to FIG. 17, the method of processing the image according to the first embodiment which employs the image processing device 100 having such a configuration will be described in detail. FIG. 17 is a flow chart illustrating the process flow in the method of processing the image according to the first embodiment.

In the method of processing the image according to the first embodiment, the input image data input from the outside to the image processing device 100 is processed, thereby the display image data to be outputted to the hold type display device 200 is generated.

Specifically, as illustrated in FIG. 17, when the input image data is input from the outside to the image processing device 100, the input image data is stored in the input image data storage section 110 (S101), and is input to the motion vector detection section 120 at the same time.

When the input image data in the frame to be displayed is input to the motion vector detection section 120, the motion vector detection section 120 extracts, for example, the input image data in the frame previous to the frame to be displayed, from the input image data storage section 110. The motion vector detection section 120 compares the input image data in the frame to be displayed with the input image data in the frame previous to the frame to be displayed. The motion vector detection section 120 focuses on the object moving in the display image, and detects the motion vector of the input image in the frame to be displayed, based on the direction and distance which the object moves (S103). The detected motion vector is transmitted to the correction process section 140 or the like.

Next, when the input image data in the frame to be displayed is input from the outside to the correction process section 140, the correction process section 140 extracts the response time information corresponding to the magnitude of gray-scale variation of each pixel in the frame to be displayed, from the response time information storage section 130 (S105). Based on the input image data input from the outside, the motion vector input from the motion vector detection section 120, and the response time information extracted from the response time information storage section 130, the correction process section 140 performs the correction process correcting, for each pixel constituting the frame, the pixel value in the input image data, in the frame previous to the frame to be displayed (S107). As the result of the correction process, the display image data is generated, and the correction process section 140 outputs the generated display image data to the output section 160 (S109).

When the display image data is input from the correction process section 140 to the output section 160, the output section 160 outputs the input display image data to the display device 200 (S111).

Figure 18:
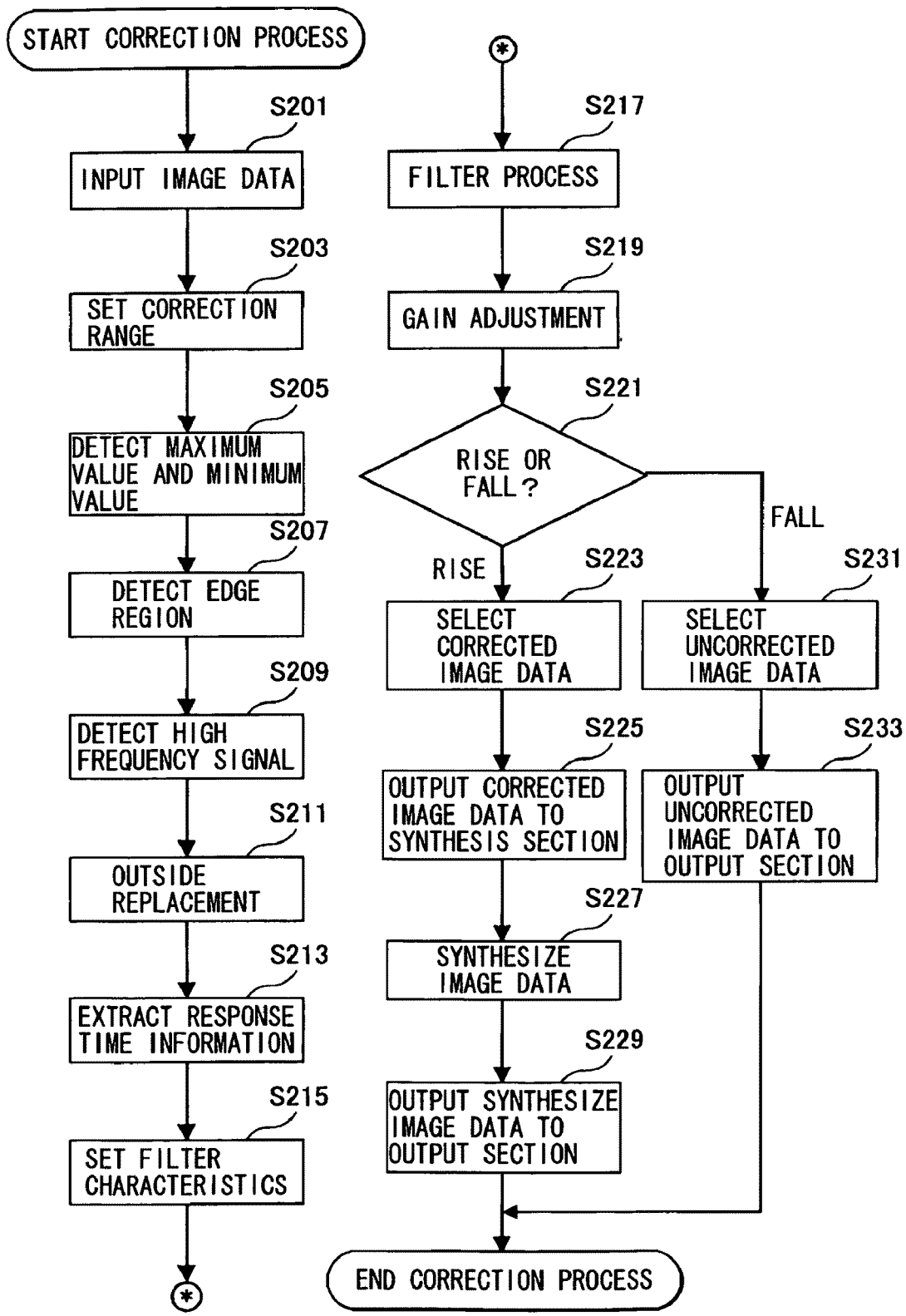
FIG. 18 is a flow chart illustrating a specific example of a correction process according to the first embodiment.

Here, with reference to FIG. 18, the specific example of the correction process step (S107) according to the first embodiment will be described. FIG. 18 is the flow chart illustrating the specific example of the correction process according to the first embodiment.

As illustrated in FIG. 18, when the input image data is input from the outside to the correction process section 140 (S201), first, the correction range set section 141 sets the correction range for correcting the pixel value in the input image data, based on the motion vector input from the motion vector detection section 120 (S203). Specifically, the correction range set section 141 detects the region where the motion exists in the input image data (portion corresponding to the moving object), and sets the pixels positioned in the region where the motion exists as the correction range. Moreover, the correction range set section 141 transmits the information on the set correction range, and the information on the input motion vector, to the maximum-value minimum-value detection section 142, the edge detection section 143, the high frequency detection section 144, the filter set section 146, and the like.

Next, based on the information on the correction range, transmitted from the correction range set section 141, the maximum-value minimum-value detection section 142 detects the maximum value and the minimum value of the input image data (input signal) within the correction range (S205). Moreover, the maximum-value minimum-value detection section 142 transmits the information on the maximum value and the minimum value of the detected input signal, to the edge detection section 143, the outside replacement section 145, and the like.

Next, based on the information on the correction range and the input information on the motion vector, transmitted from the correction range set section 141, and the information on the maximum value and the minimum value of the input signal, transmitted from the maximum-value minimum-value detection section 142, the edge detection 143 section detects the edge region in the input image data (input signal) (S207). At this time the edge detection section 143 detects not only the position (changing edge portion) where there is the edge, but also the edge direction in the changing edge portion (whether it is the direction of the change from the low gradation to the high gradation, or the direction of the change from the high gradation to the low gradation). Moreover, the edge detection section 143 transmits the detected information on the changing edge portion and the edge direction, to the selection section 149.

Next, the high frequency detection section 144 detects the high frequency signal having the spatial frequency in the input image data within the correction range, based on the information on the correction range transmitted from the correction range set section 141 (S209). Here, the term "high frequency signal" means the signal having a half-wavelength (½ wavelength), whose range is smaller than that of the correction range. That is, the high frequency detection section 144 detects the signal with the wavelength shorter than twice the correction range, as the high frequency signal. This is because, in the case of the high frequency signal, since both the rise area and the fall area are within the correction range, the proper process may not be performed. The high frequency detection section 144 outputs the detected high frequency signal to the gain adjustment section 148, and the output high frequency signal is used for the gain adjustment after the process with the filter process section 147.

Next, based on the information on the maximum value and the minimum value of the input signal transmitted from the maximum-value minimum-value detection section 142, the outside replacement section 145 performs the outside replacement on the input image data (input signal), with the maximum value and the minimum value (S211). The outside replacement section 145 transmits the replaced input image data (input signal) to the filter process section 147.

Next, when the input image data in the frame to be displayed is input from the outside to the filter set section 146, and the information on the correction range and the motion vector is transmitted from the correction range set section 141 to the filter set section 146, the filter set section 146 extracts the response time information corresponding to the magnitude of gray-scale variation of each pixel in the frame to be displayed, from the response time information storage section 130 (S213).

Based on the input image data, the information on the correction range, the motion vector, and the response time information, the filter set section 146 sets the characteristics of the spatial filter for correcting the pixel value in the input image data, so that the image with the gradation which is set based on the input image data is displayed, when the display device 200 displays the frame to be displayed (S215). As the spatial filter according to the first embodiment, for example, the travel-average filter such as a low pass filter (LPF) may be used. As the filter characteristics according to the first embodiment, for example, there is the region to be filtered, the tap number of the filter, or the like. Such filter characteristics may be realized by appropriately setting the filter coefficient of the filter matrix. The filter set section 146 transmits the information on the filter characteristics set in this manner to the filter process section 147.

Next, in the frame previous to the frame to be displayed in the display device 200, the filter process section 147 applies the filter, which has the filter characteristics set with the filter set section 146, on the input image data after being subjected to the outside replacement, which is transmitted from the outside replacement section 145. Thereby, the pixel value of the pixel positioned within the correction range is corrected (S217). Moreover, the filter process section 147 transmits the input image data in which the pixel value is corrected to the gain adjustment section 148. The filter process section 147 according to the first embodiment applies the filter on the input image data after being subjected to the outside replacement. However, it is not always necessary to apply the filter on the input image data after subjected to the outside replacement, and the filter may be applied on the input image data itself.

To prevent the error in the high frequency, the gain adjustment section 148 performs the gain adjustment on the corrected input image data transmitted from the filter process section 147, based on the high frequency signal transmitted from the high frequency detection section 144 (S219). The gain adjustment section 148 transmits the input image data after being subjected to the gain adjustment to the selection section 149.

When the detection result of the edge detection section 143, the input image data in which the pixel value is corrected, transmitted from the filter process section 147, the input image data itself in which the pixel value is not corrected, extracted from the input image data storage section 110, or the like is input to the selection section 149, the selection section 149 selects one of the input image data in which the pixel value is corrected with the filter process section 147, and the input image data in which the pixel value is not corrected with the filter process section 147, according to the input information on the changing edge portion and the edge direction. Specifically, for example, the selection section 149 determines whether the changing edge portion is in the rise region from the low gradation to the high gradation, or the changing edge portion is in the fall region from the high gradation to the low gradation (S221) based on the edge direction.

As the result of this determination, the selection section 149 selects the input image data in which the pixel value is corrected, in the case where it is determined that the changing edge portion in the input image data is in the rise region (S223). Then, the selection section 149 outputs the input image data in which the pixel value is corrected (filter process is performed) to the synthesis section 150 (S225).

On the other hand, as the result of the determination in step S221, the selection section 149 selects the input image data in which the pixel value is not corrected, in the case where it is determined that the changing edge portion in the input image data is in the fall region (S227).

Finally, in the case where the filter-processed input image data is input from the selection section 149 to the synthesis section 150, the synthesis section 150 synthesizes the input image data itself (in which the filter process is not performed) input from the exterior and the filter-processed input image data (S229), and outputs the synthesized input image data to the output section 160 (S231). On the other hand, in the case where the filter-processed input image data it not input from the selection section 149 to the synthesis section 150, the synthesis section 150 outputs the input image data itself input from the exterior, which is not filter-processed, to the output section 160 (S233).

In the first embodiment, the selection process with the selection section 149 is performed after the filter process with the filter process section 147. The selection section 149 selects one of the input filter-processed image data, and the input image data input from the outside. However, it is not limited to such a case. For example, before the filter process with the filter process section 147 is performed, the selection section 149 previously determines whether or not the filter process is performed. In the case where the selection section 149 determines to perform the filter process (for example, in the case where it is determined that the changing edge portion is in the rise region), the filter process section 147 may perform the filter process.

Second Embodiment

Next, a second embodiment of the present invention will be described. Same reference numerals as in the above first embodiment are used to indicate substantially identical components, thereby the description is appropriately omitted.

Configuration of Whole Image Processing Device

Figure 19:
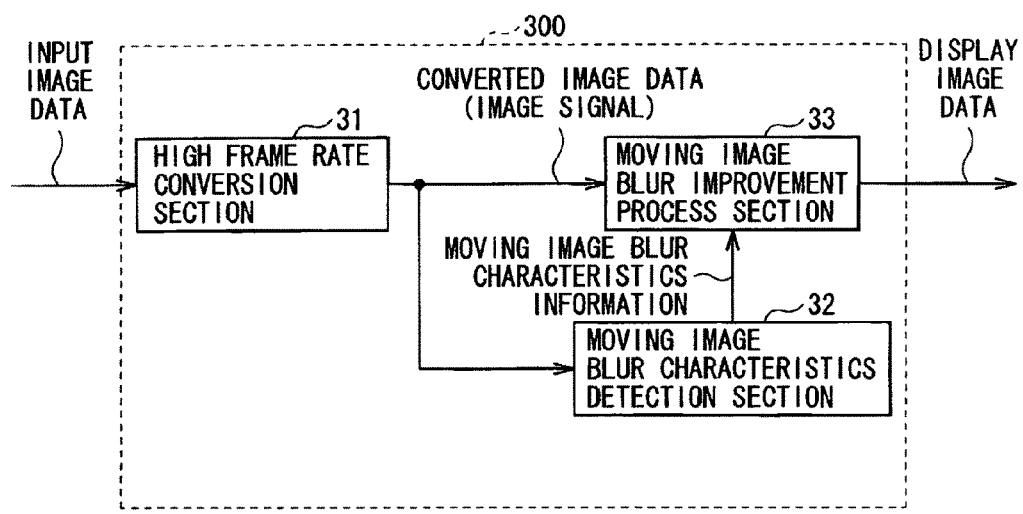
FIG. 19 is a block diagram illustrating the configuration of the image processing device according to a second embodiment of the present invention.

FIG. 19 illustrates the block configuration of the image processing device (an image processing device 300) according to the second embodiment of the present invention. The image processing device 300 includes a high frame rate conversion section 31, a moving image blur characteristics detection section 32, and a moving image blur improvement process section 33. The configuration of the display device in the image display system according to the second embodiment is similar to that of the display device 200 in the image display system 10 according to the first embodiment illustrated in FIG. 11, thereby the description is omitted.

The high frame rate conversion section 31 performs the high frame rate conversion process on the input image data (for example, the moving image signal such as a television broadcast signal) input from the exterior, in a frame unit, and generates and outputs a converted image data (image signal). Specifically, the high frame rate conversion section performs the high frame rate conversion process on the input image data having a first frame rate. The high frame rate conversion section 31 outputs the converted image data obtained as the result, which has a second frame rate higher than the first frame rate, to the moving image blur characteristics detection section 32 and the moving image blur improvement process section 33. The high frame rate conversion process is the process performed in the case where the first frame rate at the time of the input is lower than the second frame rate at the time of the output (display), and indicates the conversion process in which the first frame rate is converted to the second frame rate which is higher than the first frame rate, by forming and inserting a new frame between the frames constituting moving image at the time of the input.

The first frame rate indicates the frame rate of the moving image when the moving image is input to the high frame rate conversion section 31. Therefore, the first frame rate may be any frame rate. However, here, for example, the first frame rate is the frame rate when the moving image is imaged with an imaging device which is not illustrated in the figure, that is, an image pickup frame rate. Moreover, hereafter, in the case where it is unnecessary to individually distinguish the moving image and the moving image data corresponding to the moving image, the moving image and the moving image data are simply referred to as the moving image, as a whole. Similarly, in the case where it is unnecessary to individually distinguish the frame and the frame data corresponding to the frame, the frame and the frame data corresponding to the frame are simply referred to as the frame.

The moving image blur characteristics detection section 32 detects the information indicating the moving image characteristics (moving image characteristics information), for each frame constituting the converted image data (image signal) supplied from the high frame rate conversion section 31. The detected moving image blur characteristics information is supplied to the moving image blur improvement process section 33. As the moving image blur characteristics information, for example, the motion vector may be used.

Hereafter, the value of the motion vector is referred to as a travel speed (travel amount), and the direction of the motion vector is referred to as a travel direction. The travel direction may be any direction on a two-dimensional plane. Even in the case where the travel direction is in any direction on the two-dimensional plane, the image processing device 300 may perform various processes which will be described later, in exactly the same way. However, for ease of description, it is assumed that the travel direction is in the lateral direction. Moreover, the detected number of the moving blur characteristics information in one frame is not specifically limited. For example, only one moving blur characteristics information may be detected for one frame, or one motion blur characteristics information may be individually detected for each pixel constituting the frame. Alternatively, the frame is divided to some blocks, and one moving blur characteristics information may be individually detected for each divided block.

Based on the value corresponding to the frame to be processed in the moving blur characteristics information detected with the motion blur characteristics detection section 32, the moving image blur improvement process section corrects each pixel value constituting the frame to be processed, in accordance with the characteristics of the display panel (image display section 210), for each frame constituting the converted image data (image signal) supplied from the high frame rate conversion section 11. Specifically, the moving image blur improvement process section 33 corrects each pixel value of the frame to be processed, in accordance with the characteristics of the moving image blur characteristics (value of the moving image blur characteristics information) in the frame to be processed, and the characteristics of the image display section 210, so that the moving image blur is suppressed when the display device 200 performs the display. The image data (display image data) generated with such a correction process is output to the image display device 200.

Configuration Example of the Moving Image Blur Improvement Process Section

Figure 20:
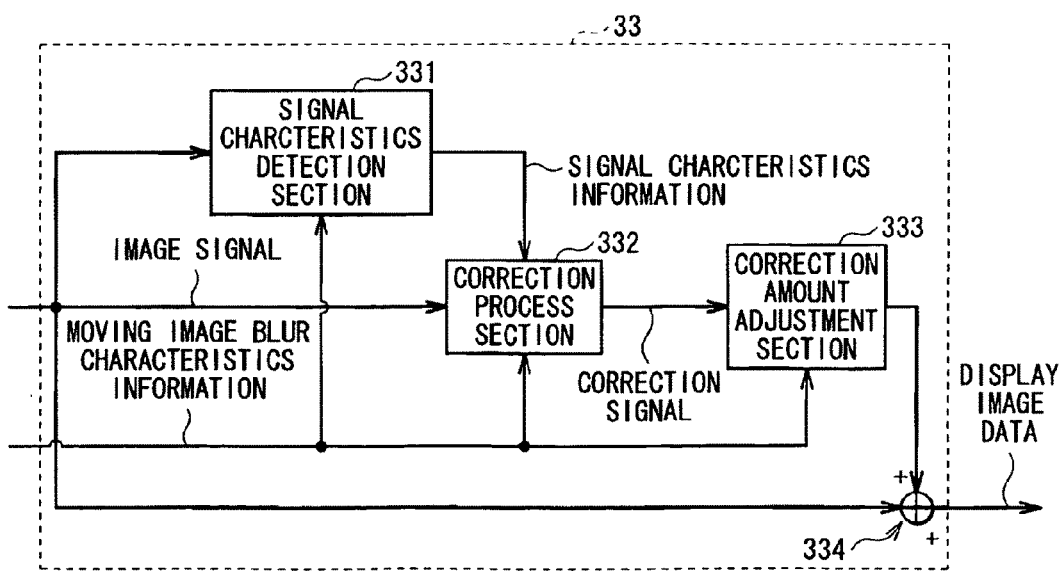
FIG. 20 is a block diagram illustrating a configuration example of a moving image blur improvement process section illustrated in FIG. 19.

FIG. 20 illustrates the block configuration of the moving image blur improvement process section 33. The moving image blur improvement process section 33 includes a signal characteristics detection section 331, a correction process section 332, a correction amount adjustment section 333, and an addition section 334.

The signal characteristics detection section 331 detects the predetermined signal characteristics information used at the time of the correction process in the correction process section 332, from the image signal (converted image data; hereafter the same is applied where appropriate), through use of the moving image blur characteristics information (for example, the motion vector, hereafter the same is true). As such signal characteristics information, for example, there are the MAX/MIN information, the spatial high frequency information, the spatial low frequency information, and the edge direction information. Among them, the MAX/MIN information means the information including the minimum value (MIN value, the minimum pixel value) of the luminance within the predetermined correction range (range corresponding to the search range which will be described later) and its pixel position, and the maximum value (MAX value, the maximum pixel value) of the luminance and its pixel position. The edge direction information is the information indicating whether the changing edge portion to be corrected in the image signal is in the rise direction from the low gradation to the high gradation, or in the fall direction from the high gradation to the low gradation. The signal characteristics detection section will be described later in detail (FIGS. 23 to 26C).

The correction process section 332 corrects the pixel value in the image signal for each pixel, by performing the spatial LPF (low pass filter) process and the spatial HPF (high pass filter) process, which will be described later, on the image signal, through use of the signal characteristics information detected in the signal characteristics detection section 331, and the moving image blur characteristics information detected in the moving image blur characteristics detection section 32. Such a processed image signal (correction signal) is output to the correction amount adjustment section 333. The correction process section 332 may perform the correction process without using the signal characteristics information, in some cases.

Figure 21A:
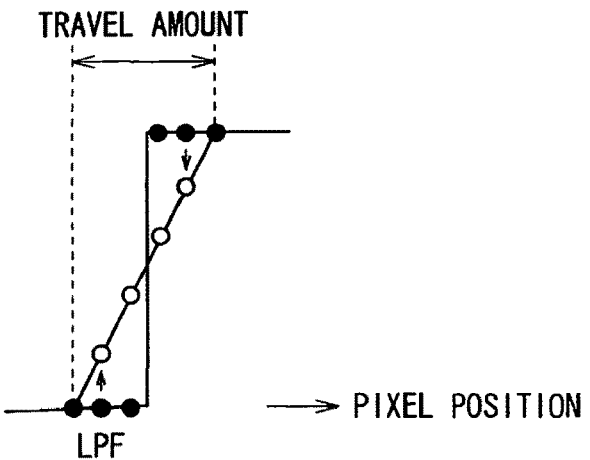
FIGS. 21A to 21C are waveform diagrams each for explaining an outline of the correction process with the correction process section illustrated in FIG. 20.
Figure 21B:
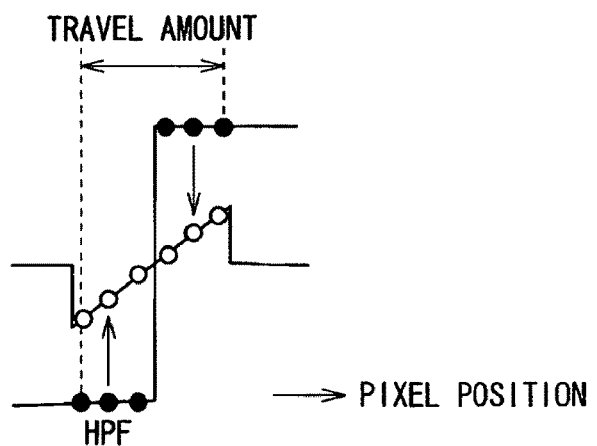
Figure 21C:
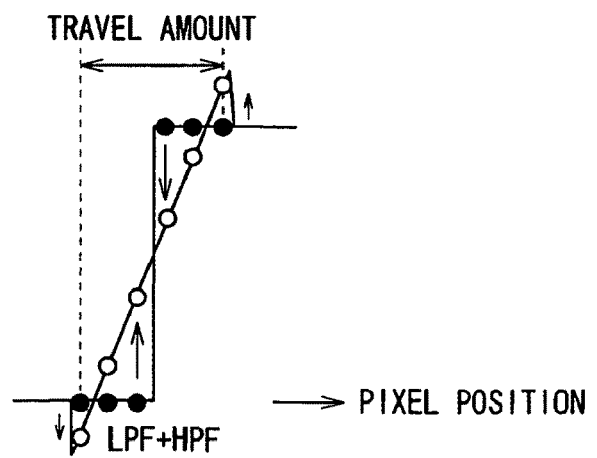

The LPF process and the HPF process described above are performed, for example, as illustrated in FIGS. 21A to 21C.

For example, as indicated with arrows in FIG. 21A, the LPF process is the filter process in which the slope of the changing edge portion in the image signal becomes gradual, within the correction range corresponding to the travel amount. The LPF process is also a motion-adaptable type, and, for example, the filter process of secondary differentiation. As will be described later, the LPF process is the asymmetric process in accordance with the edge direction (the rise direction or the fall direction)

For example, as indicated with arrows in FIG. 21B, the HPF process is the filter process in which projection regions are provided in the vicinity of both ends (the vicinity of the top and the bottom) of the changing edge portion in the image signal, within the correction range corresponding to the travel amount. Specifically, in the vicinity of the top of the changing edge portion (high gradation side), the projection regions called overshoot regions to the high gradation direction are provided, and in the vicinity of the bottom of the changing edge portion (low gradation side), the projections called undershoot regions to the low gradation direction are provided.

When such an LPF process and such an HPF process are combined (both processes are performed), for example, the filter process is generated as indicated with arrows in FIG. 21C. Each filter coefficient which will be described later is set, so that the changing edge portion after combining and performing the LPF process and the HPF process is in a straight waveform.

Figures 22, 23:
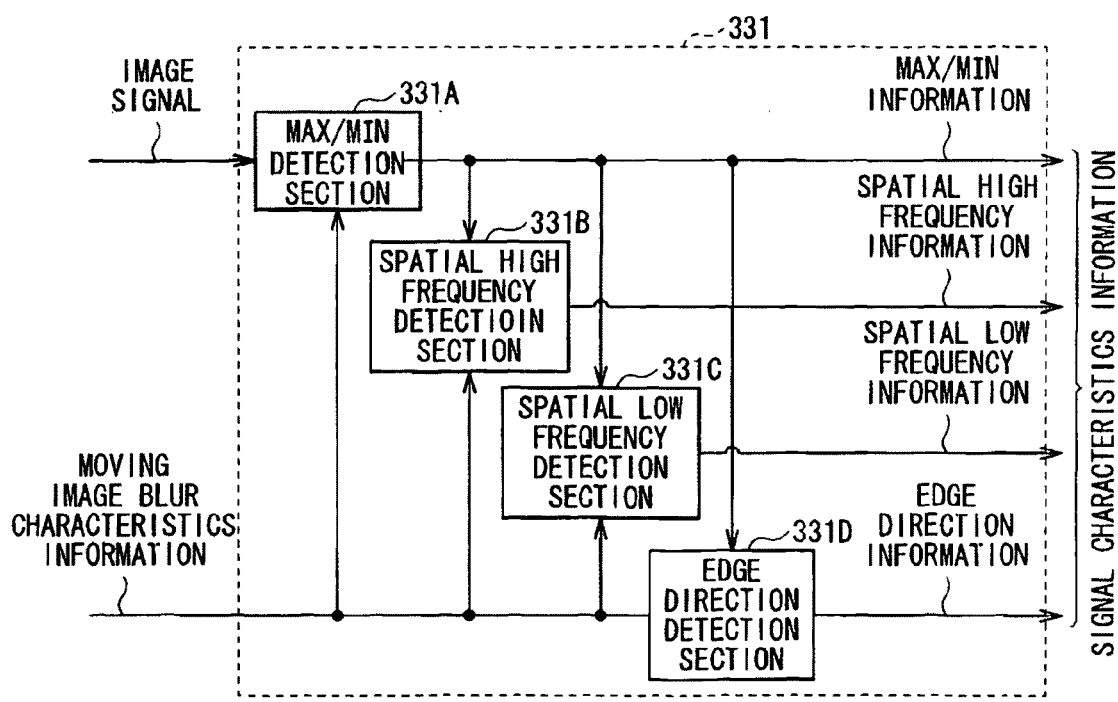
FIG. 22 is a view illustrating an example of the relationship between a travel amount and a tap number in an LPF and an HPF.
FIG. 23 is a block diagram illustrating a configuration example of a signal characteristics detection section illustrated in FIG. 20.

Here, as indicated in FIGS. 21A to 21C, at the time of the filter processes described above, the correction range is set according to the travel amount, and, as illustrated in FIG. 22, the tap number of the filters changes (increases) according to the travel amount. This is because, when the travel amount changes, the effective waveform with the filter process also changes. Specifically, according to FIG. 22, for example, in the case where the travel amount is an even number, the tap number of the LPF process is (travel amount−1), and the tap number of the HPF process is (travel amount+1). Thereby, the tap number of each filter process is set to be an odd number all the time, irrespective of the value of the travel amount. This is because, in the filter process with the tap number of the even number, the waveform is not in bilaterally symmetric at both ends of the edge.

The correction process section 332 will be described later in detail (FIGS. 27 to 40).

Figure 41:
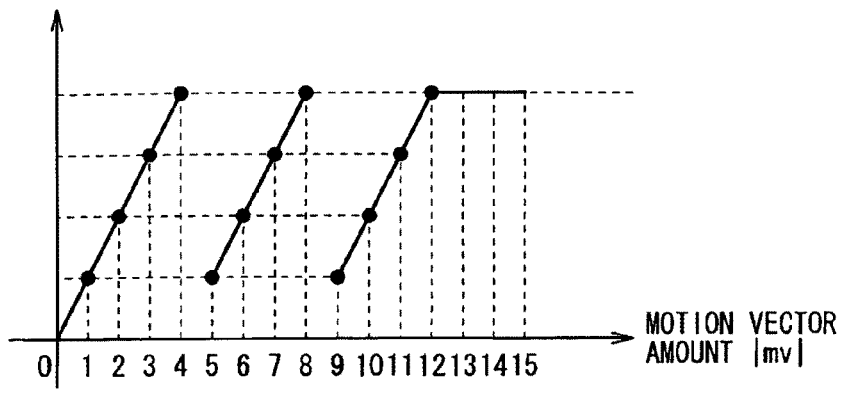
FIG. 41 is a characteristics view illustrating an example of the relationship between the motion vector amount and a travel amount gain.

The correction amount adjustment section 333 performs the gain adjustment of the filter process (correction process) through use of the moving image blur characteristics information, so as to prevent steps at the interface, generated with switching of the tap number of the filter at the time of the correction process in the correction process section 332. The correction amount adjustment section 333 will be described later in detail (FIG. 41).

The addition section 334 generates and outputs the display image data, by adding the original image signal input to the moving image blur improvement process section 33, and the correction-processed, and correction-amount-adjusted image signal (correction signal after being subjected to the correction amount adjustment) output from the correction amount adjustment section 333.

Configuration Example of the Signal Characteristics Detection Section

Next, with reference to FIGS. 23 to 26C, the signal characteristics detection section 331 will be described in detail. FIG. 23 illustrates the block configuration example of the signal characteristics detection section 331. The signal characteristics detection section 331 includes an MAX/MIN detection section 331A, a spatial high frequency detection section 331B, a spatial low frequency detection section 331C, and an edge direction detection section 331D.

The MAX/MIN detection section 331A detects the above-described MAX/MIN information from the image signal, through use of the moving image blur characteristics information. The detected MAX/MIN information is supplied to the spatial high frequency detection section 331B, the spatial low frequency detection section 331C, and the edge direction detection section 331D, and output to the correction process section 332 as one of the signal characteristics information.

Figure 24A:
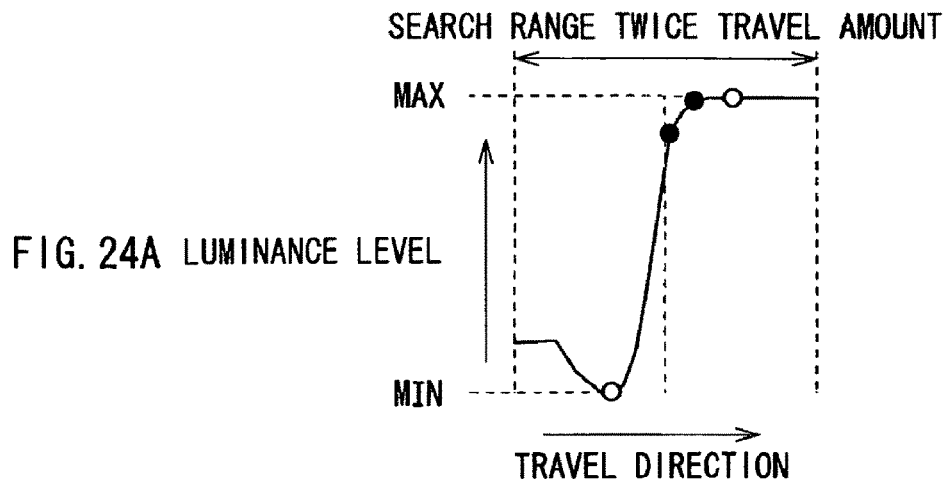
FIGS. 24A to 24B are waveform diagrams for explaining a MAX value and a MIN value in a search range (process range), and a weight of the MAX value and the weight of the MIN value.
Figure 24B:
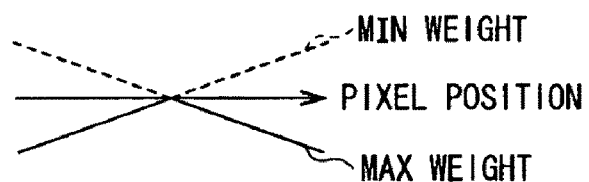

Specifically, as illustrated in FIG. 24A, the MAX/MIN detection section 331A detects the MIN value and its pixel position, and the MAX value and its pixel position, in the search range with the size twice that of the travel amount (=in the pixel range of the number of {(tap number−1)×2+1}). At that time, for example, as illustrated in FIG. 24B, when the MIN value and its pixel position are detected, the detection process is performed after weighting, in a positive direction, each pixel value according to the distance between the pre-determined pixel of interest to each pixel value, within the search range. When the MAX value and its pixel position are detected, the detection process is performed after weighting, in a negative direction, each pixel value according to the distance between the above-described pixel of interest to each pixel value. The detection process is performed in such a manner to prevent an error detection caused by the noise or the like when the MAX/MIN information is detected, and it is possible to improve the noise resistance characteristics by performing the weighting, and selecting the pixel value in the position close to that of the pixel of interest within the search range.

Figure 25:
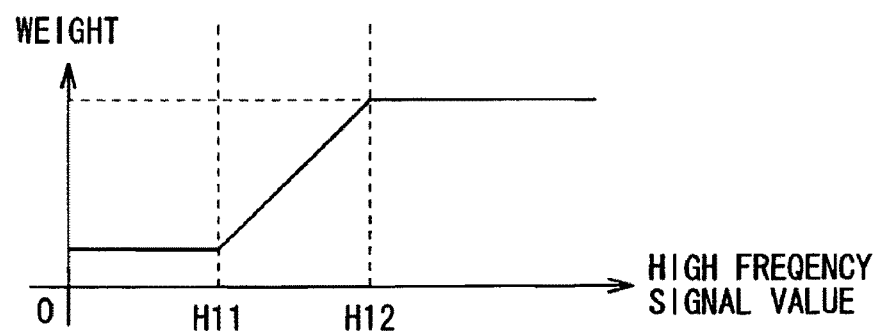
FIG. 25 is a characteristics view illustrating an example of the relationship between a high frequency signal value and the weight.

For example, as illustrated in FIG. 25, one or both of the weight in the positive direction and the weight in the negative direction is adjusted to increase, in accordance with the increase of the high frequency signal amount in the search range (in accordance with the increase in the spatial frequency). Specifically, here, the weight is a constant value when the value of the high frequency signal amount is 0 or more and less than H11. The weight linearly increases when the value of the high frequency signal amount is H11 or more and less than H12. The weight is the constant value again when the value of the frequency signal amount is H12 or more. This is because, since the error determination of the edge direction in the edge direction detection section 331D, which will be described later, is likely to occur in the region (high frequency) with the high spatial frequency, and by increasing the weight in such a high frequency region, the error determination in the high frequency is reduced.

Based on the MAX/MIN information and the moving image blur characteristics information, the spatial high frequency detection section 331B detects the spatial high frequency information (high-pass signal amount) of the image signal in the search range, and outputs the spatial high frequency information as one of the signal characteristics information.

Based on the MAX/MIN information and the moving image blur characteristics information, the spatial low frequency detection section 331C detects the spatial low frequency information (low-pass signal amount) of the image signal in the search range, and outputs the spatial low frequency information as one of the signal characteristics information.

The edge direction detection section 331D obtains the changing edge portion and the edge direction in the image signal, based on the MAX/MIN information and the moving image blur characteristics information. This is because, the correction process with the correction process section 332 differs depending on whether the edge direction is in the rise direction, or the fall direction. That is, although will be described later in detail, the correction process section 332 determines whether or not the LPF process is to be performed, and determines the filter coefficient at the time of the HPF process, according to the obtained edge direction.

Figure 26A:
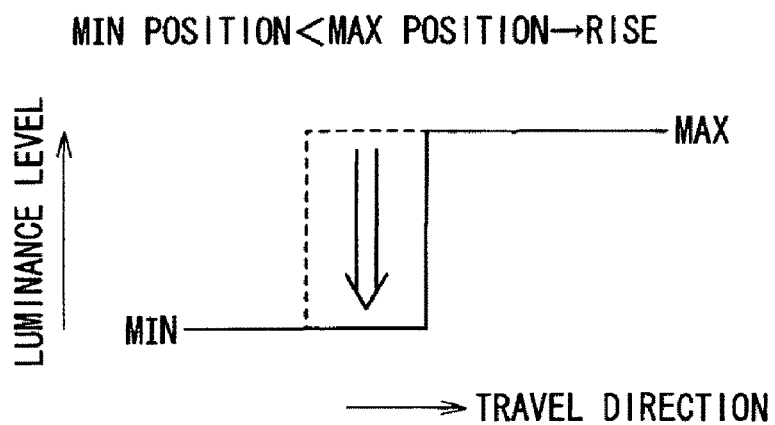
FIGS. 26A to 26C are waveform diagrams each for illustrating the relationship between a MAX position and a MIN position, and a rise and a fall in an image signal.
Figure 26B:
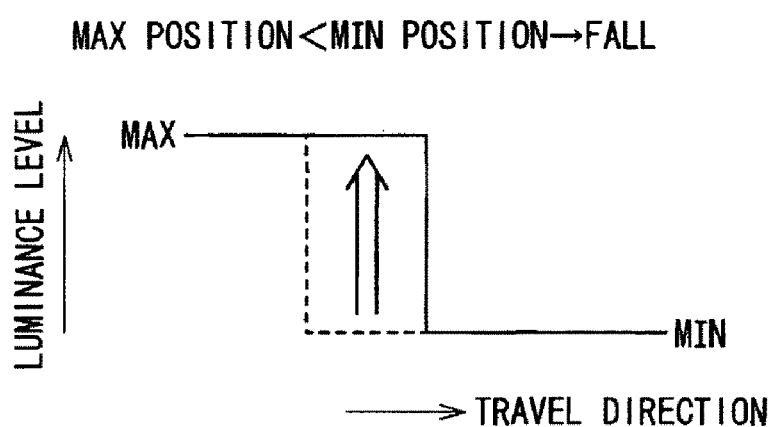
Figure 26C:
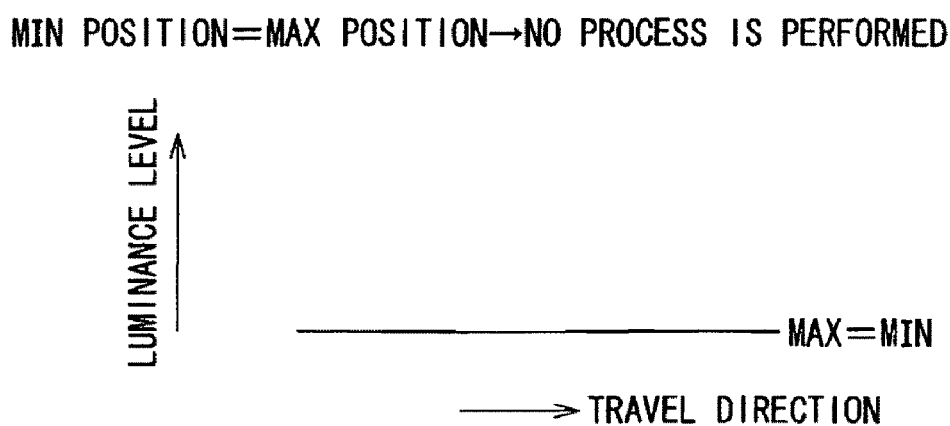

Specifically, for example, in such a manner illustrated in FIGS. 26A to 26C, the edge direction detection section 331D obtains the edge direction. That is, for example, as illustrated in FIG. 26A, in the case where the travel direction of the motion vector is in the direction from left to right in the figure, when the pixel position of the MAX value (MAX position) is on the right side as compared with the pixel position of the MIN value (MIN position), the edge direction detection section 331D determines the edge direction as the fall direction. In the case of this travel direction, for example, as illustrated in FIG. 26B, when the MIN position is on the right side as compared with the MAX position, the edge direction detection section 331D determines the edge direction as the rise direction. For example, as illustrated in FIG. 26C, in the case where the MIN position and the MAX position are in the same position, since there is no changing edge portion within that search range, the edge direction detection section 331D determines not to perform the correction process with the correction process section 332, which will be described later.

Configuration Example of Correction Process Section

Figure 27:
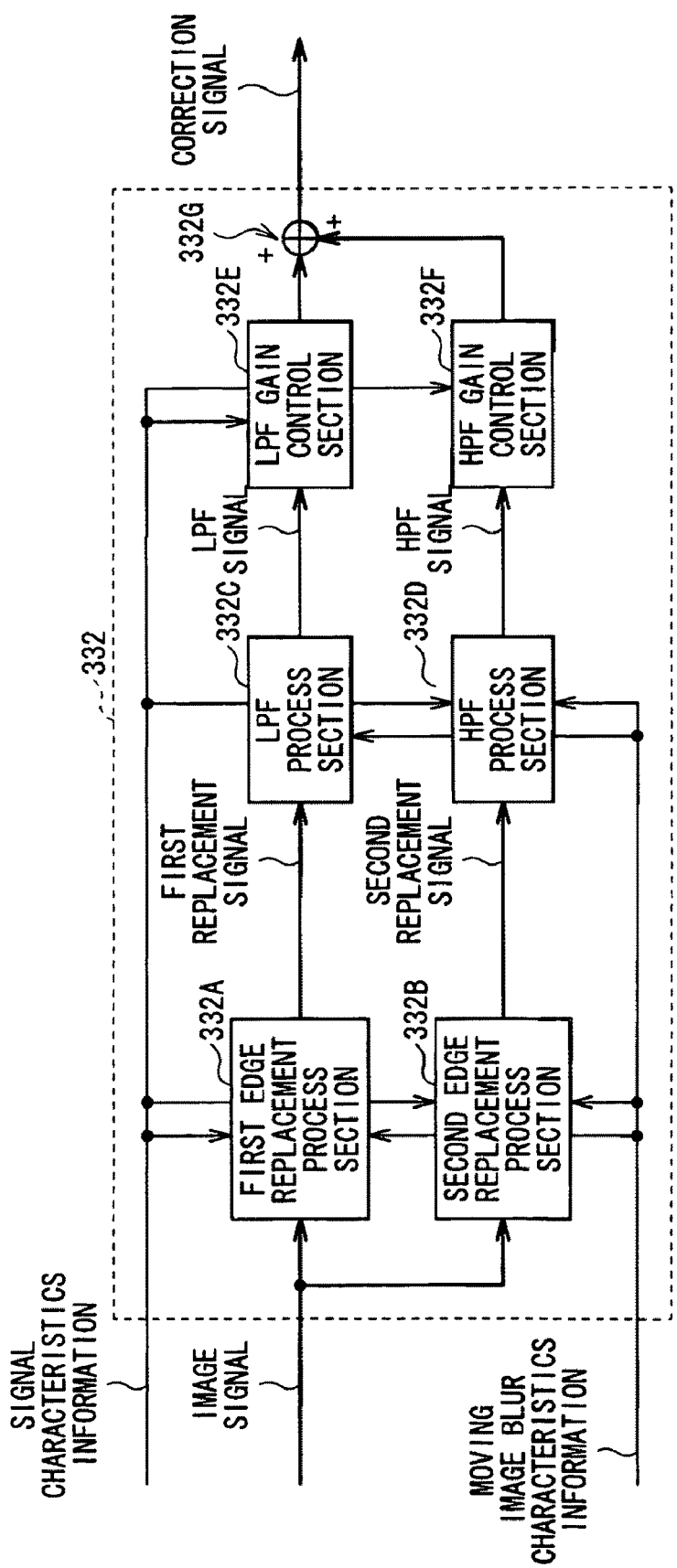
FIG. 27 is a block diagram illustrating a configuration example of the correction process section illustrated in FIG. 20.

Next, with reference to FIGS. 27 to 40C, the correction process section 332 will be described in detail. FIG. 27 illustrates the block configuration example of the correction process section 332. The correction process section 332 includes a first edge replacement process section 332A, an LPF process section 332C, an LPF gain control section 332E, as a block in the LPF process illustrated in FIG. 21A. The correction process section 332 also includes a second edge replacement process section 332B, an HPF process section 332D, an HPF gain control section 332F, as a block in the HPF process illustrated in FIG. 21B. That is, the correction process section 20 has the parallel configuration of the block in the LPF process, and the block in the HPF process. Moreover, the correction process section 332 includes an addition section 332G.

The first edge replacement process section 332A performs a first edge replacement process, which will be described later, on the image signal, through use of the signal characteristics information and the moving image blur characteristics information, and thereby generates and outputs a first replacement signal for the correction process in the LPF process section 332C (corresponding to the previous process of the LPF process). The second edge replacement process section 332B performs a second edge replacement process, which will be described later, on the image signal, through use of the signal characteristics information and the moving image blur characteristics information, and thereby generates and outputs a second replacement signal for the correction process in the HPF process section 332D (corresponding to the previous process of the HPF process). Such replacement processes are performed for increasing a slew rate to a natural image. Specifically, when the filter process is performed on the image, which includes the image pickup blur and the edge therein is dull, the replacement process is performed, so that the slope of the changing edge portion is prevented from being too gradual above the expectation, and an adverse effect is reduced in the image with an black edge or the like. Therefore, for example, in a telop image or an animation or the like in which there is no image pickup blur, it is not always necessary to perform the edge replacement process.

Figure 28:
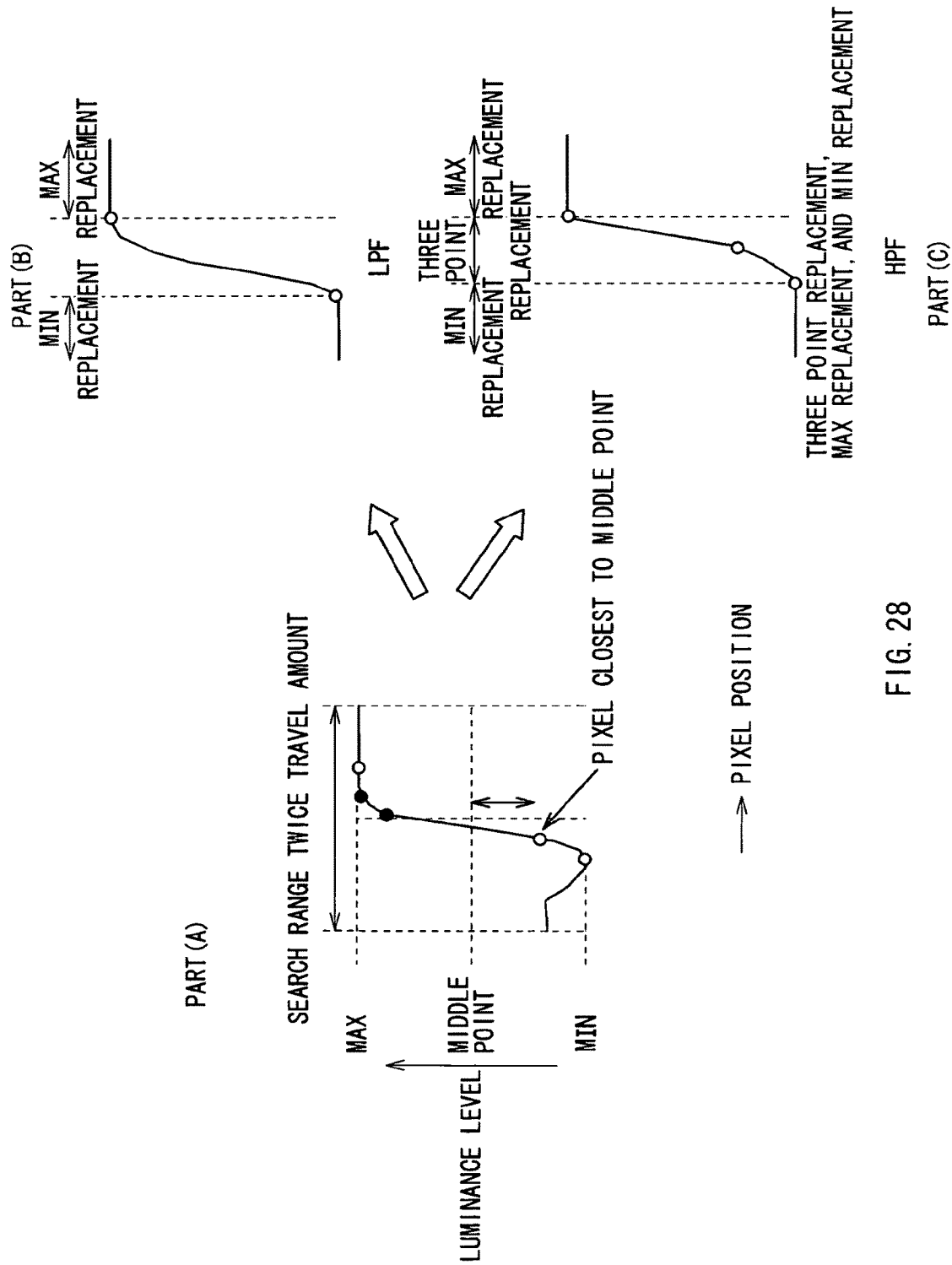
FIG. 28 is waveform diagrams each for explaining the outline of the process with an edge replacement process section illustrated in FIG. 27.

Specifically, the first edge replacement process 332A and the second edge replacement process section 332C perform the edge replacement process as illustrated in, for example, part (A) to part (C) of FIG. 28.

The first edge replacement process section 332A performs the first edge replacement process (MAX/MIN replacement (outside replacement)) through use of the moving image blur characteristics information, and the MAX value and the MAX position and the MIN value and the MIN position as the signal characteristics information (MAX/MIN information). Specifically, for example, as illustrated in part (A) and part (B) of FIG. 28, the first edge replacement process section 332A replaces the pixel value outside the MIN position with the MIN value (MIN replacement), and replaces the pixel value outside the MAX position with the MAX value (MAX replacement), in the outside of the pixel region between the MIN position and the MAX position within the search range. By performing the LPF process after performing such a first edge process, it is possible to suppress the phase shift from the original image signal in the changing edge portion.

The second edge replacement process section 332B performs the second edge replacement process (MAX/MIN replacement (outside replacement), and three-point replacement) through use of the moving image blur characteristics information, and the MAX value and the MAX position and the MIN value and the MIN position as the signal characteristics information (MAX/MIN information). Specifically, similarly to the first edge replacement process described above, for example, as illustrated in part (A) to part (C) of FIG. 28, the second edge replacement process section 332B performs the MAX/MIN replacement (outside replacement), in the outside of the pixel region between the MIN position and the MAX position within the search range. Moreover, the second edge replacement process section 332B replaces the pixel value in the pixel region, with the MIN value, the MAX value, and the pixel value of the pixel in the vicinity of the middle between the MIN position and the MAX position (the pixel which is the closest to the middle between the MIN value and the MAX value), thereby replacing the pixel value in the pixel region with the pixel values of the three points (three-point replacement). Not by performing the two-point replacement with the MIN value and the MAX value, but by performing such a three-point replacement, it is possible to efficiently suppress the phase shift of the changing edge portion with the second edge replacement.

More specifically, the first edge replacement process section 332A performs the first edge replacement process, for example, as illustrated in FIGS. 29A to 30B. In these figures, the vertical axis indicates the luminance level, and the horizontal axis indicates the pixel position. FIG. 29A illustrates the case where the MAX position and the MIN position are outside the search range, FIG. 29B illustrates the case where only one of the MAX position and the MIN position (here, the MAX position) is outside the search range, and FIG. 29C illustrates the case where the MAX position and the MIN position are inside the search range. FIGS. 30A and 30B illustrate the case where the search range is not within the pixel region between the MIN position and the MAX position.

The second edge replacement process section 332B performs the second edge replacement process, for example, as illustrated in FIGS. 31A to 32B. FIG. 31A illustrates the case where the MAX position and the MIN position are outside the search range, FIG. 31B illustrates the case where only one of the MAX position and the MIN position (here, the MAX position) is outside the search range, and FIG. 31C illustrates the case where the MAX position and the MIN position are inside the search range. FIGS. 32A and 32B illustrate the case where the search range is not within the pixel region between the MIN position and the MAX position. That is, as illustrated in FIGS. 31A to 31C, in the case where the middle point between the MAX position and the MIN position is within the pixel region, the three-point replacement is performed as described above. On the other hand, as illustrated in FIGS. 32A and 32B, in the case where the middle point is not within the pixel region between the MAX position and the MIN position, similarly to the first edge replacement process, only the MAX/MIN replacement is performed. That is, in this case, the correction amount with the HPF process, which will be described later, is zero.

Figure 33:
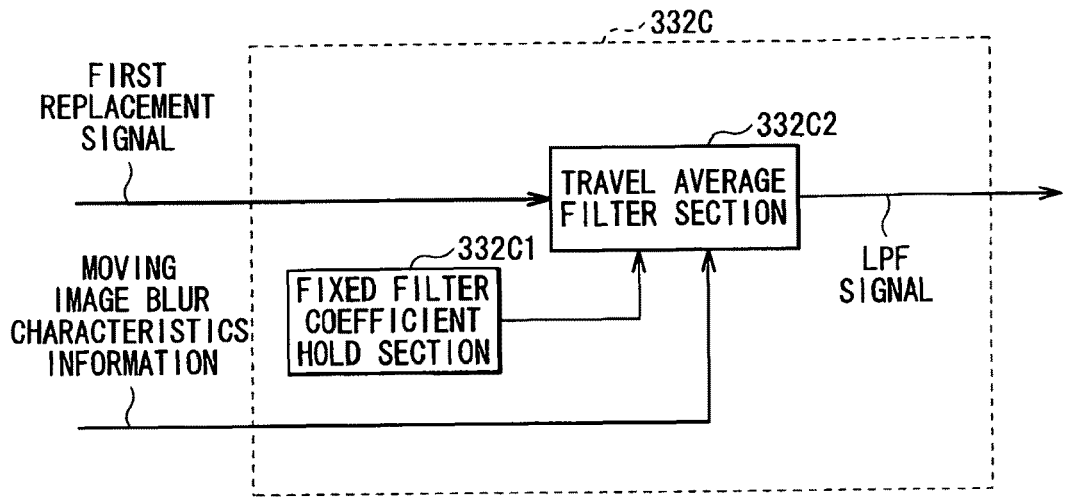
FIG. 33 is a block diagram illustrating a configuration example of an LPF process section illustrated in FIG. 27.

The LPF process section 332C generates and outputs the LPF process signal by performing the above-described LPF process on the first replacement signal output from the first edge replacement process section 332A, through use of the moving image blur characteristics information. For example, as illustrated in FIG. 33, the LPF process section 332C includes a fixed filter coefficient hold section 332C1, and a travel average filter section 332C2. The fixed filter coefficient hold section 332C1 holds the fixed filter coefficient used when the LPF process is performed. The travel average filter section 332C2 actually performs the LPF process through use of the fixed filter coefficient and the moving image blur characteristics information. Here, although the travel average filter is used as an example of the filter performing the LPF process, another LPF may be used.

As described above, whether or not the correction process through use of such an LPF process is performed is determined according to the edge direction. Specifically, in the case where the edge direction is in the rise direction from the low-gradation to the high-gradation, the correction process through use of the LPF process is performed. On the other hand, in the case where the edge direction is in the fall direction from the high gradation to the low gradation, the correction process through use of the LPF process is not performed.

Figure 34:
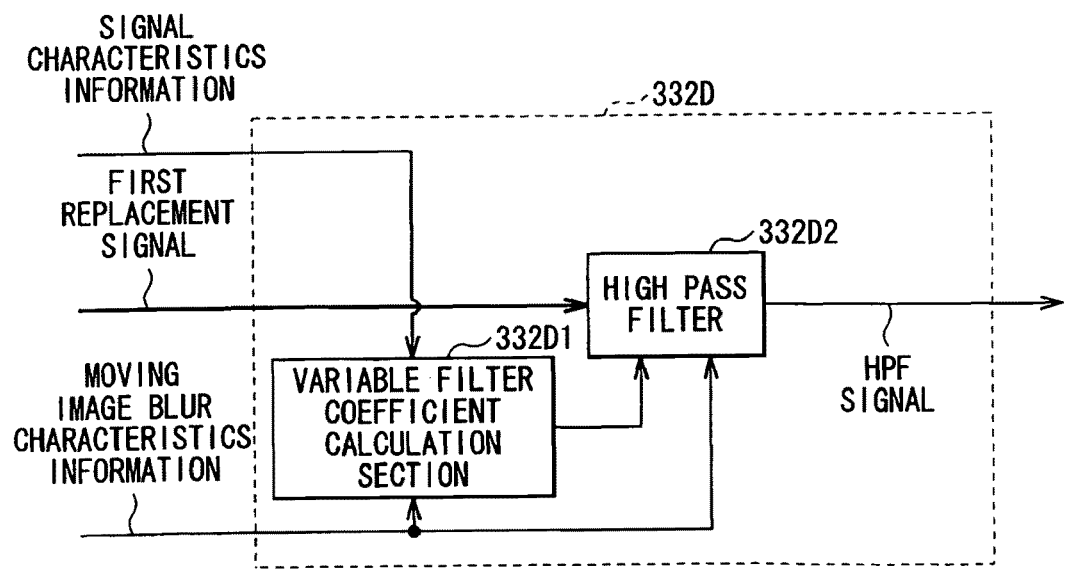
FIG. 34 is a block diagram illustrating a configuration example of an HPF process section illustrated in FIG. 27.

The HPF process section 332D generates and outputs the HPF process signal by performing the above-described HPF process on the second replacement signal output from the second edge replacement process section 332B, through use of the moving image blur characteristics information, and the signal characteristics information. For example, as illustrated in FIG. 34, the HPF process section 332D includes a variable filter coefficient calculation section 332D1, and a high-pass filter section 332D2. The variable filter coefficient calculation section 332D1 calculates the filter coefficient variable according to the moving image blur characteristics information and the signal characteristics information. The high-pass filter section 332D2 actually performs the HPF process through use of the variable filter coefficient and the moving image blur characteristics information.

Figure 35A:
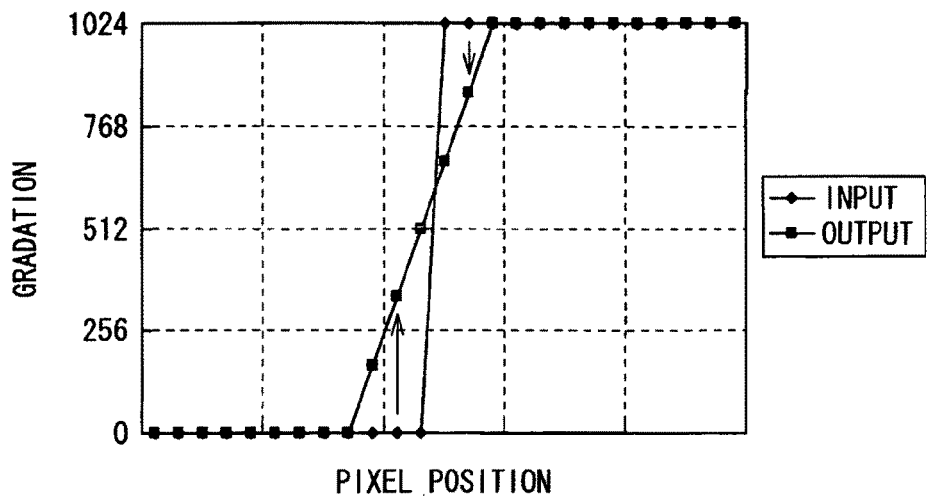
FIGS. 35A and 35B are waveform diagrams each illustrating an example of a filter process with the LPF process section illustrated in FIG. 27.
Figure 35B:
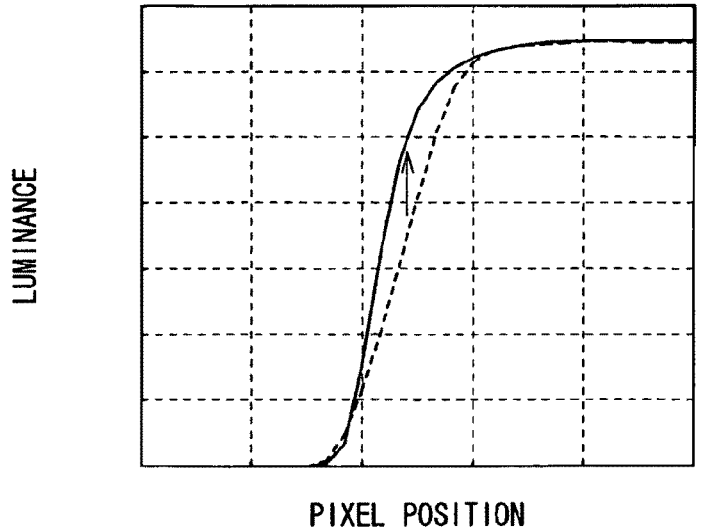

Among these filter process sections, the LPF process section 332C performs the LPF process, as illustrated in, for example, FIGS. 35A and 35B. FIG. 35A illustrates the correction pattern of the case where the correction pattern with the LPF process is linearly applied (travel amount=6) on a rise step edge transiting from the black level to the white level. FIG. 35B illustrates a curve of the moving image blur (motion picture response curve) in that case. It is understood from these views that, when forming the slope of a travel amount width (correction pattern of the LPF process) to the step edge from the black level to the white level, for example, the LPF process with a simple average (linearly connected correction pattern) may be performed. Also from the simulation with a liquid crystal panel of the VA (vertical alignment) method, the result that such a correction pattern is preferable is obtained.

Figure 36A:
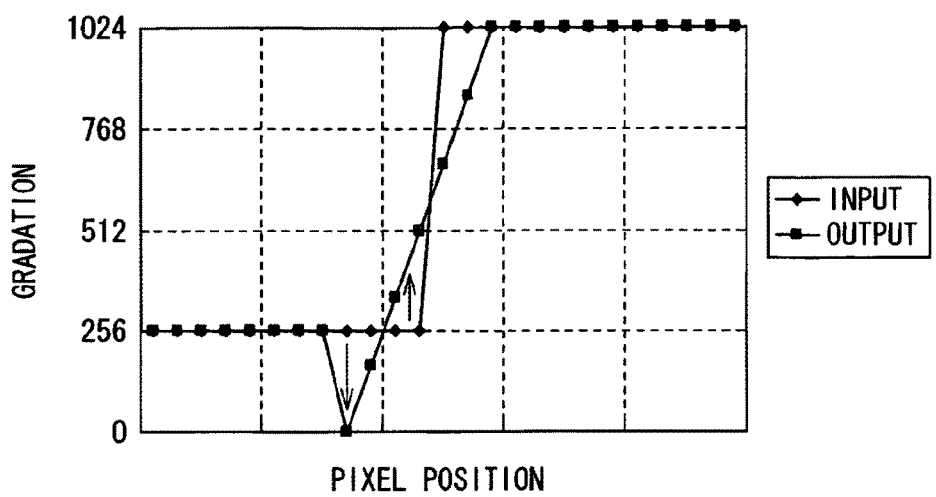
FIGS. 36A and 36B are waveform diagrams each illustrating another example of the filter process with the LPF process section illustrated in FIG. 27.
Figure 36B:
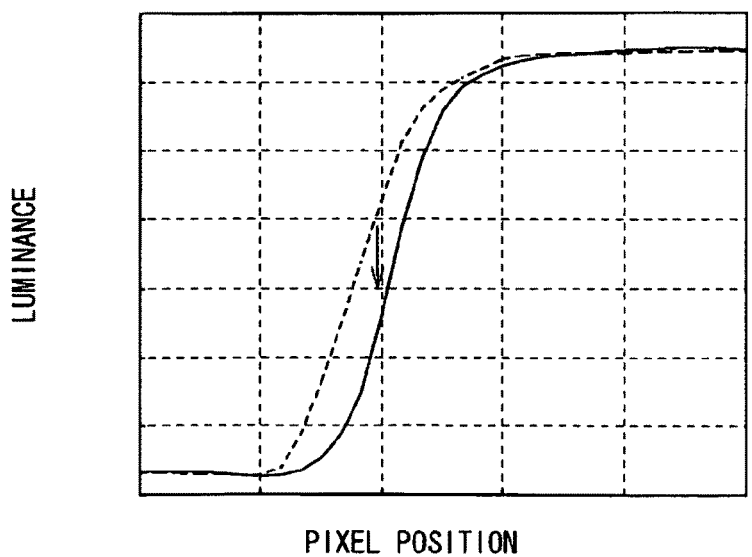

However, in the rise edge from the gradation level to the white level, it is understood that the sufficient effect is not obtained in the above-described simple LPF process, and that the phase is shifted in the travel direction in comparison with the case of the rise edge from the black level. Thus, as the countermeasures to these, it is understood that, when forming the slope of the travel amount width (correction pattern of the LPF process) to the step edge from the gradation level to the white level, for example, as illustrated in FIGS. 36A and 36B, the correction pattern in the direction falling to the black level side is preferable. FIG. 36A illustrates the correction pattern (travel amount=6) desirably applied to the rise step edge transiting from the gradation level to the white level. FIG. 36B illustrates the curve of the moving image blur (motion picture response curve) in that case.

Figure 37A:
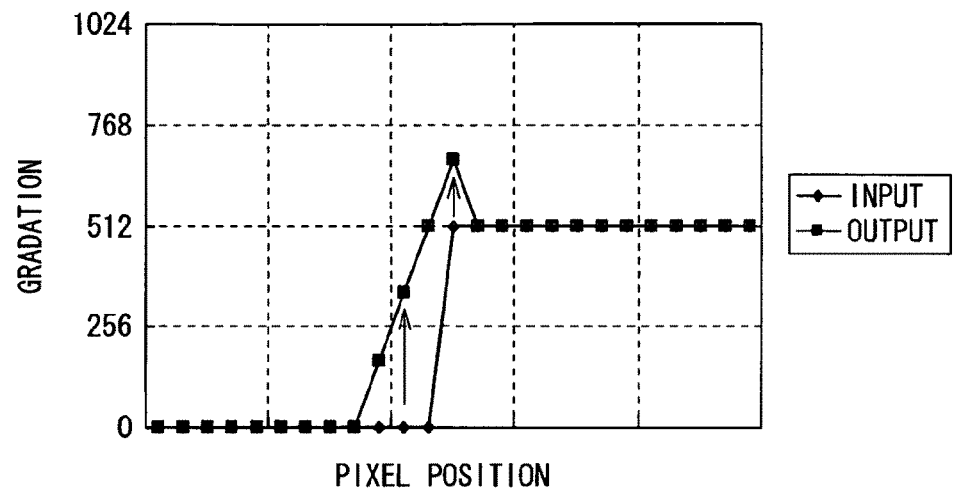
FIGS. 37A and 37B are waveform diagrams each illustrating an example of the filter process with the LPF process section and the HPF process section illustrated in FIG. 27.
Figure 37B:
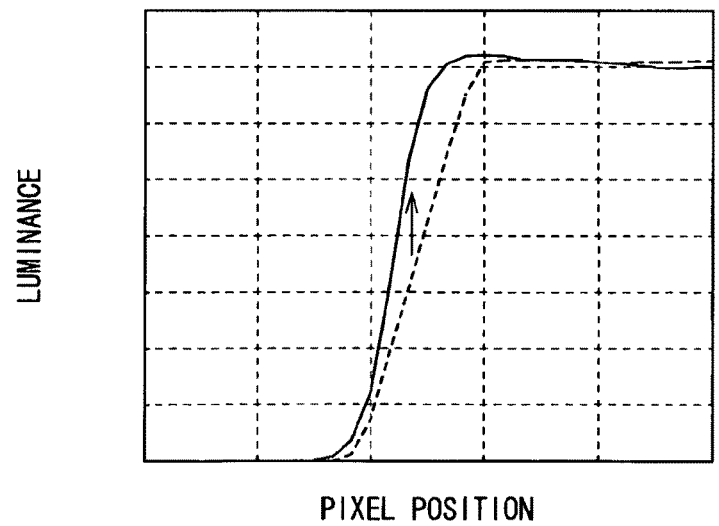

On the other hand, the HPF process section 332D performs the HPF process, for example, as illustrated in FIGS. 37A and 37B, with the combination of the above-described LPF process and the HPF process. FIG. 37A illustrates the correction pattern in the case where the LPF process and the HPF process are combined (travel amount=6). FIG. 37B illustrates the curve of the moving image blur (motion picture response curve) in that case. As the base of the correction pattern, the HPF process is performed through use of a fixed initial coefficient. However, since the LPF process of the above-described travel amount width is preferably performed on the side close to the white level, to maintain such a correction pattern, a calculation formula (will be described later in detail) to set the filter coefficient of the HPF process on the side close to the LPF is used, depending on the gradation in the rise edge. In FIGS. 37A and 37B, the average value of the pixel in which the response of the liquid crystal is slow, and the pixel on the side close to the HPF process operates in the direction approaching the step response (in the case where the liquid crystal response time is zero, the response is in the step shape).

In this manner, in the HPF process section 332D, the filter coefficient at the time of the HPF process is set, so that the optimal correction pattern may be obtained in the HPF process section 332D, with the combination of the HPF process with the HPF process section 332D and the LPF process with the LPF process section 332C.

Figure 38:
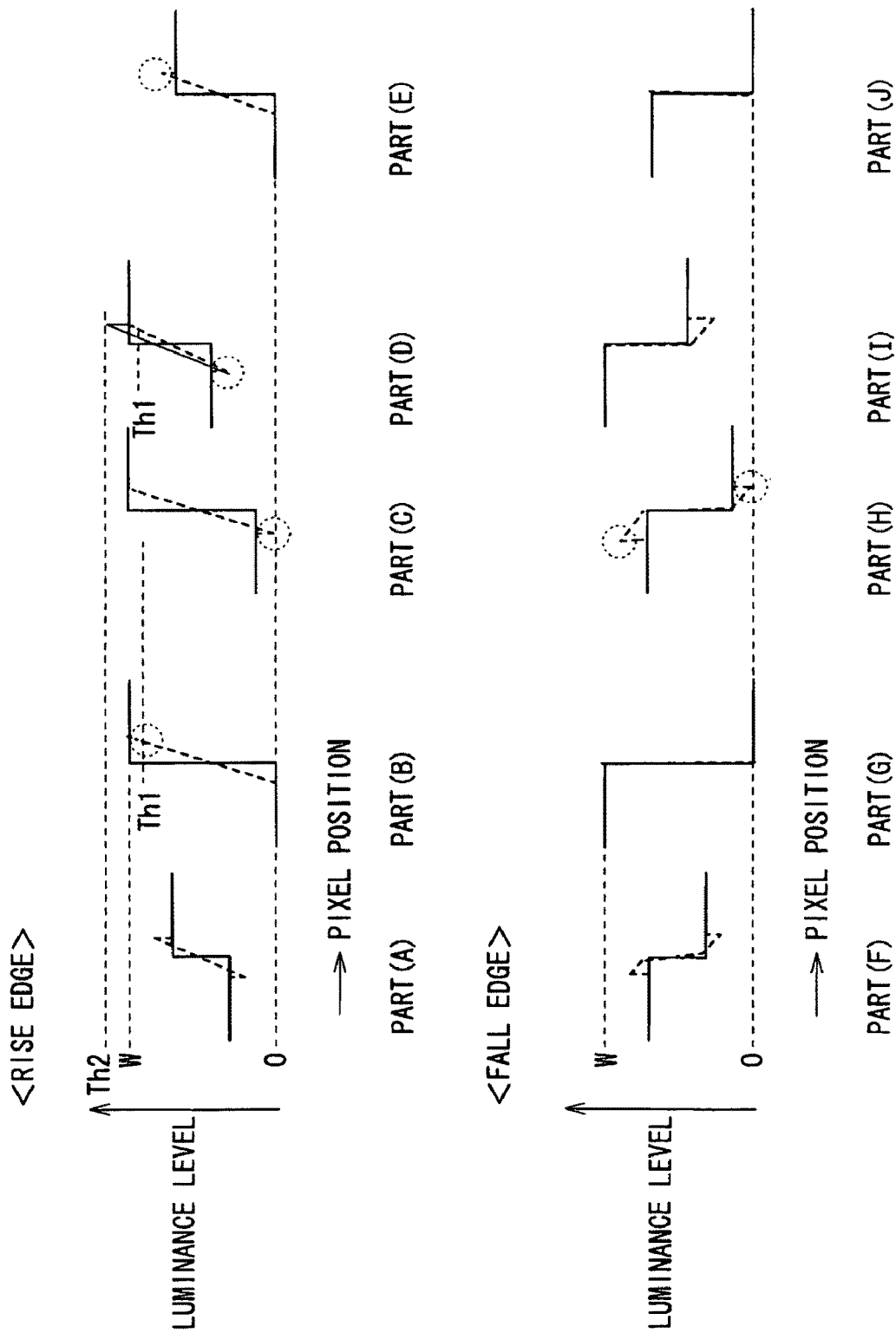
FIG. 38 is waveform diagrams each illustrating an example of the filter process in the HPF process section illustrated in FIG. 27.

Specifically, the filter coefficient at the time of the HPF process is set, so that the correction pattern for the rising edge is, for example, as illustrated in part (A) to part (E) of FIG. 38.

At the time of the rise from the black level to the white level, the value of the filter coefficient at the time of the HPF process is suppressed, so that the LPF process with the travel amount is performed (refer to part (B) of FIG. 38).

At the time of the rise from the low gradation, the value of the filter coefficient at the time of the HPF process is suppressed, so that the projection in the undershoot region (preshoot region) is not black out (refer to part (C) of FIG. 38).

At the time of the rise from the gradation level to the white level, the value of the filter coefficient at the time of the HPF process is suppressed, so that the projection in the undershoot region (preshoot region) is not too large (refer to part (D) of FIG. 38).

At the time of the rise from the low gradation, the value of the filter coefficient at the time of the HPF process is suppressed, so that the projection in the overshoot region is not too large (refer to part (E) of FIG. 38).

On the other hand, the filter coefficient at the time of the HPF process is set, so that the correction pattern for the fall edge is, for example, as illustrated in part (F) to part (J) of FIG. 38.

In the gradation level, the value of the filter coefficient at the time of the HPF process is suppressed, so that the projection in the overshoot region (preover region) is not too large (refer to part (H) of FIG. 38).

At the time of the fall to the low gradation, the value of the filter coefficient at the time of the HPF process is suppressed, so that the projection in the undershoot region is not too large (refer to part (H) and part (I) of FIG. 38).

At the time of the fall to the black level, the filter coefficient at the time of HPF process is zero, and the HPF process is not performed (refer to part (G) and part (J) of FIG. 38).

In this manner, the filter coefficient at the time of HPF process is adjusted to be varied depending on the edge direction. Specifically, the filter coefficient is adjusted to be close to the LPF process side (vertically asymmetric) in the case where the edge direction is in the rise direction, and the filter coefficient is adjusted so that the projection in the overshoot region and the projection in the undershoot region (projections at both ends of the changing edge portion) are identical to each other in size (vertically symmetric) in the case where the edge direction is the fall direction. More specifically, in the case where the edge direction is in the rise direction, the filter coefficient at the time of the HPF process is adjusted, so that the projection in the undershoot region is larger than the projection in the overshoot region. This is because, since the effect of the HPF process is tends to be weakened at the time of the rise from the gradation level to the white level, the effect of the HPF process is increased by adjusting the filter coefficient in this manner.

The filter coefficient corresponding to the size of the projection in the overshoot region and the filter coefficient corresponding to the size of the projection in the undershoot region are preferably adjusted, so that the pixel value in the corrected image signal (corrected signal) is within the dynamic range of the signal. This is because, when such projections at both ends of the changing edge portion are in contact with the edges of the dynamic range (the black level and the white level), the waveform of the correction pattern distorts, and the effect of the HPF process is weakened.

Moreover, in the case where the projection in the overshoot region and the projection in the undershoot region are different from each other in size, the filter coefficient at the time of HPF process is preferably adjusted, while maintaining the ratio of the projection size thereof. This is because, in the case of the small amplitude change from the low gradation to the low gradation, the correction amount is too large in the initial coefficient in the HPF process.

Moreover, the filter coefficient at the time of HPF process is preferably changed according to the spatial frequency within the search range (within the correction range). This is because, for example, there is a possibility that the HPF process is failed in the low spatial frequency like the case of a lamp signal, and in the region with the high spatial frequency, and for avoiding such a fail in the HPF process.

Moreover, the filter coefficient at the time of the HPF process is preferably changed according to the size of the edge amplitude corresponding to the difference value between the MIN value and the MAX value within the search range (within the correction search). This is because, when the filter coefficient is not changed, the correction amount is too large in the changing edge portion with the large amplitude.

The filter coefficient of the HPF process as described above is, for example, obtained through use of formula (1) to formula (5) below. Among these formulas, formula (1) to formula (3) are calculation formulas in the case where the edge direction is in the rise direction. Formula (4) and formula (5) are calculation formulas in the case where the edge direction is in the fall direction. At the time of calculating such a filter coefficient, first, the tap coefficients at both ends of the tap of (travel amount+1) are obtained, and the tap coefficient between those tap coefficient is obtained. When the coefficients at both ends of the tap are "am" and "ap" (the coefficient at the left end of the rise edge traveling to right is defined as "am", and the coefficient at the right end is defined as "ap"), and the correction pattern obtained with the initial coefficient depending on the edge amplitude reaches the predetermined threshold, these "am" and "ap" are clipped (refer to FIG. 38).

< Rise >

$$a_{m1} = \frac{MIN}{(MIN - MAX)} \quad (1)$$

$$a_{m2} = \frac{(Th_2 - MAX)}{(MIN - MAX)} \quad (2)$$

$Th_2$: fixed value $$a_m = MAX(a_{m1}, a_{m2}, a_{m\_in\_u\_gain}) \quad (3)$$

$$a_{p1} = \frac{(Th_1 - MAX)MAX}{(MIN - MAX)W}$$

$Th_1 = W - \frac{W}{V} + \Delta(W - MIN) \cdot a_{m\_in\_u\_gain} + MIN \leq 0)$ $Th_1 =$ $(W - MIN) \cdot$ $W - \frac{(1 - a_{m\_in\_u\_gain})}{V} + \Delta((W - MIN) \cdot a_{m\_in\_u\_gain} + MIN > 0)$ $a_p = MAX(a_{p1}, a_{p\_in\_u\_gain})$ $a_{m\_in\_u\_gain} = a_{m\_in\_r} \cdot in\_gain$ $a_{p\_in\_u\_gain} = a_{p\_in\_r} \cdot in\_gain$ $a_{m\_in\_u}, a_{p\_in\_u}$: rise initial coefficient in_gain: function of MAX − MIN Δ: function of MIN V: travel amount (tap number− 1)

-continued

< Fall >

$$a_{m1} = \frac{MIN}{(MIN - MAX)} \quad (4)$$

$a_m = MAX(a_{m1}, a_{m\_in\_d\_gain})$ $$a_{p1} = \frac{MIN}{(MIN - MAX)} \quad (5)$$

$a_p = MAX(a_{p1}, a_{p\_in\_d\_gain})$ $a_{m\_in\_d\_gain} = a_{m\_in\_r} \cdot in\_gain$ $a_{p\_in\_d\_gain} = a_{p\_in\_r} \cdot in\_gain$ $a_{m\_in\_d}, a_{p\_in\_d}$: fall initial coefficient Here, with reference to FIG. 38, formula (1) to formula (5) will be described in detail. First, since there are two initial coefficients in the case where the edge direction is in the rise, and in the case where the edge direction is in the fall, respectively, there are four coefficients in total. Basically, the HPF is configured with such initial coefficients. To perform various calculations on the initial coefficient, the MIN value and the MAX value detected within the pixel region (search range) twice the travel amount from the center of the process section are used.

As illustrated in part (A) to part (E) of FIG. 38, there is a total of three thresholds of the black level, a threshold Th1 depending on the MIN value, and a threshold Th2 as being a fixed value of the luminance level larger than that of the white level. In the changing edge portion in the rise direction, for setting the correction-amount-added signal within the dynamic range, for example, a condition formula to clip the pixel illustrated in a circle of a broken line of part (D) of FIG. 38 in the black level is established as formula (1). In that case, when the MAX value is large, the pixel is clipped with formula (2). At that time, the coefficient reflects "am" (corresponding to the projection on the lower side of the changing edge portion (projection in the undershoot region)). The pixel illustrated in the circle of the broken line of part (E) of FIG. 38 is clipped on the threshold Th1 with formula 3, thereby it is realized that the HPF process is changed to close to the LPF process side. Here, the threshold Th1 is configured with a portion automatically changing according to the MIN value and the travel amount (tap number−1), and an adjustment portion (correction value which will be described later) Δ. In the case where the image display section 210 is made of the liquid crystal panel of VA method, it is understood from the experiment, that the threshold Th1 is optimal when the adjustment portion Δ is zero, in the single-pixel structure. On the other hand, when the threshold Th1 is lower than the automatically-set value, the HPF process is effectively performed, in the sub-pixel structure. The adjustment portion Δ is defined as the value obtained by multiplying the function of the MIN value by the gain according to the tap number. In the case where the MAX value is small, since the initial coefficient is too large for the correction amount, the correction amount is automatically adjusted according to the MAX value. At that time, the coefficient reflects "ap" (corresponding to the projection on the upper side of the changing edge portion (projection in the overshoot region)).

On the other hand, the changing edge portion in the fall direction is adjusted with the threshold of only the black level. The condition formula clipping the pixel illustrated in the circle of the broken line on the lower side of part (H) of FIG. 38 on the black level is formula (4). Moreover, in the case where this pixel is clipped on the black level, with formula (5), the pixels in the circle of the broken line on the upper side of part (H) of FIG. 38 operate together, and the correction amount is reduced.

Turning back to FIG. 27, the LPF gain control section 332E performs the gain control on the LPF signal output from the LPF process section 332C, based on the value of the image pickup blur amount (not illustrated in FIG. 23), and the value of the spatial high frequency information (high frequency signal amount), in the signal characteristics information.

Figure 39A:
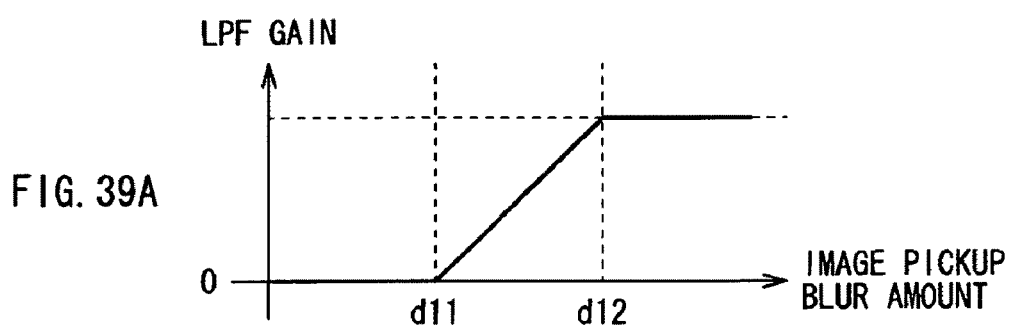
FIG. 39A is a characteristics view illustrating an example of the relationship between an image pickup blur amount and an LPF gain.

Specifically, for example, as illustrated in FIG. 39A, the magnitude of the gain of the filter at the time of the LPF process (LPF gain) changes, according to the image pickup blur amount. More specifically, here, when the value of the image pickup blur amount is 0 or more and less than d11, the LPF gain is equal to zero. When the value of the image pickup blur amount is d11 or more and less than d12, the LPF gain lineally increases. When the value of the image pickup blur amount is d12 or more, the LPF gain is the constant value again. This is because, in the case where the LPF process is performed on the image signal including the image pickup blur, since the LPF process is performed to incline the changing edge portion equal to, or more than the inclination of the desired motion vector, in the image signal in which the image pickup blur amount is large, there is the case where it is desirable to reduce the gain at the time o the LPF process.

Figure 39B:
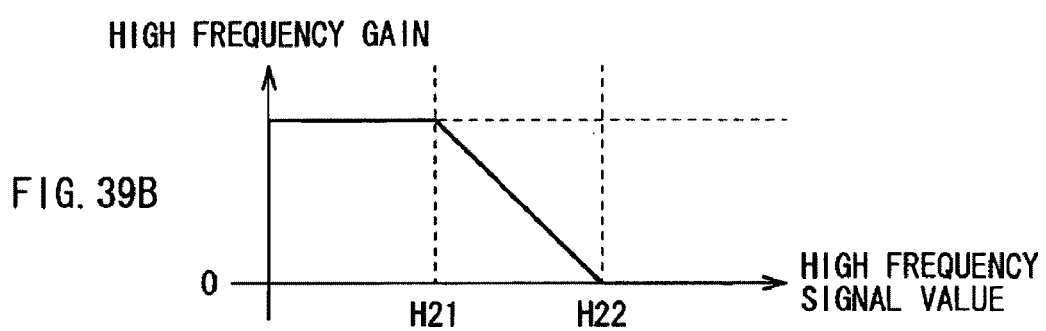
FIG. 39B is a characteristics view illustrating an example of the relationship between the high frequency signal value and a high frequency gain.

For example, as illustrated in FIG. 39B, the magnitude of the gain (high frequency gain) of the filter at the time of the LPF process changes, according to the spatial high frequency information (high frequency signal amount) in the above-described search range (correction range). More specifically, here, when the value of the high frequency signal amount is 0 or more and less than H21, the high frequency gain is the constant value. When the value of the high frequency signal amount is H21 or more and less than H22, the high frequency gain lineally decreases to zero. When the value of the high frequency signal amount is H22 or more, the high frequency gain is the constant value of zero. This is because, in the high frequency signal where there are a plurality of changing edge portions within the search range, since the determination error is likely to occur in the edge direction determination with the edge direction detection section 331D, the gain at the time of the LPF process is reduced according to the increase in the value of the high frequency signal amount.

Next, the HPF gain control section 332F performs the gain control on the HPF signal output from the HPF process section 332D, based on the value of the spatial high frequency information (high frequency signal amount), and the value of the spatial low frequency information (low frequency signal amount), in the signal characteristics information.

Specifically, first, for example, similarly to the case illustrated in FIG. 39B, the magnitude of the gain (high frequency gain) of the filter at the time of the HPF process changes, according to the spatial high frequency information (high frequency signal amount) in the search range (correction range). This is because, in the high frequency signal where there are a plurality of changing edge portions within the search range, since the determination error of the edge direction determination with the edge direction detection section 331D, and the HPF process failure are likely to occur, the gain at the time of the HPF process is reduced according to the increase in the high frequency signal amount.

Figure 40A:
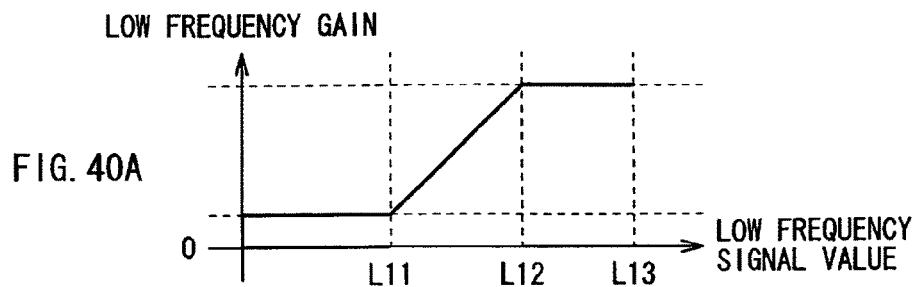
FIG. 40A is a characteristics view illustrating an example of the relationship between a low frequency signal value and a low frequency gain.

For example, as illustrated in FIG. 40A, the magnitude of the gain (low frequency gain) of the filter at the time of the HPF process changes, according to the spatial low frequency information (low frequency signal amount) in the search range (correction range). Here, when the value of the low frequency signal amount is 0 or more and less than L11, the low frequency gain is the constant value. When the value of the low frequency signal amount is L11 or more and less than L12, the low frequency gain lineally increases. When the value of the low frequency signal amount is L12 or more, the low frequency gain is the constant value again. This is because, for example, in the case where the HPF process is performed on the low frequency signal like the case of the lamp signal, the large correction amount is applied to the fine slope, and the failure of the HPF process may occur.

Figure 40B:
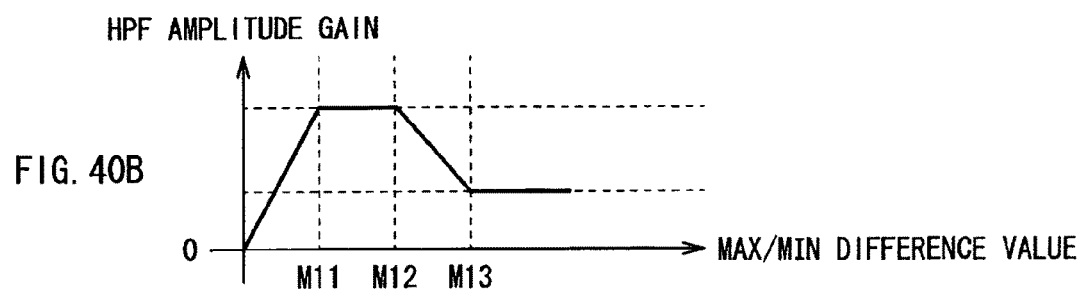
FIG. 40B is a characteristics view illustrating an example of the relationship between an MAX/MIN difference value and an HPF amplitude gain.

Moreover, for example, as illustrated in FIG. 40B, the magnitude of the gain (HPF amplitude gain) of the filter at the time of the HPF process changes, according to the magnitude of the edge amplitude corresponding to the difference value (MAX/MIN difference value) between the MIN value and the MAX value. Here, when the MAX/MIN difference value is 0 or more and less than M11, the value of the HPF amplitude gain linearly increases from 0. When the MAX/MIN difference value is M11 or more and less than M12, the value of the HPF amplitude gain is the constant value. When the MAX/MIN difference value is M12 or more and less than M13, the value of the HPF amplitude gain linearly decreases. When the MAX/MIN difference value is M13 or more, the value of the HPF amplitude is the constant value again. Thereby, the correction amount is prevented from being too large at the changing edge portion with the large edge amplitude.

Figure 40C:
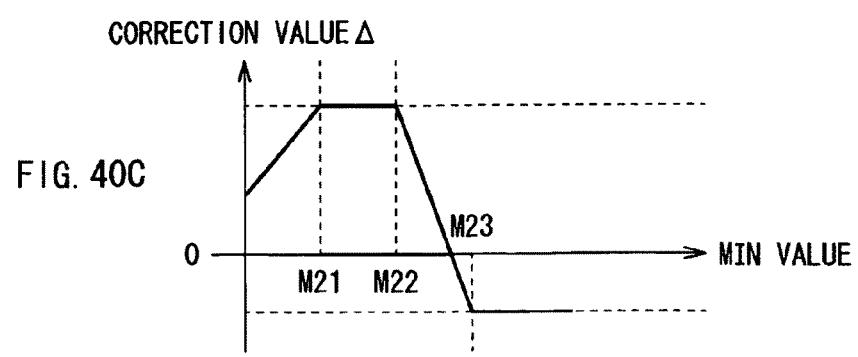
FIG. 40C is a characteristics view illustrating an example of the relationship between the MIN value and a correction value Δ.

For example, as illustrated in FIG. 40C, the magnitude of the above-described correction value $\Delta$ changes according to the magnitude of the MIN value. Here, when the MIN value is 0 or more and less than M21, the correction value $\Delta$ linearly increases. When the MIN value is M21 or more and less than M22, the correction value $\Delta$ is the constant value. When the MIN value is M22 or more and less than M23, the correction value $\Delta$ linearly decreases to a negative value. When the MIN value is M23 or more, the correction value $\Delta$ is the constant value (negative value) again.

Next, the addition section 332G generates and outputs the correction signal, by adding the gain-controlled LPF signal output from the LPF gain control section 332E, and the gain-controlled HPF signal output from the HPF gain control section 332F.

Configuration Example of the Correction Amount Adjustment Section

Next, with reference to FIG. 41, the correction amount adjustment section 333 will be described in detail. FIG. 41 illustrates an example of the adjustment process in the correction amount adjustment section 333.

FIG. 41 illustrates that the magnitude of the gain of the filter (travel amount gain) at the time of the LPF process and the HPF process changes according to the absolute value of the motion vector (motion vector amount, and travel amount). Since steps are generated at the boundaries by switching the tap (odd number only), the gain is varied according to the absolute value of the motion vector, so that the large variation of the correction amount is not generated at the switching timing of the tap.

Operation of the Image Process Section 300

Next, the operation of the image processing device 300 according to the second embodiment will be described. Since the operation of the display device in the image display system according to the second embodiment is similar to that of the display device 200 in the image display system according to the first embodiment, the description is omitted.

As illustrated in FIG. 19, in the image processing device 300, the input image data input for each frame from the outside is subjected to the high frame rate conversion process in the high frame rate conversion section 31, and thereby the conversion image data (image signal) is generated. Next, in the moving blur characteristics detection section 32, the moving image blur characteristics information is detected from the conversion image data, and output to the moving image blur improvement process section 33. In the moving image blur improvement process section 33, the correction process (moving image blur improvement process) is performed on the conversion image data (image signal) through use of the moving image blur characteristics information, and thereby the display image is generated and output to the display device 200.

At this time, as illustrated in FIG. 20, in the moving image blur improvement process section 33, first, the signal characteristics information is detected in the signal characteristics detection section 331. In the correction process section 332, the correction process is performed on the image signal through use of the signal characteristics information and the moving image blur characteristics information. Next, the adjustment process for the correction amount is performed on the correction signal after being subjected to the correction process, in the correction amount adjustment section 333. In the addition section 334, the adjustment-processed correction signal output from the correction amount adjustment section 333 and the original image signal are added, thereby the display image data is generated.

At this time, in the correction process section 332, the LPF process and the HPF process as illustrated in, for example, FIGS. 21A to 21C, are performed on the image signal, thereby the correction signal is generated.

Specifically, as illustrated in FIG. 27, in the LPF process, first, the above-described first edge replacement process is performed on the image signal, in the first edge replacement process section 332A, thereby the first replacement signal is generated. Next, in the LPF process section 332C, the LPF process is performed on this first replacement signal, thereby the LPF signal is generated. In the LPF gain control section 332E, the above-described LPF gain control is performed on this LPF signal. On the other hand, in the HPF process, first, the above-described second edge replacement process is performed on the image signal, in the second edge replacement process section 332B, thereby the second replacement signal is generated. Next, in the HPF process section 332D, the HPF process is performed on this second replacement signal, thereby the HPF signal is generated. In the HPF gain control section 332F, the above-described HPF gain control is performed on this HPF signal. Finally, in the addition section 332G, the gain-controlled LPF signal output from the LPF gain control section 332E, and the gain-controlled HPF signal output from the HPF gain control section 332F are added, thereby the correction signal is generated.

Operations and Effects of the LPF Process

Figure 42:
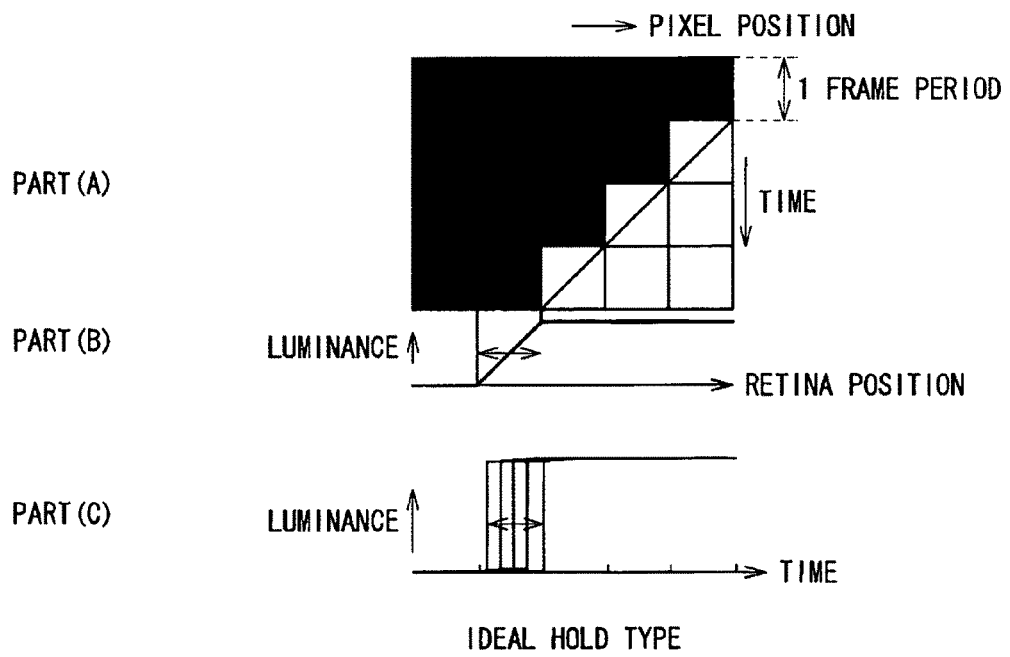
FIG. 42 is for explaining the moving image blur in the case of an ideal hold type.
Figure 43:
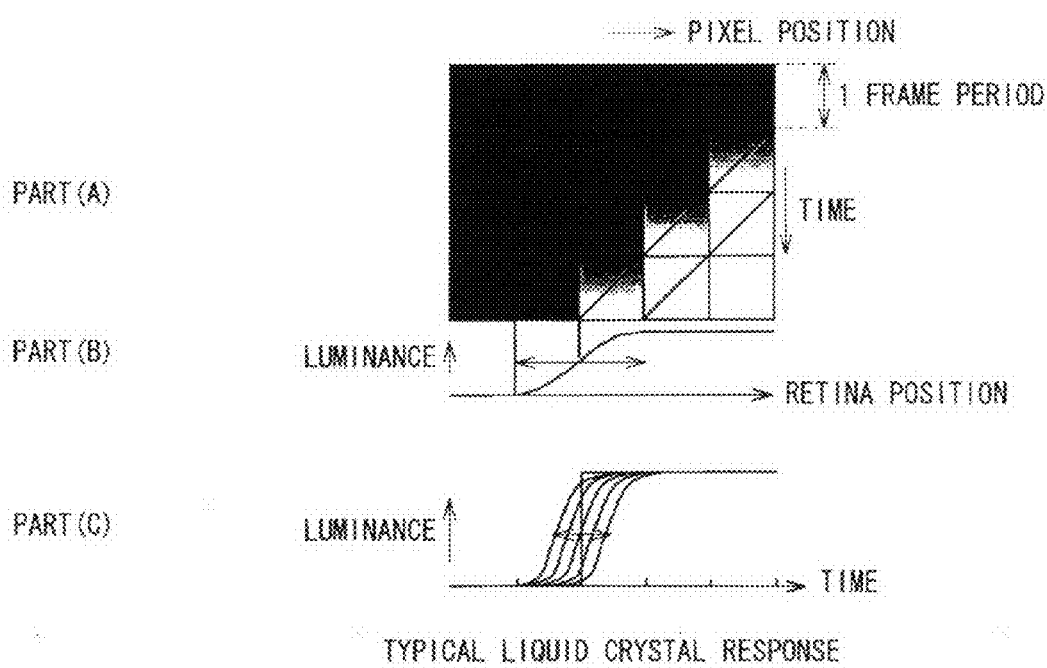
FIG. 43 is a view for explaining the moving image blur in the case of a typical liquid crystal response.

Here, with reference to FIGS. 42 to 46, the operations and the effects of the LPF process with the LPF process section 332C will be described, with a comparison with a comparative example. FIG. 42 illustrates the case of an ideal hold type, FIG. 43 illustrates the case of the typical liquid crystal response, FIG. 44 each illustrates the case were the frame rate is double by interpolating the interpolation frame, and FIG. 45 illustrates the moving image blur in the case where the LPF process (LPF process of the travel amount width) according to the second embodiment is used. In these figures, part (A) illustrates the response characteristics on the display screen, part (B) illustrates MPRC (motion picture response curve), and part (C) illustrates the timing of the liquid crystal response (trace visual axis).

In the case of the ideal hold type illustrated in part (A) to part (C) of FIG. 42, the response time to the step input is zero. Thus, the output level of the liquid crystal instantaneously reaches the luminance (target luminance) corresponding to the input image signal, and the response of the liquid crystal is quick. However, since the eye trace integration effect occurs also in the ideal hold element, the moving image blur of pixels equivalent to the travel amount of the input image of the step change is generated.

On the other hand, in the case of the typical liquid crystal response illustrated in FIG. 43, generally, the blur caused by the liquid crystal response is added to the hold blur of the travel amount of one frame, so that the moving image blur is spread in the range twice the travel amount of one frame. That is, in the typical liquid crystal display device, since the response speed to the step input is low, the response time of one frame is necessary to reach the target luminance. Moreover, since the drive of the hold type is performed in the liquid crystal display device, the eye trace integration effect is generated. Thus, in the case where the step input is performed in the typical liquid crystal display device, since the eye trace integration effect is added to the response time based on the response speed of the liquid crystal, for example, the moving image blur of the pixels corresponding to twice the travel amount of the input image of the step change is generated.

Figure 44:
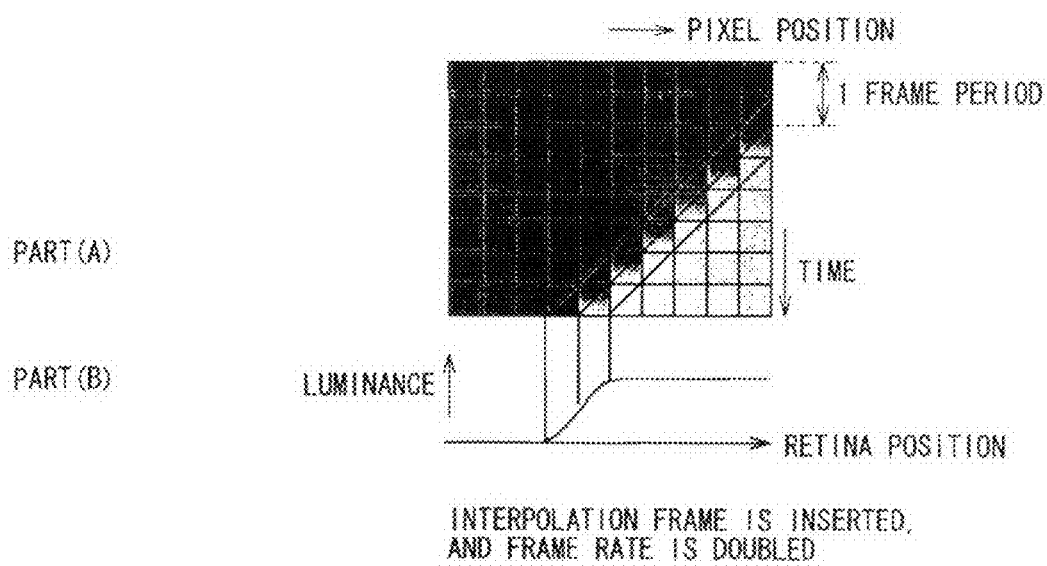
FIG. 44 is a view for explaining the moving image blur in the case where an interpolation frame is inserted.
Figure 45:
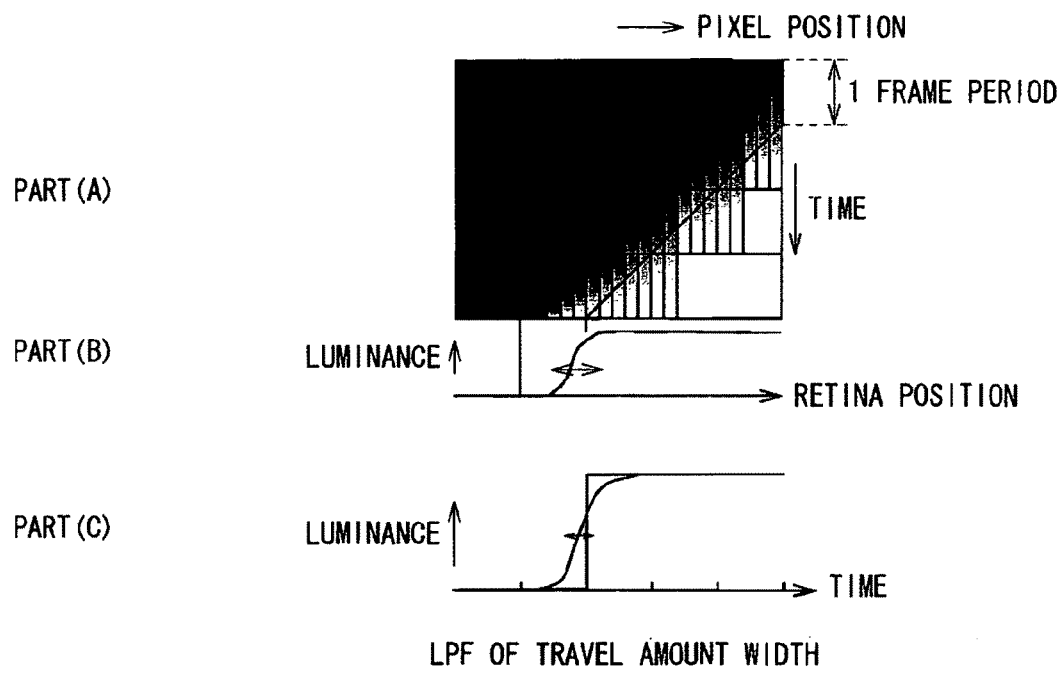
FIG. 45 is a view for explaining the moving image blur in the case where the LPF process of the second embodiment is used.

Thus, in the case where the interpolation frame is inserted as illustrated in part (A) to part (C) of FIG. 44, by inserting the interpolation frame to reduce the travel amount of one frame to one-half, the eye trace integration effect is reduced, and the hold blur amount is reduced to one-half. Moreover, in the case of the gradation in which the overdrive process functions, since the liquid crystal response time also becomes one-half, the moving image blur amount becomes one-half in total in that case. However, actually, in the transition from the dark gradation to the gradation close to white, and in the transition from the bright gradation to the gradation close to the block level, since the overdrive amount is insufficient, the liquid crystal response is not sufficiently improved, and the moving image blur amount is not improved to the level of one-half.

Figure 46:
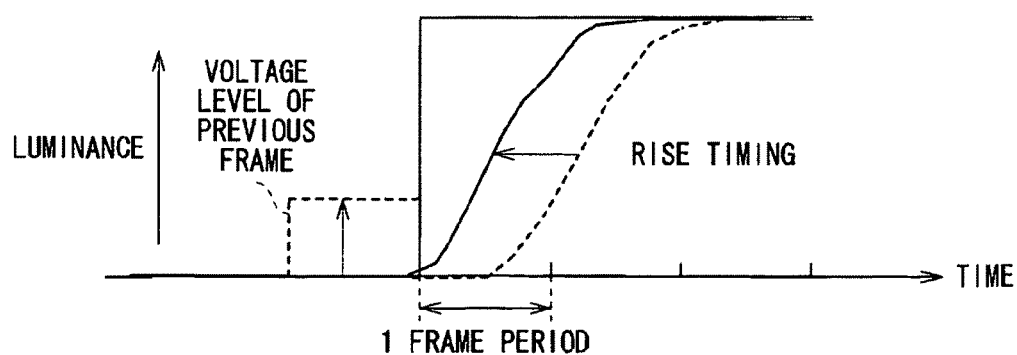
FIG. 46 is a waveform diagram illustrating an example of rise characteristics of the liquid crystal in the case where the LPF process of the second embodiment is used.

In the case where the LPF process according to the second embodiment illustrated in FIGS. 45 and 46 is used, in the frame to be displayed, the spatial LPF process (the filter process to gentle the slope of the changing edge portion in the image signal, within the correction range) is performed on the image signal, according to the magnitude of the motion vector in the image signal. Thereby, the pixel value in the image signal is corrected for each pixel.

Thereby, in the hold type display device 200, the motion blur (hold blur such as blur of a front edge, trailing of a rear edge, and delay of perception position) in the moving object, caused by the eye trace integration effect, is suppressed by the an effect of substantial frame rate improvement with the interpolation in the spatial direction. Moreover, unlike the double speed drive technique of the existing art (interpolation in the temporal direction) as illustrated in part (A) and part (C) of FIG. 44, since it is unnecessary to change the device itself, an issue of cost increase does not occur. Moreover, unlike the overdrive technique of the existing art, the motion blur is sufficiently suppressed in the gradation change in the region other than the region of the middle gradation.

Figure 47:
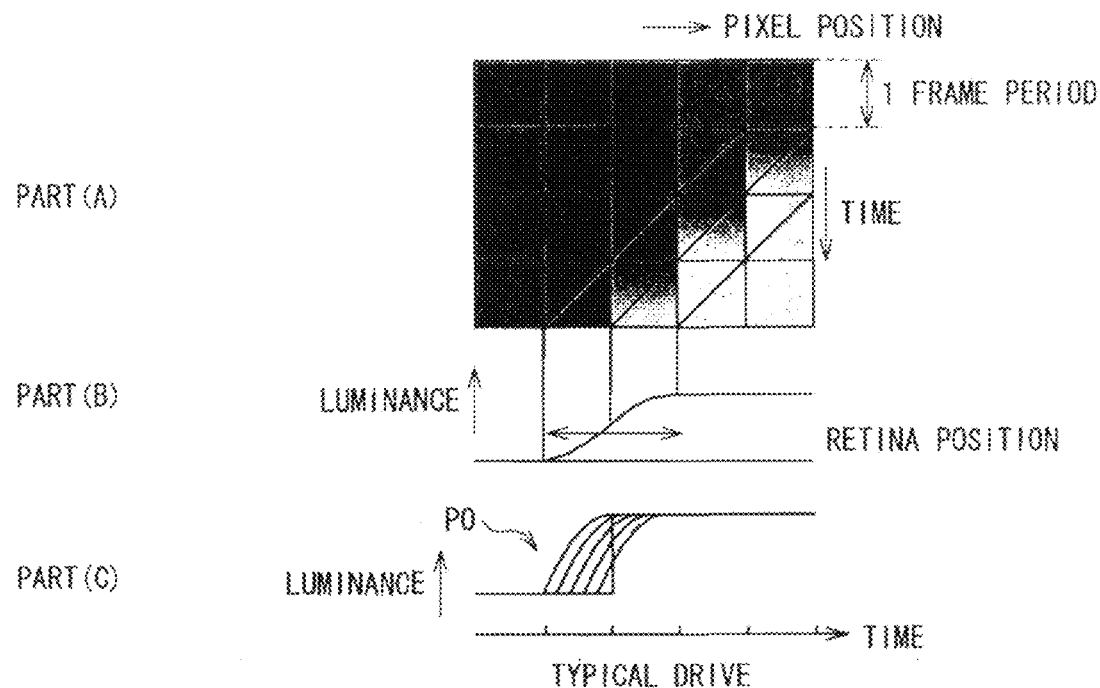
FIG. 47 is a view for explaining the moving image blur in the case of a usual drive.

However, unlike the case where the frame rate is actually increased, since the improvement effect of the liquid crystal is not expected in this LPF process, the liquid crystal response curve appears as the moving image blur pattern (refer to part (B) and part (C) of FIG. 45, and part (B) and part (C) of FIG. 47). Thus, in addition to this LPF process, it can be said that the correction process is desirably performed also through use of the HPF process which will be described below.

Operations and Effects of the HPF Process

Figure 48:
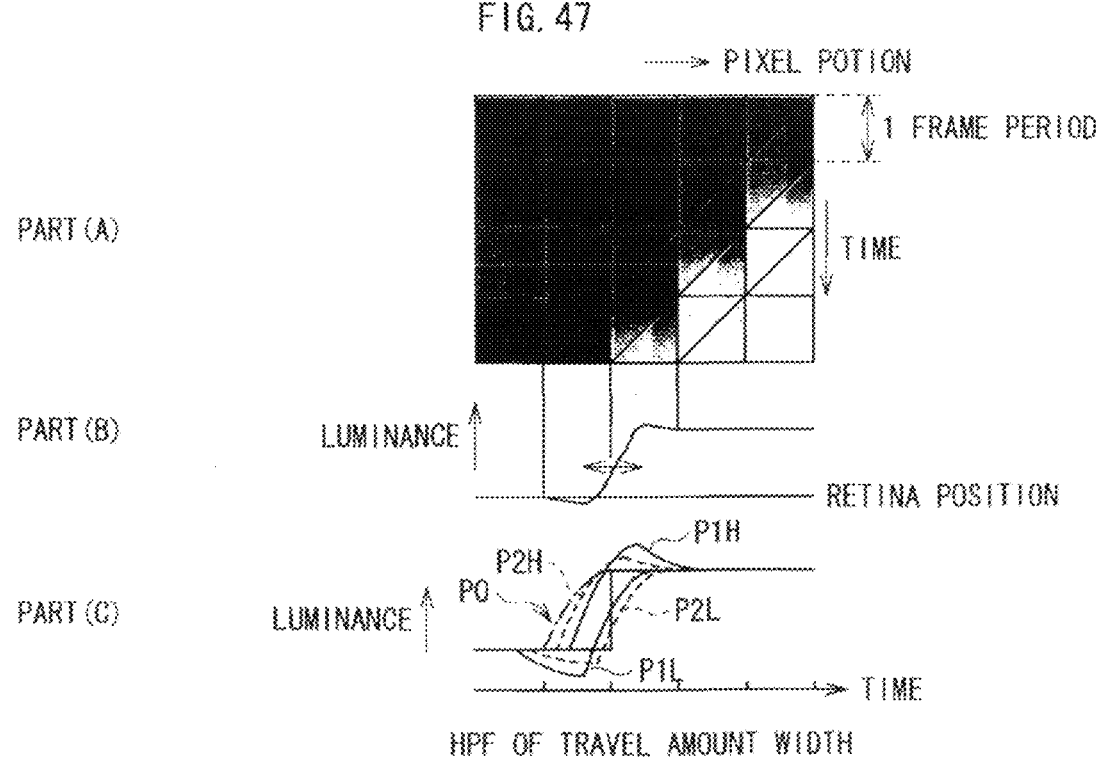
FIG. 48 is a view for explaining the moving image blur in the case where the HPF process of the second embodiment is used.

Next, with reference to FIGS. 47, and 48, the operations and the effects of the HPF with the HPF process section 332D will be described, with a comparison with the comparative example. FIG. 47 illustrates the moving image blur in the case of the typical drive, and FIG. 48 illustrates the moving image blur in the case where the HPF process (HPF process of the travel amount width) according to the second embodiment is used. In these figures, (A) illustrates the response characteristics on the display screen, (B) illustrates MPRC (motion picture response curve), and (C) illustrates the timing of the liquid crystal response (trace visual axis).

In the case of the typical drive illustrated in FIG. 47, in the typical liquid crystal display device, the response speed to the step input is low. Thus, as illustrated with reference numeral P0 in part (C) of FIG. 47, the response time of one frame is necessary to reach the target luminance.

On the other hand, in the case where the HPF process according to the second embodiment is performed as illustrated in FIGS. 48A to 48C, in the frame to be displayed, the spatial HPF process (filter process to provide projection regions in the vicinity of both ends (vicinity of top and bottom) of the changing edge portion in the image signal, within the correction range) is performed on the image signal, according to the magnitude of the motion vector of the image signal, thereby the pixel value in the image signal is corrected for each pixel.

Thereby, with a combination of two projection regions (the overshoot region and the undershoot region) (for example, the combination of reference numerals P1L and P1H, and the combination of reference numerals P2L and P2H in FIG. 48C), the liquid crystal response is improved. Therefore, in the hold type display device 200, the motion blur such as a blur of the edge, and trailing of the edge caused by the luminance change from the middle gradation to the middle gradation, and the delay in the fall response is suppressed. Moreover, unlike the double speed drive technique of the existing art (interpolation in the temporal direction) illustrated in part (A) and part (B) of FIG. 44, since it is unnecessary to change the device itself, an issue of cost increase does not occur. Moreover, unlike the overdrive technique of the existing art, the motion blur is sufficiently suppressed also in the gradation change in the region other than the region of the middle gradation.

Figure 49A:
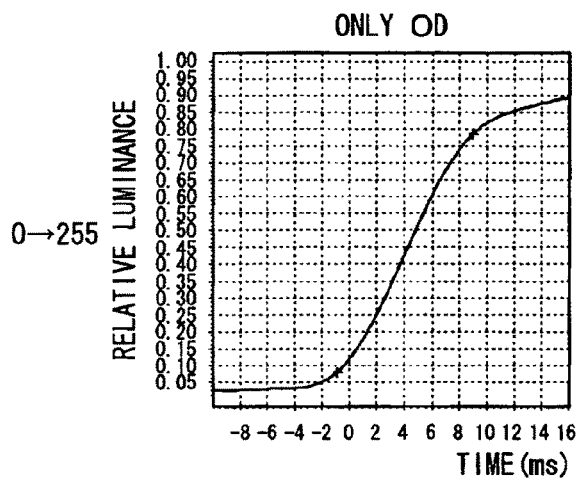
FIGS. 49A to 49D are waveform diagrams for illustrating an example of liquid crystal response characteristics in the case where the LPF process and the HPF process of the second embodiment are used.
Figure 49B:
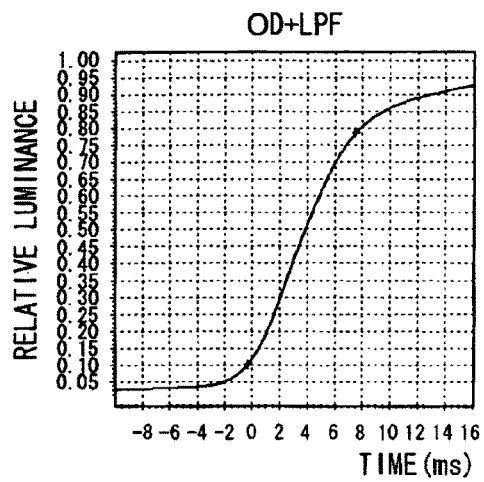
Figure 49C:
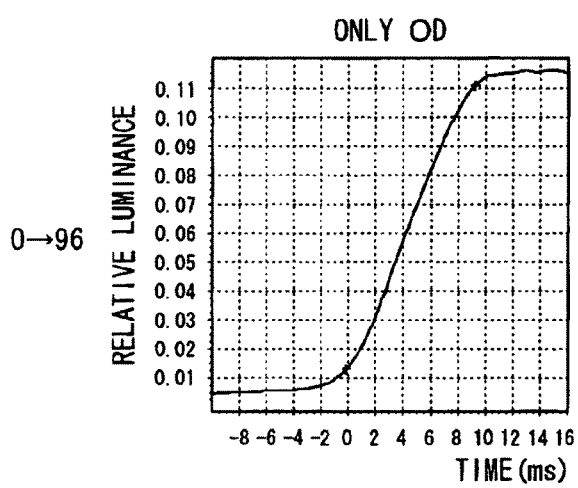
Figure 49D:
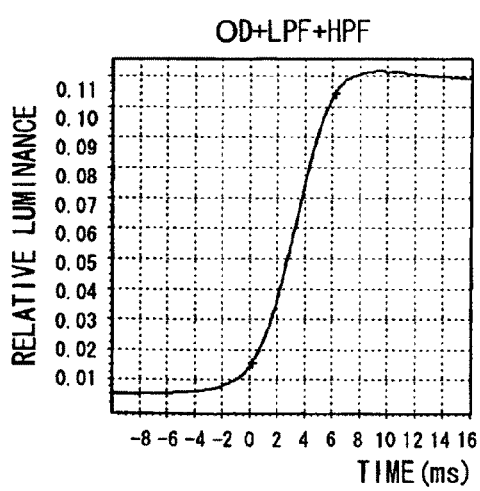

FIGS. 49A to 49D illustrate the timing waveform of the example of the liquid crystal response characteristics in the case where the LPF process and the HPF process according to the second embodiment are used. FIGS. 49A and 49B corresponds to the liquid crystal response at the time of the rise from 0 gray-scale (black level) to 255 gray-scale (white level). FIG. 49A illustrates the case where only the over drive (OD) process of the existing art is used. FIG. 49B illustrates the case where the LPF process according to the second embodiment is used in addition to the OD process. FIGS. 49C and 49D correspond to the liquid crystal response at the time of the rise from the 0 gray-scale (black level) to 96 gray-scale (middle level). FIG. 49C illustrates the case where only the OD process is used. FIG. 49D illustrates the case where the LPF process and HPF process according to the second embodiment are used in addition to the OD process.

It is understood from FIGS. 49A and 49B that the LPF process according to the second embodiment is performed at the time of the rise from the 0 gray-scale (black level) to 255 gray-scale (white level), so that the value of PBET (perceived blur edge time) is reduced from 9.8 ms to 7.8 ms, and the liquid crystal response characteristics improve. It is understood from FIGS. 49C and 49D that the LPF process and the HPF process according to the second embodiment are performed at the time of the rise from the 0 gray-scale (black level) to gray-scale (middle level), so that the value of PBET is reduced from 9.3 ms to 6 ms, and the liquid crystal response characteristics more improve.

As described above, in the second embodiment, in the frame to be displayed, the spatial LPF process according to the magnitude of the motion vector of the image signal is performed on the image signal, thereby the pixel value in the image signal is corrected for each pixel. Thus, the liquid crystal response is improved with the combination of the overshoot region and the undershoot region, and it is possible to suppress the motion blur. Moreover, unlike the technique of the existing art, it is possible to prevent the cost increase issue, and it is possible to sufficiently suppress the motion blur in the gradation change in the region other than the region of the middle gradation. Therefore, it is possible to suppress the motion blur in the hold type display device 200, and improve the image quality of the moving image, while suppressing the cost increase.

Moreover, in the frame to be displayed, in addition to the above-described HPF process, the spatial LPF process is performed on the image signal, according to the magnitude of the motion vector of the image signal. Thereby, the pixel value in the image signal is corrected for each pixel. Thus, the eye trace integration effect is reduced by the effect of substantial frame rate improvement with the interpolation in the spatial direction, and it is possible to suppress the motion blur. Therefore, it is possible to more efficiently suppress the motion blur in the hold type display device 200, and it is possible to improve the image quality of the moving image more.

Moreover, as described above, since there is no cost increase in the display device 200, it is possible to realize the display device 200 with the relatively-low cost.

Moreover, as described above, there is an effect on the motion blur improvement in the gradation change in the region other than the region of the middle gradation. In particular, the difference in the delay time caused by the gradation change is large, as the response speed is slow in the display. Thus, the improvement effect is large.

Moreover, the pixel value is corrected for each pixel. Thus, the motion blur suppressing effect with the correction process is more effective, as higher-quality pixels like those in high-definition displays or the like are realized, the difference in the response time depending on the gradation change is larger like the case of the liquid crystal of VA type, and the travel speed (motion vector amount) of the moving object is higher.

3. Modification

Hereinbefore, although the present invention is described with the first embodiment and the second embodiment, the present invention is not limited to those, and various modifications may be made.

Figure 50:
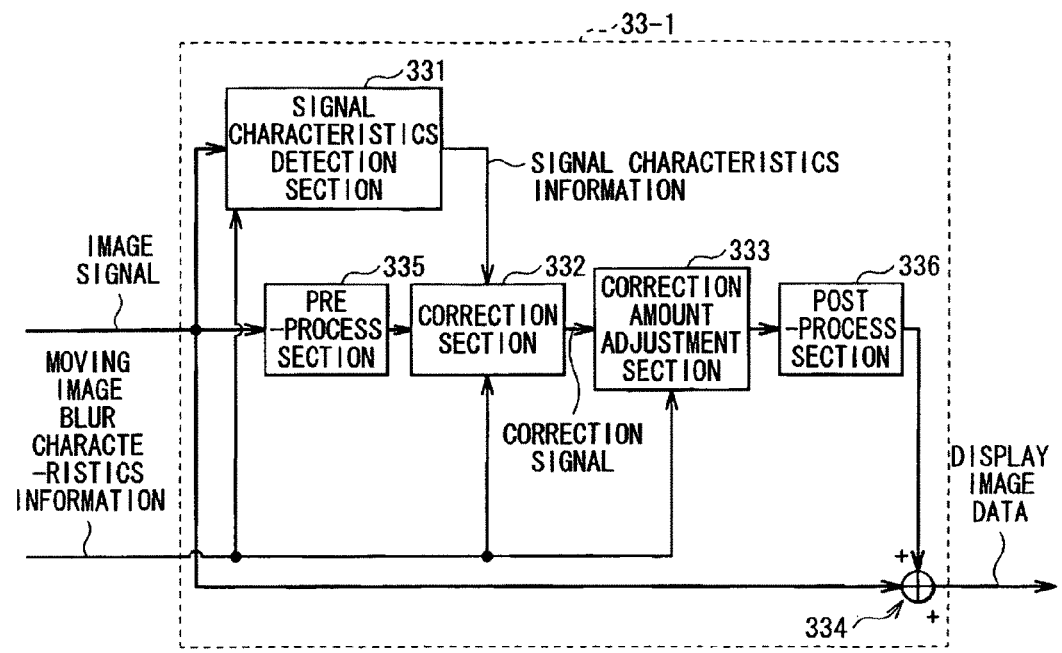
FIG. 50 is a block diagram illustrating the configuration of the moving image blur improvement process section according to a modification of the second embodiment.

For example, like a moving image blur improvement process section 33-1 illustrated in FIG. 50, in the moving image blur improvement process section 33 in the second embodiment, a pre-process section 335 and a post-process section 336 may be provided in the previous stage or the subsequent stage of the correction process section 332 and the correction amount adjustment section 333. The pre-process section 335 performs the process such as removal of high frequency component on the image signal before being subjected to the correction process. The post-process section 336 performs the process such as removal of high frequency component on the signal after subjected to the correction amount adjustment. In the case of such a configuration, it is possible to remove side effects caused by the correction process.

Figure 51:
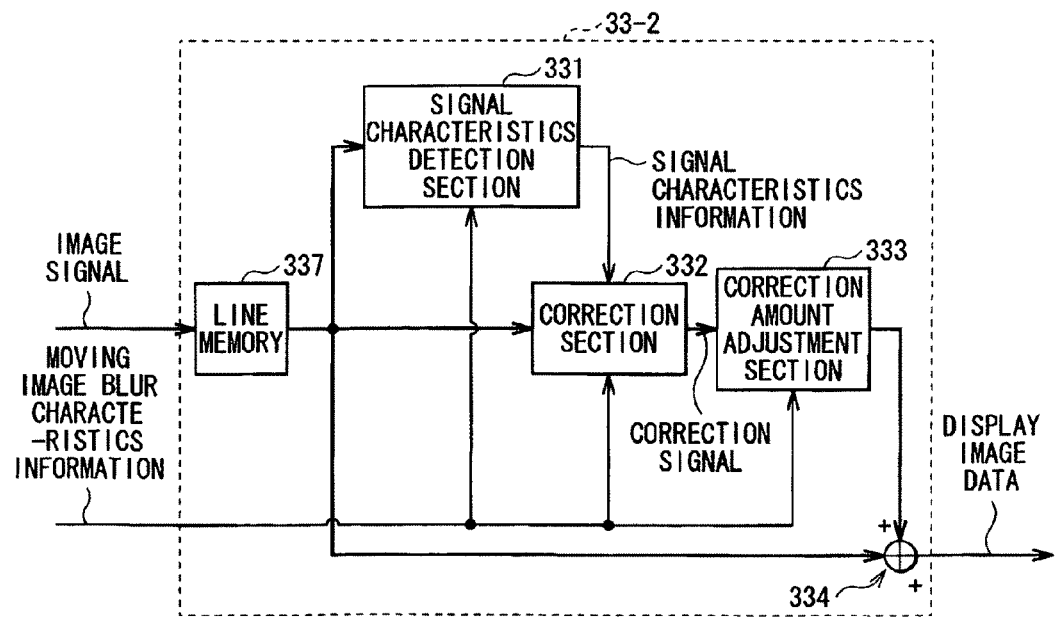
FIG. 51 is a block diagram illustrating the configuration of the moving image blur improvement process section according to another modification of the second embodiment.

Moreover, in the first embodiment and the second embodiment, for ease of description, the case is described where the travel direction (direction of the motion vector) is in the lateral direction, and, when performing the above-described various processes such as the filter process and the correction process on the pixel of interest, the pixel immediately adjacent to the pixel of interest in the lateral direction is used. However, it is not limited to such a case. That is, the travel direction may be any direction on the two-dimensional plane. Moreover, even in the case where the travel direction is any direction on the two-dimensional plane (for example, even in the case of the perpendicular direction), the moving image blur improvement process section may perform the above-described various processes in exactly the same way. However, when the process of the case where the travel direction is in the perpendicular direction (or the process of the case where the travel direction is in the oblique direction, and the combined process of the process in the perpendicular direction and the process in the horizontal direction) is performed, for example, a moving image blur improvement process section 33-2 illustrated in FIG. 51 may be used, in substitution for the moving image blur improvement process section described in the second embodiment. In the moving image blur improvement process section 33-2, to realize the process in the perpendicular direction, a line memory 337 is provided in the previous stage of the correction process section 332 and the signal characteristics detection section 331.

Figure 52A:
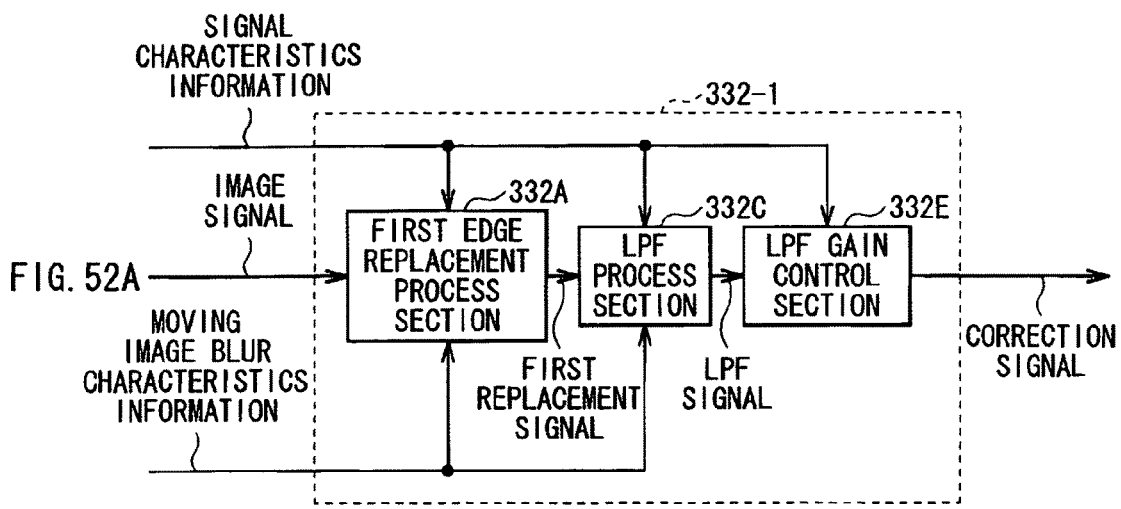
FIGS. 52A and 52B are block diagrams each illustrating the configuration of the image process section according to still another modification of the second embodiment.
Figure 52B:
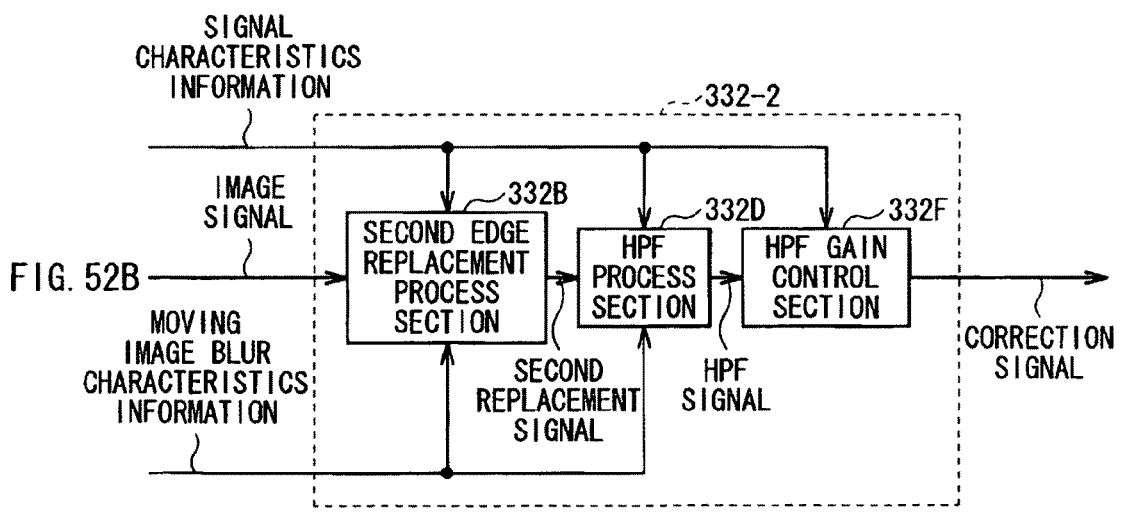

In the correction process section 332 described in the second embodiment, the case is described where both the LPF process and the HPF process as the filter process are performed on the image signal. However, it is not limited to such a case. That is, for example, like a correction process section 332-1 illustrated in FIG. 52A, only the correction process using the LPF process may be performed on the image signal. Alternatively, for example, like a correction process section 332-2 illustrated in FIG. 52B, only the correction process using the HPF process may be performed on the image signal.

Figure 53A:
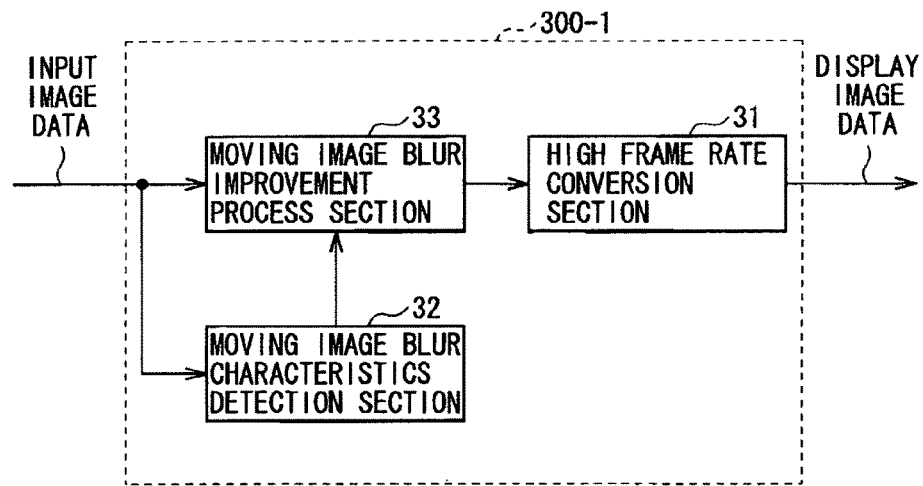
FIGS. 53A and 53B are block diagrams each illustrating the configuration of the image processing device according to still another example of the second embodiment.
Figure 53B:
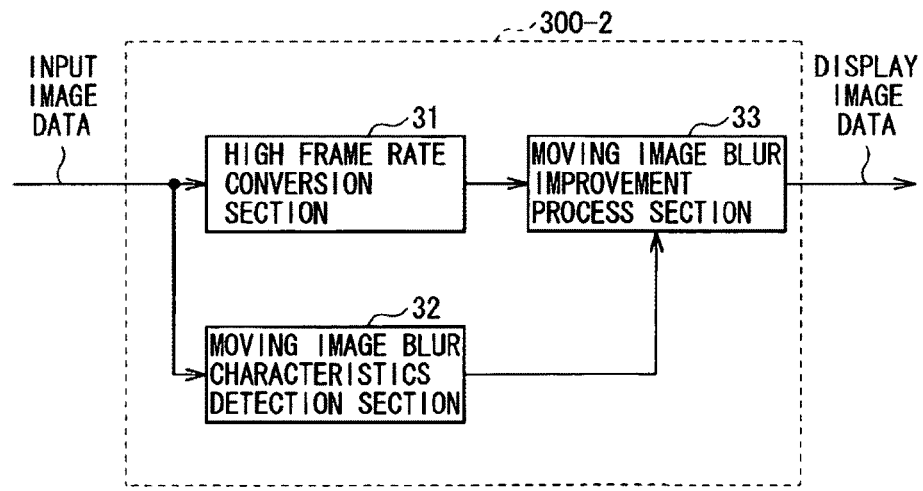

In substitution for the image processing device 300 described in the second embodiment, image processing devices 300-1 and 300-2 illustrated in FIGS. 53A and 53B may be used. Specifically, in the image processing device 300-1 illustrated in FIG. 53A, after the moving image blur is improved in the moving image blur improvement process section 33, the frame rate conversion is performed in the high-frame rate conversion section 31. In the case of such a configuration, it is possible to perform various processes in the relatively-low frame frequency. In the image processing device 300-2 illustrated in FIG. 53B, the high frame rate conversion section 31 and the moving image blur characteristics detection section 32 are disposed in parallel. In the case of such a configuration, it is possible to reduce the delay amount as a whole.

Figure 54:
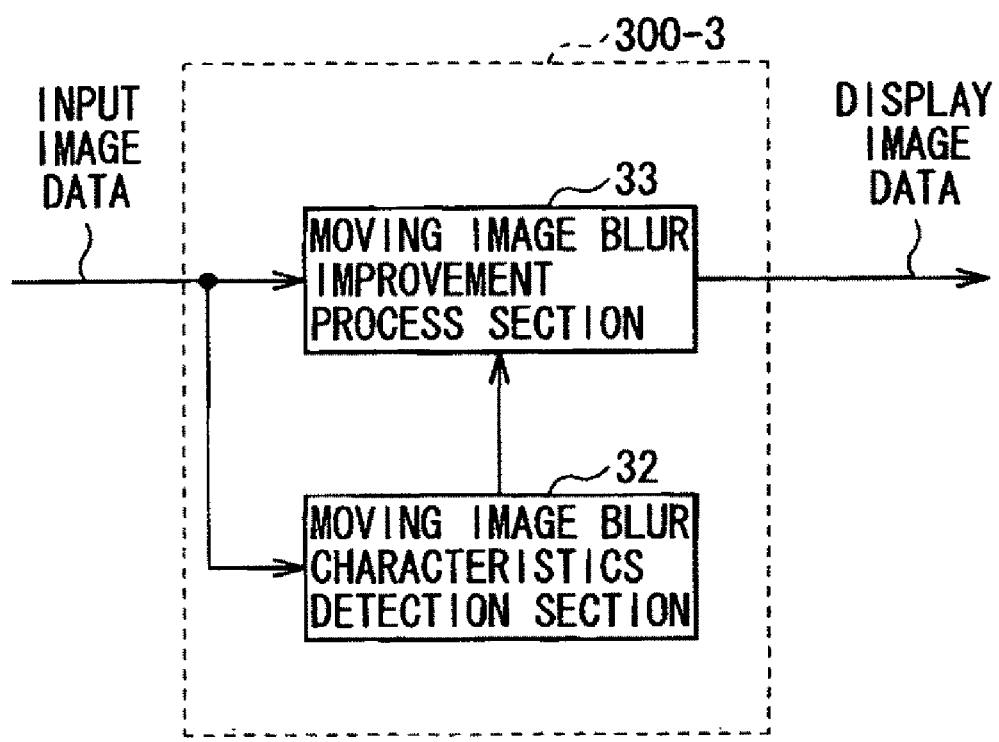
FIG. 54 is a block diagram each illustrating the configuration of the image processing device according to still another modification of the second embodiment.

For example, like an image processing device 300-3 illustrated in FIG. 54, the high frame rate conversion section is omitted, and the display device performing the usual frame rate display may be used. That is, the image processing device may be configured with only the combination of the moving image blur characteristics detection section 32 and the moving image blur improvement process section 33. In this case, it is possible to suppress the moving image blur while reducing the cost more.

Figure 55A:
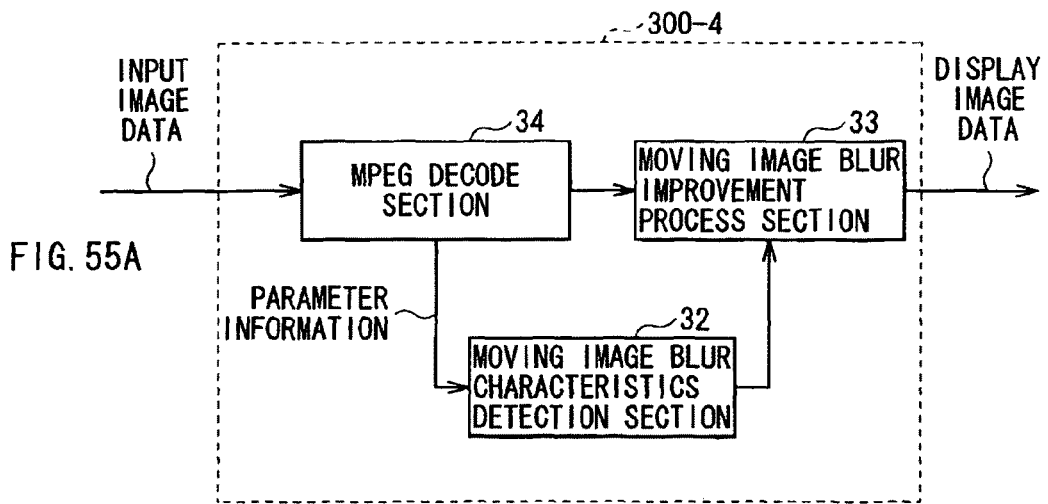
FIGS. 55A and 55B are block diagrams each illustrating the configuration of the image processing device according to still another example of the second embodiment.
Figure 55B:
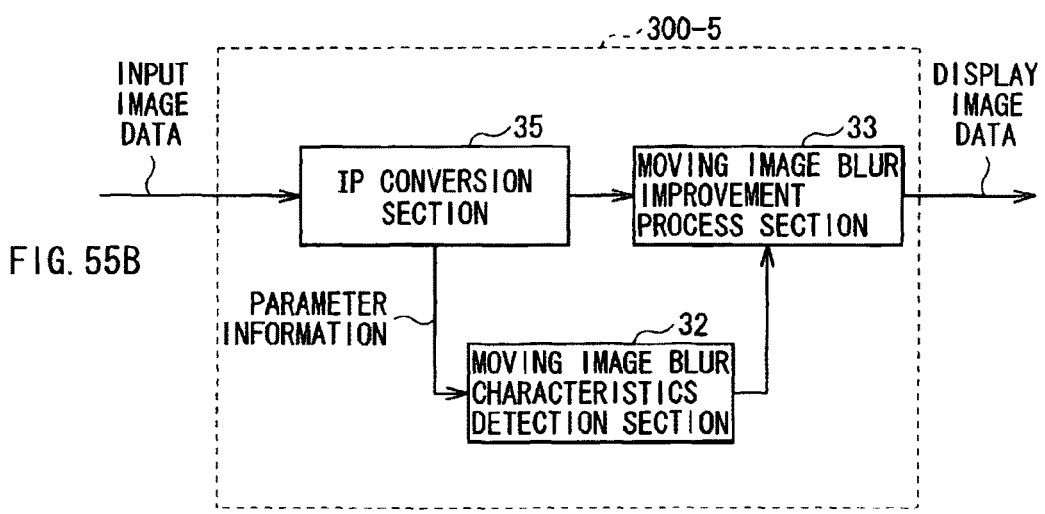

For example, like an image processing device 300-4 illustrated in FIG. 55A, and an image processing device 300-5 illustrated in FIG. 55B, in substitution for (or in addition to) the high frame rate conversion section 31, another function block may be provided in the image processing device 300.

Specifically, in the image processing device 300-4 illustrated in FIG. 55A, an MPEG (moving picture experts group) decode section 34 may be provided in substitution for the high frame rate conversion section 31, and parameter information output from the MPEG decode section 34 is supplied to the moving image blur characteristics detection section 32. In the image processing device 300-5 illustrated in FIG. 55B, an IP (interlace/progressive) conversion section 35 is provided in substitution for the high frame rate conversion section 31, and the parameter information output from the IP conversion section 35 is supplied to the moving image blur characteristics detection section 32. In the case of such configurations, the parameter information such as the motion vector is diverted from the MPEG decode section 34, and the IP conversion section 35, so that it is possible to reduce the circuit scale as a whole.

Figure 56A:
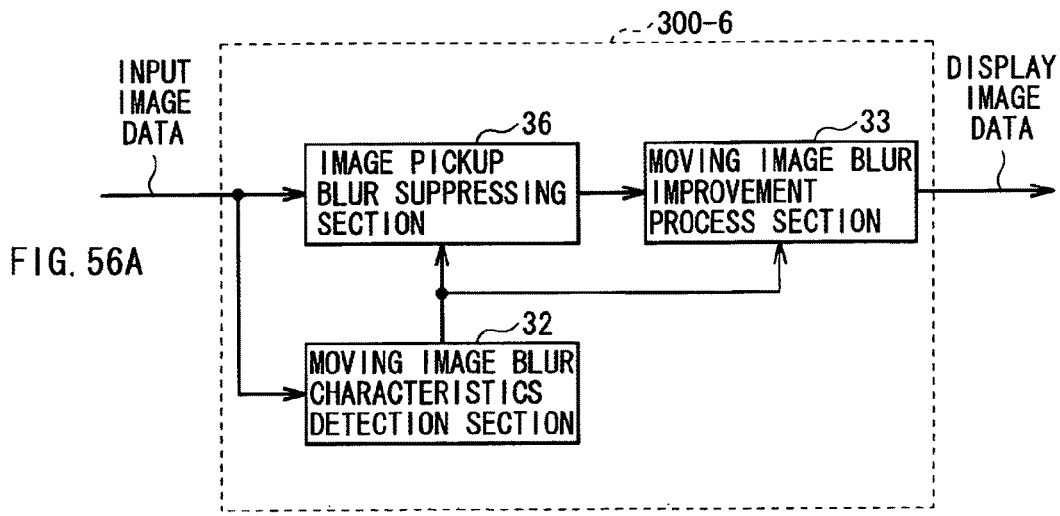
FIGS. 56A and 56B are block diagrams each illustrating the configuration of the image processing device according to still another example of the second embodiment.
Figure 56B:
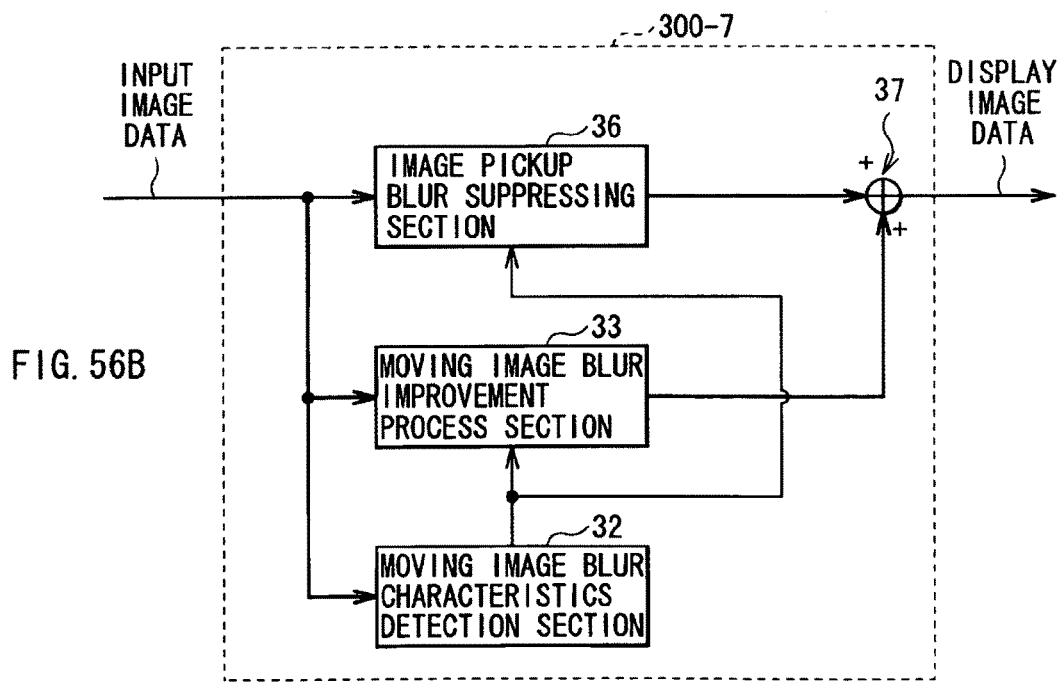

For example, like an image processing device 300-6 illustrated in FIG. 56A, and an image processing device 300-7 illustrated in FIG. 56B, in substitution for (or in addition to) the high frame rate conversion section 31, an image pickup blur suppressing process section 36 suppressing the image pickup blur included in the image signal may be provided. Specifically, in the image processing device 300-6 illustrated in FIG. 56A, the image pickup blur suppressing process section and the moving image blur improvement process section 33 are disposed in series. In the case of such a configuration, in the image pickup blur suppressing process section 36, since the moving image blur improvement process is performed by inputting the image signal in which the image pickup blur is suppressed, it is possible to reduce the tap number of the filter corresponding to the magnitude of the motion vector. In the image processing device 300-7 illustrated in FIG. 56B, since the image pick-up blur suppressing process section 36 and the moving image blur improvement process section 33 are disposed in parallel. In the case of such a configuration, the image pickup blur suppressing process section 36 and the moving image blur improvement process section 33 performs the process at the same time, it is possible to omit a delay circuit or the like having a delay function, and it is possible to reduce the circuit scale as a whole.

Moreover, in the first embodiment and the second embodiment described above, the case where the moving image blur characteristics detection section 32 detecting the motion vector or the like in the image signal is provided in the image processing device is described. However, the motion vector or the like may be detected outside the image processing device, and supplied to the image processing device.

Figure 57A:
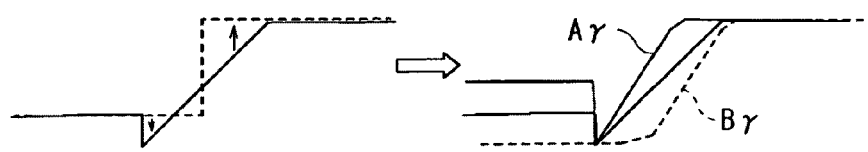
FIGS. 57A and 57B are waveform diagrams for explaining an application example of the filter process in a single-pixel structure and a sub-pixel structure.
Figure 57B:
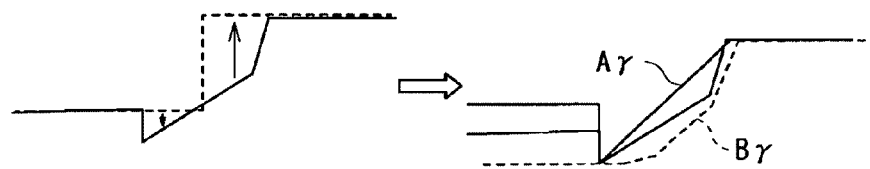

In the embodiment of the present invention, since the hold effect is reduced by utilizing the response characteristics of the liquid crystal, the filter setting and the effect of the filter setting depend on the panel. As an example, the case of the sub-pixel structure will be described. In the case where the correction pattern similar to the correction pattern for the panel having the single-pixel structure is input to the panel having the sub-pixel structure, a gamma conversion for each sub-pixel is performed on the correction pattern, in the display control section 240 (timing controller). Thus, the correction pattern for each sub-pixel is shifted from the optimal value. Here, since it is found from the simulation result that the effect remains in a B pixel, in an A pixel and the B pixel constituting the sub-pixel, it can be considered that the correction pattern improving the A pixel is desirable. Thus, for example, as illustrated in FIGS. 57A and 57B, it is desirable to set the threshold value V1 to be reduced, in formula (1) to formula (5) described above. That is, in the case where each pixel in the display device 200 is configured through use of the sub-pixel structure, when the changing edge portion to be corrected is in the edge direction of the rise direction, the magnitude of the gain in the HPF process is desirably adjusted to reduce to close to the LPF process side. With the adjustment in this direction, the high improvement effect is obtained on the rise edge from the middle gradation. Specifically, for example, in a scroll of telop characters, in the case where the adjustment as described above is not performed, the vertical line increases by the width of the motion image blur. On the other hand, in the case where the adjustment as described above is performed, it is possible to suppress the increase in such a vertical line. In this manner, even in the liquid crystal display device with the sub-pixel structure, it is possible to improve the image quality of the moving image.

Moreover, in the high frame rate conversion process performed in the first embodiment and the second embodiment, the combination of the first frame rate (frame frequency) in the input image signal and the second frame rate (frame frequency) in the output image signal is not specifically limited, and may be any combination. Specifically, for example, 60 (or 30) [Hz] may be employed as the first frame rate in the input image signal, and 120 [Hz] may be employed as the second frame rate in the output image signal. For example, 60 (or 30) [Hz] may be employed as the first frame rate in the input image signal, and 240 [Hz] may be employed as the second frame rate in the output image signal. For example, 50 [Hz] corresponding to PAL (phase alternation by line) method is employed as the first frame rate in the input image signal, and 100 [Hz] or 200 [Hz] may be employed as the second frame rate in the output image signal. For example, 48 [Hz] corresponding to a telecine system is employed as the first frame rate in the input image signal, and a predetermined frequency higher than 48 [Hz] may be employed as the second frame rate in the output image signal. The high frame rate conversion process as described in the first embodiment and the second embodiment is performed on the input image signal from such an existing television system or the like, thereby it is possible to display an existing content with high quality.

Moreover, in the first embodiment and the second embodiment, for ease of description, the case is described where the image signal is Y (luminance information) of an YUV format, and the signal utilized when performing the above-described various processes such as the filter process and the correction process on the pixel of interest is also a luminance signal. However, an image signal with a different format may be used. For example, UV (color difference information) with an RGB format or a YUV format may be used. In the case of using the UV, it is possible to appropriately improve the image quality in the color difference change by adjusting the gain in the filter output.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device processing image data provided from outside and outputting the image data to a hold type display device, the image processing device comprising:
a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of a changing edge portion in the image data,
wherein, when an amount of overshooting in the overshoot region is different from an amount of undershooting in the undershoot region, filter coefficients used in the HPF process are adjusted so that a ratio between the amount of overshooting and the amount of undershooting is maintained constant.

2. The image processing device according to claim 1, wherein
a tap number in a filter used for the HPF process changes according to the magnitude of the motion vector.

3. The image processing device according to claim 2, wherein
the tap number in the filter used for the HPF process is set to an odd number, irrespective of a value of the motion vector.

4. The image processing device according to claim 1, wherein
magnitude of gain or filter coefficients or both thereof in a filter used for the HPF process changes according to the spatial frequency in the correction area.

5. The image processing device according to claim 1, wherein
magnitude of gain in a filter used for the HPF process changes according to the magnitude of the motion vector.

6. The image processing device according to claim 1, further comprising a signal characteristics detection section which detects, from the image data and based on the magnitude of the motion vector, predetermined signal characteristics information to be used in the correction process, wherein
the correction processing section performs the correction process through use of the predetermined signal characteristics information in the image data, as well as use of the motion vector.

7. The image processing device according to claim 1, further comprising:
a motion vector detection section detecting the motion vector in the image data.

8. The image processing device according to claim 1, wherein
the correction processing section performs the correction process through executing a spatial LPF (low pass filter) process as well as the HPF process on the image data in the frame to be displayed, according to the magnitude of the motion vector, the LPF process allowing a slope of the changing edge portion in the image data to be more gentle.

9. An image processing device processing image data provided from outside and outputting the image data to a hold type display device, the image processing device comprising:
a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of a changing edge portion in the image data; and
a signal characteristics detection section which detects, from the image data and based on the magnitude of the motion vector, predetermined signal characteristics information to be used in the correction process, wherein the signal characteristics detection section detects the changing edge portion in the image data based on the magnitude of the motion vector, and detects minimum and maximum pixel values within a predetermined correction area of the pixel data as well as positions of pixels having the minimum and maximum pixel values, as the predetermined signal characteristics information, and wherein, when an amount of overshooting in the overshoot region is different from an amount of undershooting in the undershoot region, filter coefficients used in the HPF process are adjusted so that a ratio between the amount of overshooting and the amount of undershooting is maintained constant.

10. The image processing device according to claim 9, wherein
the signal characteristics detection section determines a changing direction of the changing edge portion in the correction area, based on the minimum and maximum pixel values as well as the positions of pixels having the minimum and maximum pixel values, and
the filter coefficients used in the HPF process are adjusted according to the changing direction determined by the signal characteristics detection section.

11. The image processing device according to claim 9, wherein a filter coefficient corresponding to an amount of overshooting in the overshoot region and a filter coefficient corresponding to an amount of undershooting in the undershoot region, used in the HPF process, are adjusted so that pixel values in corrected image data fall within a dynamic range.

12. The image processing device according to claim 9, wherein magnitude of gain or filter coefficients or both thereof in a filter used for the HPF process changes according to the magnitude of an edge amplitude which is defined as a difference between the minimum pixel value and the maximum pixel value.

13. The image processing device according to claim 9, wherein the correction area is determined based on the magnitude of the motion vector.

14. The image processing device according to claim 9, wherein the correction processing section includes an edge replacement section replacing pixel values in an outside region which lies outside of a pixel region between the positions of pixels having the minimum and maximum pixel values in the correction area in the image data, with the minimum pixel value or the maximum pixel value detected by the signal characteristics section, and replacing the pixel value in the pixel region between the positions of pixels having the minimum and maximum pixel values in the correction area in the image data, with pixel values including three values of the minimum pixel value, the maximum pixel value, and a pixel value of a median pixel lying at a middle position between the positions of pixels having the minimum and maximum pixel values, and
the correction processing section performs the correction process on the image data subjected to replacement process by the edge replacement section, through use of the HPF process.

15. An image processing device processing image data provided from outside and outputting the image data to a hold type display device, the image processing device comprising:
a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of a changing edge portion in the image data; and
a signal characteristics detection section which detects, from the image data and based on the magnitude of the motion vector, predetermined signal characteristics information to be used in the correction process,
wherein the signal characteristics detection section detects the changing edge portion in the image data based on the magnitude of the motion vector, and detects minimum and maximum pixel values within a predetermined correction area of the pixel data as well as positions of pixels having the minimum and maximum pixel values, as the predetermined signal characteristics information,
wherein the signal characteristics detection section performs a weighting process to weight a positive coefficient onto each pixel value according to a distance from a predetermined pixel of interest in the correction area to each pixel, prior to detection of the minimum pixel value and the position of the pixel having the minimum pixel value, and
wherein the signal characteristics detection section performs a weighting process to weight a negative coefficient onto each pixel value according to a distance from a predetermined pixel of interest in the correction area to each pixel, prior to detection of the maximum pixel value and the position of the pixel having the maximum pixel value.

16. The image processing device according to claim 15, wherein
the positive coefficient or the negative coefficient or both thereof in the weighting processes is adjusted to increase with increase of a spatial frequency in the correction area.

17. An image display system comprising:
an image processing device processing image data provided from outside; and
a hold type display device performing an image display based on processed image data outputted from the image processing device,
wherein the image processing device includes a correction processing section performing a correction process to correct a pixel value in the image data for each pixel through performing a spatial HPF (high pass filter) process on the image data in a frame to be displayed in the display device according to a magnitude of a motion vector in the image data, the HPF process allowing an overshoot region and an undershoot region to be provided in a vicinity of both ends of the changing edge portion in the image data, and
wherein, when an amount of overshooting in the overshoot region is different from an amount of undershooting in the undershoot region, filter coefficients used in the HPF process are adjusted so that a ratio between the amount of overshooting and the amount of undershooting is maintained constant.

18. The image display system according to claim 17, wherein
the correction processing section performs the correction process through executing a spatial LPF (low pass filter) process as well as the HPF process on the image data in the frame to be displayed, according to the magnitude of the motion vector, the LPF process allowing a slope of the changing edge portion in the image data to be more gentle.

* * * * *